(12) United States Patent
Kato

(10) Patent No.: US 8,753,240 B2
(45) Date of Patent: Jun. 17, 2014

(54) POWER TRANSMITTING DEVICE

(75) Inventor: Tadahiko Kato, Kosai (JP)

(73) Assignee: Univance Corporation, Shizuoka (JP)

( * ) Notice: Subject to any disclaimer, the term of this patent is extended or adjusted under 35 U.S.C. 154(b) by 8 days.

(21) Appl. No.: 13/578,180

(22) PCT Filed: Feb. 16, 2011

(86) PCT No.: PCT/JP2011/053293
§ 371 (c)(1),
(2), (4) Date: Aug. 9, 2012

(87) PCT Pub. No.: WO2011/102392
PCT Pub. Date: Aug. 25, 2011

(65) Prior Publication Data
US 2012/0309576 A1    Dec. 6, 2012

(30) Foreign Application Priority Data

Feb. 17, 2010 (JP) ................................. 2010-032793

(51) Int. Cl.
*F16H 3/72* (2006.01)

(52) U.S. Cl.
USPC ................................................. 475/5; 475/8

(58) Field of Classification Search
CPC ............. F16H 3/72; F16H 2200/2066; F16H 2200/2069
USPC ............................................................ 475/8
See application file for complete search history.

(56) References Cited

U.S. PATENT DOCUMENTS

| 6,054,776 A | 4/2000 | Sumi |
| 2006/0116231 A1* | 6/2006 | Supina et al. ...................... 475/8 |
| 2007/0161456 A1 | 7/2007 | Kato et al. |
| 2011/0183801 A1* | 7/2011 | Ando ............................... 475/5 |

FOREIGN PATENT DOCUMENTS

| JP | 49-5129 | 2/1974 |
| JP | 10-304513 | 11/1998 |
| JP | 2005-138784 | 6/2005 |
| JP | 2007-210799 | 8/2007 |

OTHER PUBLICATIONS

English translation of International Search Report for PCT/JP2011/053293.
Imaeda et al. "Hybrid System for mini-van 4WD", Society of Automobile Engineers of Japan, Paper No. 20024219, May 2002, No. 06-02, pp. 8-14.
International Search Report for International Application No. PCT/JP2011/053293.

* cited by examiner

*Primary Examiner* — Edwin A Young
(74) *Attorney, Agent, or Firm* — Muramatsu & Associates

(57) ABSTRACT

Disclosed is a power transmitting device capable of streamlined structure and control, as well as alleviating energy loss. The device comprises a planetary gear device wherein motive power of an engine and a motor is inputted from a first element and a second element; and a first clutch that transmits, in an interruptible manner, motive power from a second shaft that is linked to the second element, to a first shaft that is linked to a third element and an input shaft, while interrupting motive power from the first shaft or the input shaft to the second shaft. It is possible to switch motive power of the engine and the motor with motive power transmission switching by the first clutch, thus allowing streamlining of structure and control.

14 Claims, 28 Drawing Sheets

POWER TRANSMITTING DEVICE

This application is a national stage of International Application No. PCT/JP2011/053293 filed Feb. 16, 2011, claiming foreign filing priority of Japanese Patent Application No. 2010-032793, filed Feb. 17, 2010, the entire contents of which are incorporated herein by reference.

TECHNICAL FIELD

This invention relates to a power transmitting device and, more particularly, to a power transmitting device capable of simplifying structure and control and also suppressing energy loss.

BACKGROUND ART

As a power transmitting device of a hybrid vehicle including an engine and a motor as power source, for example, Imaeda et al. ("Hybrid System for mini-van 4WD", Society of Automotive Engineers of Japan, Paper Number 20024219, May 2002, No. 06-02, pp 8-14), especially, FIG. 9 and Table 3, describe one having a double pinion planetary gear unit and three multiplate wet clutches. According to the techniques disclosed by Imaeda et al., the three multiplate wet clutches are operated to perform drive-power switching between the engine and the motor.

SUMMARY OF INVENTION

Technical Problem

However, the power transmitting device disclosed by Imaeda et al. has disadvantages of complicated structure and complicated control of a power transmitting device because the three multiplate wet clutches must be hydraulically controlled to perform drive-power switching between the engine and the motor. Also, thermal energy is released upon engagement of the multiplate set clutch, resulting in a disadvantageous energy loss.

The present invention has been made to address the aforementioned disadvantages and provides a power transmitting device capable of simplifying structure and control and also suppressing energy loss.

Solution to Problem

To attain this object, a power transmitting device in the first aspect of the invention includes: a planetary gear device having a first element to which power is input from an input shaft connected to an engine, a second element to which power of a motor is input, and a third element meshing with the first element and the second element and transmitting power to a gearbox; a first shaft connected to any element of the three elements and the gearbox; a second shaft connected to the motor and one of the other elements excluding any of the three elements to which the first shaft is connected; and a first clutch transmitting power from the second shaft to the first shaft or the input shaft in an interruptible manner, while blocking transmission of power from the first shaft or the input shaft to the second shaft. As a result, by switching between transmission and interruption of power from the second shaft to the first shaft or the input shaft by the first clutch, distribution of engine power and motor power and drive-power switching can be achieved. This produces advantageous effects of simplifying control and structure of the power transmitting device.

Also, in the structure of engaging a multiplate wet clutch to perform drive-power switching, thermal energy is released at the time of engagement of the multiplate wet clutch to give rise to energy loss. However, because of a reduced number of multiplate wet clutches, the energy loss is advantageously reduced.

With the power transmitting device in the second aspect of the invention, the first clutch causes first sprags to engage with the first inner race and the first outer race in order to transmit power while restricting relative rotation of the first inner race and the first outer race in a certain rotation direction. The first load applying device can cause engagement or disengagement of the first sprags to switch between the transmission and the interruption of rotation in the certain direction, resulting in an advantageous effect of shortening the switching time in addition to the advantageous effect of the power transmitting device in the first aspect noted above.

Since the first sprags are tilted for the transmission and interruption of power in the certain direction, the first inner race and the first outer race can be prevented from idling at the time of switching from the state of blocking the transmission of power to the state of transmitting the power. Accordingly, a shock at the time of switching can be advantageously avoided.

Further, since power is transmitted through the first sprags, the torque capacity can be increased even if the first clutch is small in size. As a result, a reduction in size of the power transmitting device can be advantageously achieved.

With the power transmitting device in the third aspect of the invention, because of the second clutch which transmits the power from the first shaft or the input shaft to the second shaft, but blocks the transmission of power from the second shaft to the first shaft or the input shaft, the power can be transmitted from the gearbox to the generator motor when inertia traveling (coasting) or the like for advantageous energy regeneration.

With the power transmitting device in the fourth aspect of the invention, the first urging member applies a urging force to the first sprags to place one of the outer peripheral surface of the first inner race and the inner peripheral surface of the first outer race and one of the engaging faces of each of the first sprags into contact with each other in order to tilt the first sprags in an anti-lock direction of the circumferential directions. The first load applying device applies a load to the first sprags through the cage in opposition to the urging force of the first urging member to tilt the first sprags in a lock direction of the circumferential directions opposite to the anti-lock direction so as to place the two engaging faces of each of the first sprags into contact with the outer peripheral surface of the first inner race and the inner peripheral surface of the first outer race. As a result, the two engaging faces of each of the first sprags are engaged with the outer peripheral surface of the first inner race and the inner peripheral surface of the first outer race to restrict the relative rotation of the first inner race and the first outer race.

The first sprags are tilted by a balance of the turning moment about the contact point of the outer peripheral surface of the first inner race or the inner peripheral surface of the first outer race and the engaging face of the first sprag. Accordingly, the sprag can be tilted with a smaller load than the urging force of the first urging member. As a result, advantageously, the first load applying device can be reduced in size and the load applied to the first sprag can be lowered, resulting in suppression of energy loss.

With the power transmitting device in the fifth aspect of the invention, the inner cage or the outer cage includes the first retaining potion and the second retaining portion separated from each other in an axis direction. The first sprags are retained by the first retaining portion, while the second sprags are retained by the second retaining portion. The first retaining portion and the second retaining portion are structured to be relatively movable in the circumferential direction, and the second urging member urges the first retaining portion and the second retaining portion toward one of the circumferential directions. As a result, the urging force of the second urging member causes the first face and the second face which are formed on the first retaining portion and the second retaining portion to abut on each other to restrict the relative movement of the first retaining portion and the second retaining portion in one of the circumferential directions. In consequence, the first retaining portion and the second retaining portion can be integrally moved by the urging force of the second urging member, and by the load application of the first load applying device, the first sprags retained in the first retaining portion and the second sprags retained in the second retaining portion can be tilted.

In this regard, when one of the first sprags and the second sprags are engaged with the first inner race and the first outer race or with the second inner race and the second outer race by the relative movement of the inner cage and the outer cage in the circumferential direction, the other one of the first sprags and the second sprags are retained in the inner cage and the outer cage and disengaged from the first inner race or/and the like. If the inner cage and the outer cage are each formed in an integrated manner, when one of the first sprag and the second sprag engaging with the first inner race and the first outer race or the like is tilted to be more strongly engaged, the tilting motion pushes the inner cage and the outer cage to cause further relative movement of the inner cage and the outer cage. Thus, the other of the first sprag and the second sprag may possibly fall out of the inner cage or the outer cage and the inner cage or the outer cage may be possibly damaged.

As opposed to this, with the power transmitting device in the fifth aspect noted above, since the first retaining portion and the second retaining portion are structured to be relatively movable in the circumferential direction, if one of the first sprag and the second sprag engaging with the first inner race and the first outer race or the like is tilted so as to engage further strongly, the tilting motion causes only one of the first retaining portion and the second retaining portion to move relative to the other of the first retaining portion and the second retaining portion. As a result, the other of the first retaining portion and the second retaining portion can be prevented from being affected, advantageously leading to prevention of the possibilities that the other of the first sprag and the second sprag falls out of the inner cage or the outer cage and that the inner cage and the outer cage are damaged, in addition to the advantageous effects of the third or fourth aspect noted above.

With the power transmitting device in the sixth aspect of the invention, first shaft rpm acquiring means and the second shaft rpm acquiring means acquire the rpm of the first shaft and the rpm of the second shaft. The rpm determining means determines whether or not the rpm of the first shaft acquired by the first shaft rpm acquiring means and the rpm of the second shaft acquired by the second shaft rpm acquiring means are in agreement with each other. As a result of the determination, when the rpm of the first shaft and the rpm of the second shaft are in agreement with each other, the load controlling means controls actuation of the first load applying device and presence or absence of application of a load to the first sprags through the cage. Therefore, in addition to the advantageous effects of any of the aspects noted above, a shock is advantageously prevented from being produced by inertial torque, which advantageously preventing the driver from feeling a sense of incongruity.

That is, when the rpm of the first shaft is equal to the rpm of the second shaft, the rpms of the first inner race and the first outer race of the first clutch become also equal to each other. At this stage, if the first sprags engage with the first inner race and the first outer race, since a difference in speed is not produced between the first inner race and the first outer race, producing of inertia torque is prevented to avoid a shock.

DESCRIPTION OF EMBODIMENTS

Figure 1:
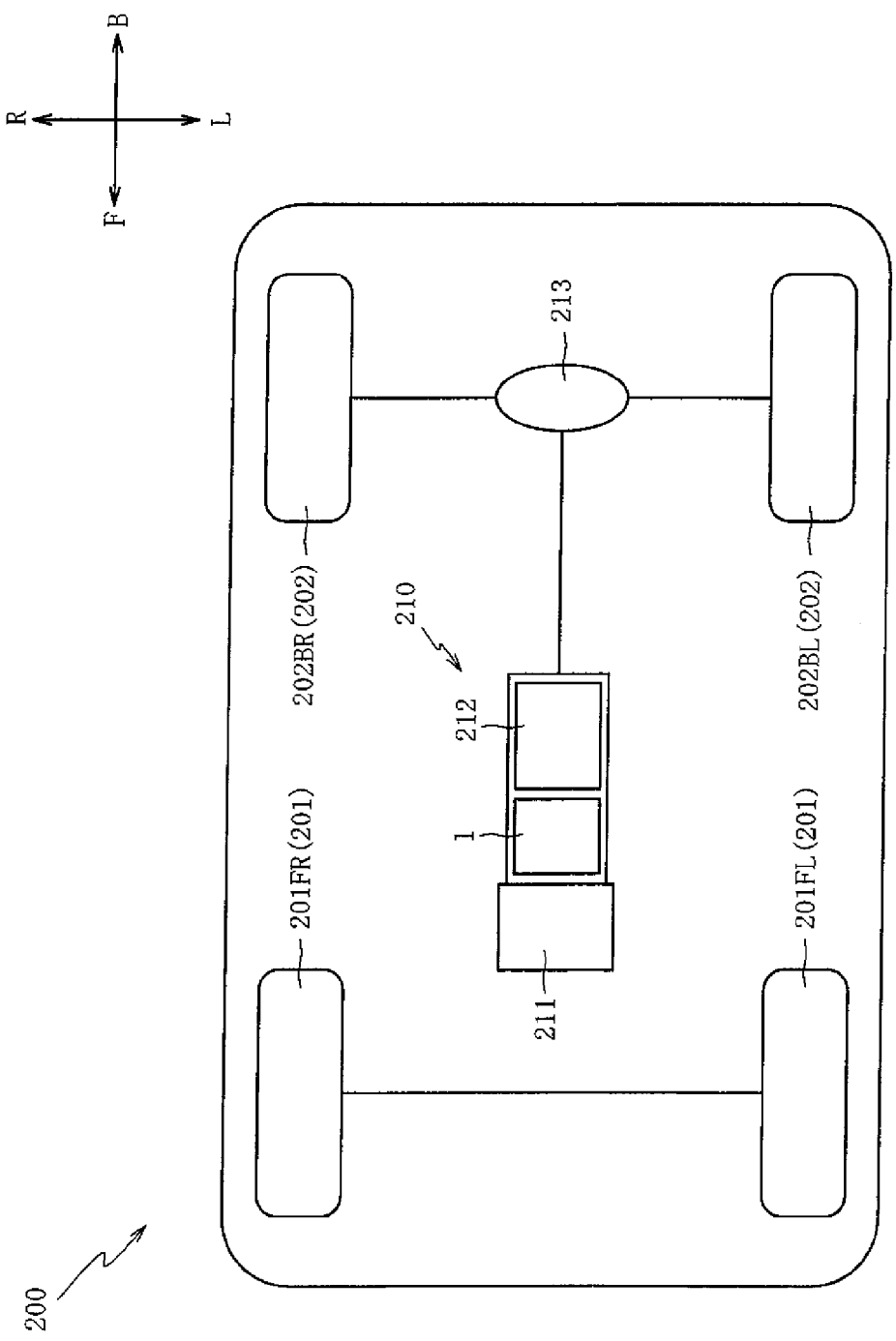
FIG. 1 is a schematic diagram schematically illustrating a vehicle equipped with a power transmitting device in a first embodiment of the present invention.

Preferred embodiments of the present invention will be described below with reference to the accompanying drawings. FIG. 1 is a schematic diagram schematically illustrating a vehicle 200 equipped with a power transmitting device 1 in a first embodiment of the present invention. Arrows F-B, L-R in FIG. 1 denote the front and back directions, the right and left directions, respectively, of the vehicle 200.

Initially, the structure of the vehicle 200 is described in outline. As shown in FIG. 1, the vehicle 200 includes front wheels 201 (left front wheel 201FL and right front wheel 201FR), rear wheels (left rear wheel 202BL and right rear wheel 202BR), and a unit 210 driving the rear wheels 202. The unit 210 mainly includes an engine 211 and a later-mentioned generator motor 60 as a power source, a power transmitting device 1 for transmitting power of the engine 211 and the generator motor 60, and a gearbox 212 to which the power is transmitted from the power transmitting device 1, which is structured to use the two powers of the engine 211 and the generator motor 60 as circumstances demand, and to deliver the used power through a differential 213 to drive the rear wheels 202. The unit 210 is structured to have the generator motor 60 also equipped with the ability as a generator and to be capable of regenerating the electric power generated by the generator motor 60.

Figure 2:
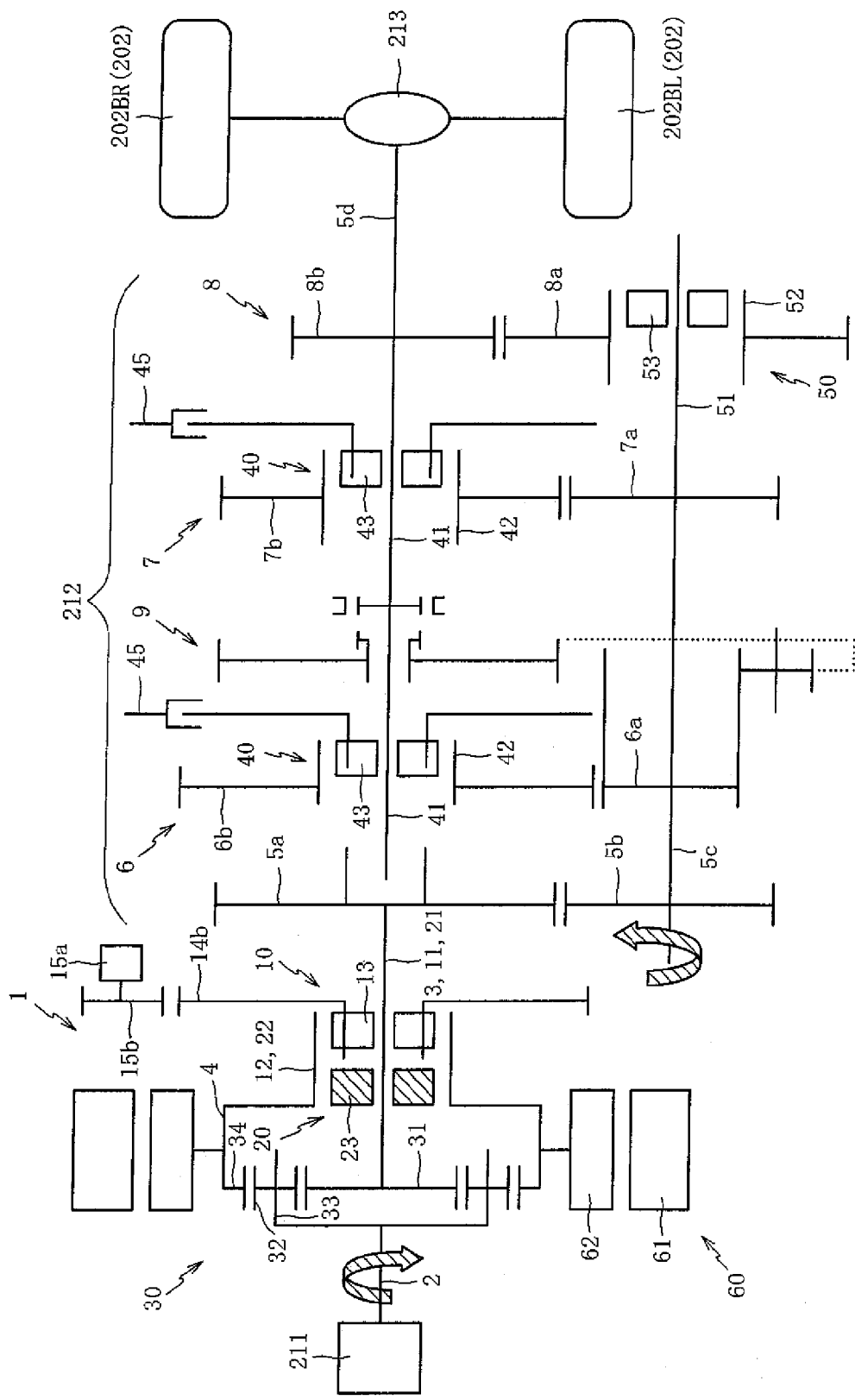
FIG. 2 is a schematic diagram schematically illustrating the power transmitting device and the gearbox.

Next, the detail structure of the power transmitting device 1 will be described with reference to FIG. 2 which illustrates the internal structure of the power transmitting device 1 and the gearbox 212. FIG. 2 shows only the structure performing the function of transmitting power for easier understanding. As shown in FIG. 2, the power transmitting device 1 mainly includes a planetary gear device 30 connected to an input shaft 2 delivering the power of the engine 211, and a first clutch 10 and a second clutch 20 which are placed on a power line from the power transmitting device 1 to the rear wheels 202 (drive wheels). The gearbox 212 is placed on the power line from the power transmitting device 1 to the rear wheels 202 (drive wheels). The power applied to the gearbox 212 is output at a predetermined transmission ratio to drive the rear wheels 202 through the differential 213.

The planetary gear device 30 includes a sun gear 31, a carrier 33 rotatably supporting a plurality of pinion gears 32 which mesh with the outer periphery of the sun gear 31, and a ring gear 34 having the inner periphery meshing with the pinion gears 32. In the embodiment, the carrier 33 is connected to the input shaft 2 to which the power of the engine 211 is input, which forms a first element. Also, the ring gear 34 is connected to a rotor 62 rotating relative to a stator 61 of the generator motor 60, which forms a second element. Further, the sun gear 31 is connected to a first shaft 3 transmitting power toward the gearbox 212, which forms a third element.

The first clutch 10 is provided for transmitting and interrupting power between the second shaft 4 connected to the ring gear 34 (second element) and the first shaft 3, and is structured to transmit, in an interruptible manner, power received from the second shaft 4 to the first shaft 3, but to block transmission of power from the first shaft 3 to the second shaft 4.

Figure 3:
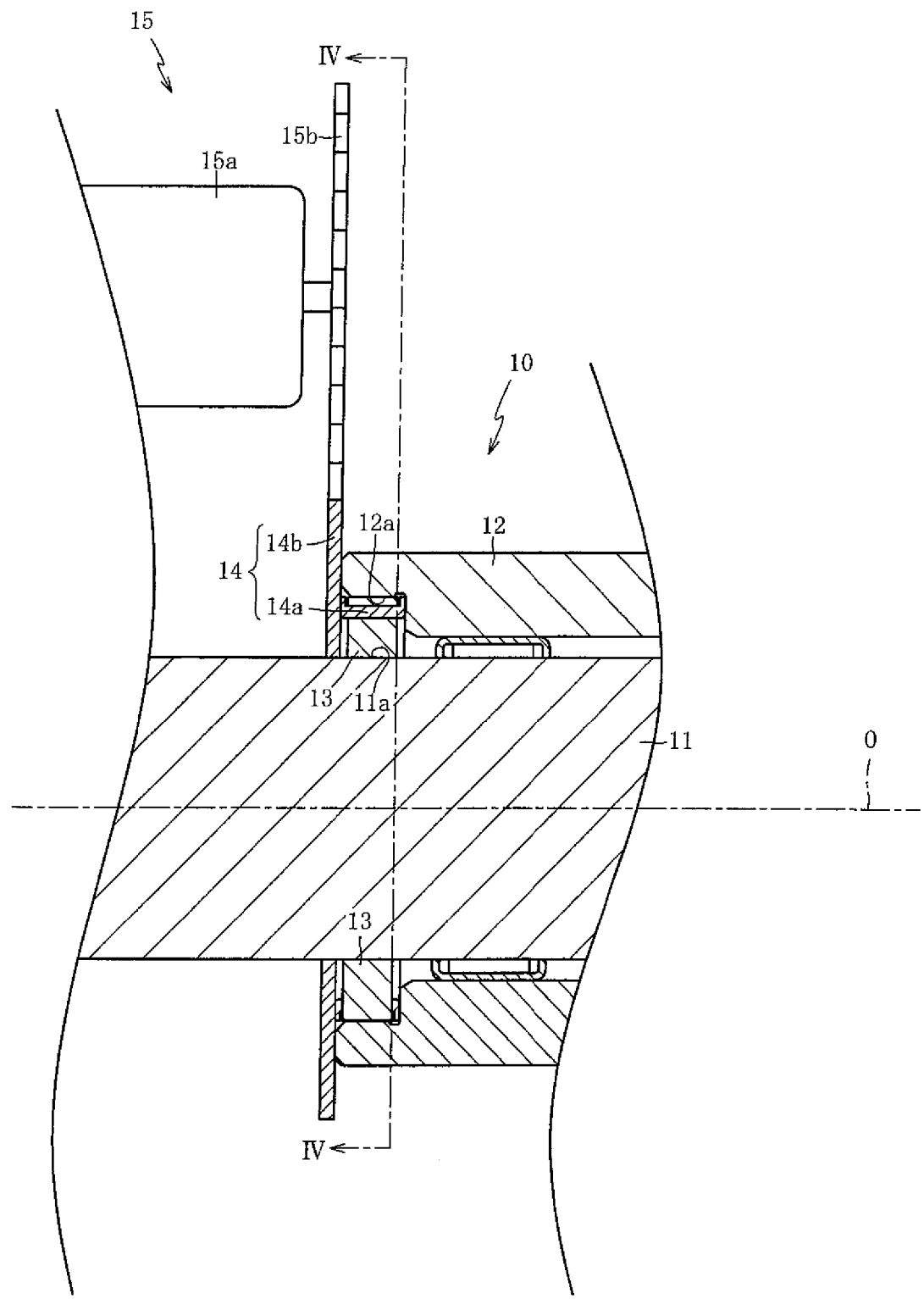
FIG. 3 is a sectional view of the first clutch.
Figure 4:
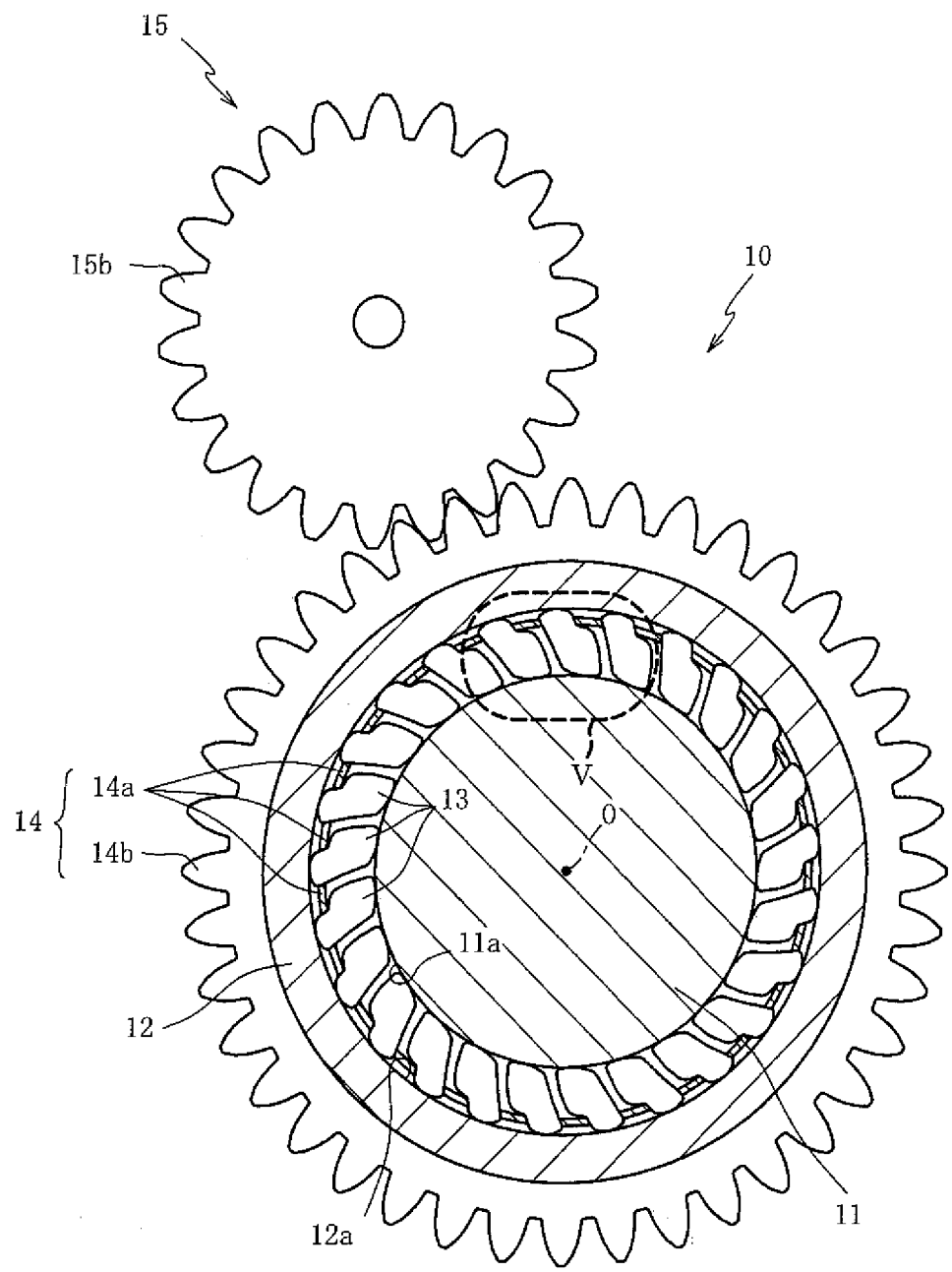
FIG. 4 is a sectional view of the first clutch taken along the IV-IV line in FIG. 3.

A detail structure of the first clutch 10 is described with reference to FIG. 3 and FIG. 4. FIG. 3 is a sectional view of the first clutch 10. FIG. 4 is a sectional view of the first clutch 10 taken along the IV-IV line in FIG. 3. As shown in FIG. 3 and FIG. 4, the first clutch 10 mainly includes a first inner race 11, a first outer race 12 surrounding the outer periphery of the first inner race 11, a plurality of first sprags 13 interposed between the first inner race 11 and the first outer race 12, a cage 14 retaining the first sprags 13, and a load applying device 15.

The first inner race 11 is to transmit power, and has an outer peripheral surface 11a of circular cross section and is structured rotatably about an axis O as illustrated in FIG. 3 and FIG. 4. The first inner race 11 is connected to the first shaft 3 (see FIG. 2). The first outer race 12 is to transmit power in a joint effort with the first inner race 11, which has an inner peripheral surface 12a of circular cross section facing the outer peripheral surface 11a of the first inner race 11 as shown in FIG. 3 and FIG. 4. The first outer race 12 is structured rotatably about the axis O similarly to the first inner race 11. The first outer race 12 is connected to the second shaft (see FIG. 2).

Figure 5:
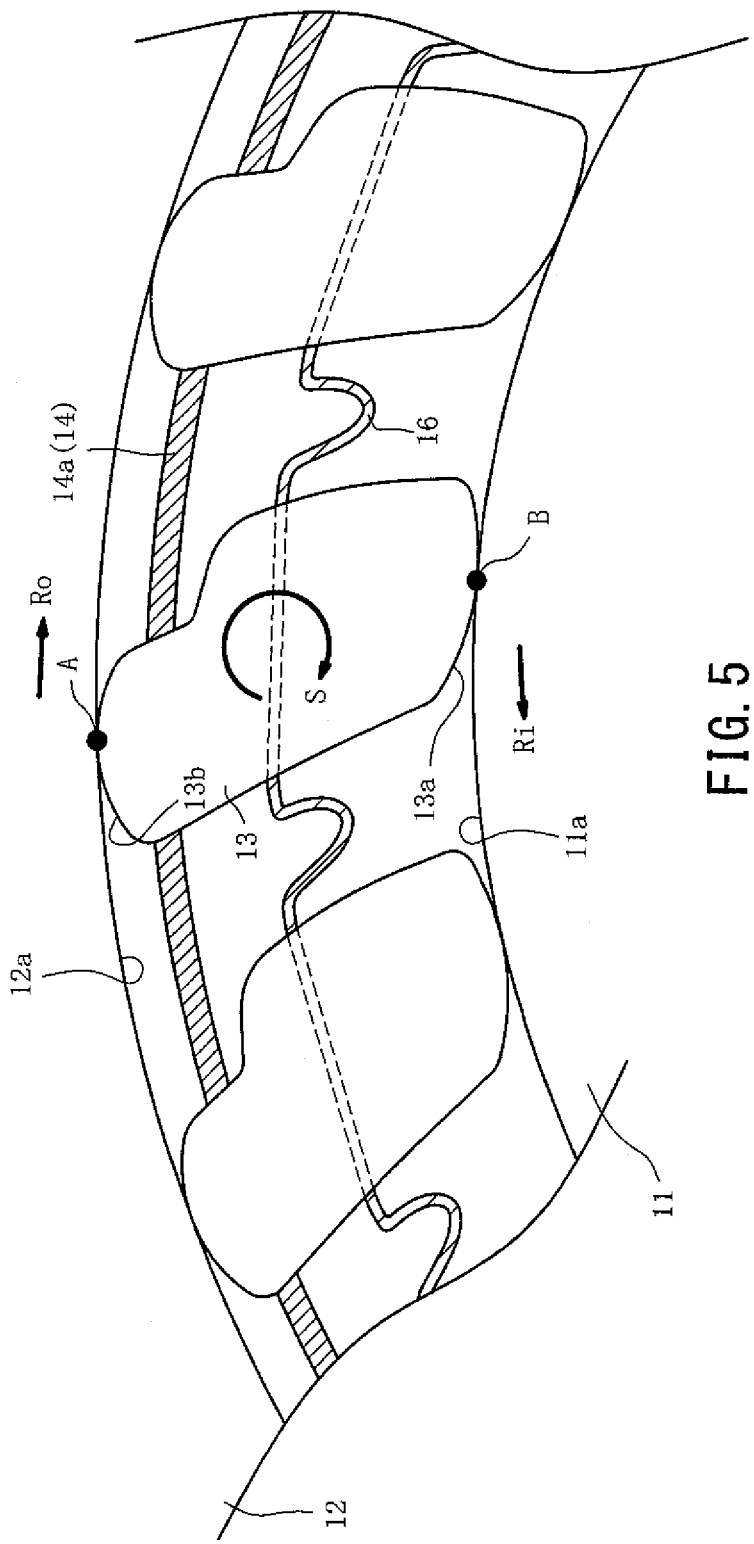
FIG. 5 is an enlarged sectional view of the portion of the first clutch designated by letter "V" in FIG. 4.

The first sprag 13 is to engage the first inner race 11 and the first outer race 12 with each other, and has engaging faces 13a, 13b (see FIG. 5) respectively making contact with the outer peripheral surface 11a and the inner peripheral surface 12a. The plurality of first sprags 13 are arranged at a regular interval in the circumferential direction between the outer peripheral surface 11a and the inner peripheral surface 12a which face each other as shown in FIG. 4. The first sprag 13 is urged in the circumferential direction of the inner peripheral surface 11a and the outer peripheral surface 12a by a first urging member 16 (see FIG. 5). Here, the first urging member 16 is described with reference to FIG. 5. FIG. 5 is an enlarged sectional view of the portion of the first clutch 10 designated by letter "V" in FIG. 4.

The first urging member 16 exerts an urging force on the first sprag 13 to make the engaging faces 13a, 13b come into contact with the outer peripheral surface 11a and the inner peripheral surface 12a to produce torque in the direction of arrow S in FIG. 5 (hereinafter referred to as a "self-lock direction"). In the embodiment, as illustrated in FIG. 5, the first urging member is structured to include a ribbon spring formed by machining a metallic material to bend it into a wave-like shape, and to be able to effectively use the elasticity to exert the urging force on the first sprag 13. However, the first urging member 16 may be configured by a coil spring. Because the first urging member 16 exerts the urging force on the first sprag 13, the first sprag 13 moves in a tilting manner in the self-lock direction to cause the engaging faces 13a, 13b to come into contact with the outer peripheral surface 11a and the inner peripheral surface 12a. As a result, as shown in FIG. 5, frictional force is produced at a contact point A of the inner peripheral surface 12a and the engaging face 13b and at a contact point B of the outer peripheral surface 11a and the engaging face 13a, and also a positional displacement of each of the contact points A, B in the circumferential direction of the outer peripheral surface 11a and the inner peripheral surface 12a. Thereby, when the first inner race 11 and the first outer race 12 rotate in a predetermined direction, the first sprags 13 engage with the first inner race 11 and the first outer race 12.

That is, when the first outer race 12 rotates with respect to the first sprag 13 in the direction of arrow Ro in FIG. 5 (hereinafter referred to as a "lock direction") when viewed from the first inner race 11 in rotation relative to the first inner race 11, the first sprag 13 is engaged with the first inner race 11 and the first outer race 12. In this manner, the first inner race 11 (see FIG. 2) rotates together with the first outer race 12. On the other hand, when the first outer race 12 rotates with respect to the first sprag 13 in the opposite direction to arrow Ro in FIG. 5 (hereinafter referred to as a "free direction") when viewed from the first inner race 11 in rotation relative to the first inner race 11, the first sprag 13 is tilted in the anti-self lock direction in opposition to the urging force of the first urging member 16 by the friction force acting on the contract point A, thus disengaging the first sprag 13 from the first inner race 11 and the first outer race 12. As a result, the first outer race 12 idles around the first inner race 11.

When the first inner race 11 rotates with respect to the first sprag 13 in the direction of arrow Ri in FIG. 5 (the lock direction) when viewed from the first outer race 12 in rotation relative to the first outer race 12, the first sprag 13 is engaged with the first inner race 11 and the first outer race 12. As a result, the first outer race 12 rotates together with the first inner race 11 (see FIG. 2). On the other hand, when the first inner race 11 rotates with respect to the first sprag 13 in the opposite direction to arrow Ri in FIG. 5 (the free direction) when viewed from the first outer race 12 in rotation relative to the first outer race 12, the first sprag 13 tilts in the anti-self lock direction in opposition to the urging force of the first urging member 16 by the friction force acting on the contract point B, resulting in idling of the first outer race 12 around the first inner race 11 (see FIG. 2).

Returning to FIG. 3 and FIG. 4, the cage 14 is to hold the first sprags 13 in a manner to allow them to tilt in the circumferential direction of the outer peripheral surface 11a and the inner peripheral surface 12a. The cage 14 includes a retaining portion 14a and a load transmitting portion 14b. The retaining portion 14a retains the first sprags 13, which extends in the direction of the axis O as shown in FIG. 3 and FIG. 4 so as to hold the top ends of the first sprags 13.

The load transmitting portion 14b transmits the load from the first load applying device 15, and extends in a direction crossing the direction of axis O as shown in FIG. 3. This allows a reduction in size in the direction of the axis O of the cage 14 as compared with the case of extending the load transmitting portion 14b in the direction of the axis O, leading to a reduction in size of the first clutch 10. The load transmitting portion 14b is formed in a cog shape as illustrated in FIG. 4, and is structured to receive the load transmitted from the first load applying device 15 through a gear mechanism which is provided between the load transmitting portion 14b and a pinion 15b described later. This makes it possible to reduce the energy loss occurring in the load transmitting line from the first load applying device 15 to the cage 14, and to transmit a load to the cage 14 with a high degree of efficiency.

The first load applying device 15 applies a load to the first sprag 13 in opposition to the urging force of the first urging member 16 to tilt the first sprag 13 in the anti-self lock direction (the rotation direction opposite to arrow S in FIG. 5), and includes an actuator 15a and a pinion 15b as shown in FIG. 3 and FIG. 4.

The actuator 15a, which is a power source generating a load to be applied to the first sprags 13, includes an electric motor (AC motor or DC motor) and can be driven by power supplied from a power source (not shown). In this manner, since the actuator 15a includes an electric motor, the first load applying device 15 can be simplified in structure and reduced in size as compared with the case of, for example, an actuator 15a including a cylinder, a solenoid or the like. If the first load applying device 15 has a complicated structure, the first load applying device 15 will increase in size, resulting in a larger size of the first clutch 10. However, since it is possible to simplify the structure of the first load applying device 15 and reduce the size of the same as noted above, a reduction in size of the first clutch 10 can be achieved.

The pinion 15b transmits power of the actuator 15a to the cage 14, and is formed in a cog shape meshing with the load transmitting portion 14b of the cage 14 as shown in FIG. 3 and forms part of the gear mechanism between the load transmitting portion 14b and the pinion 15b. Since the pinion 15b transmits the power of the actuator 15a to the cage 14, the load is applied to the first sprags 13 through the cage 14. In this manner, since the first load applying device 15 applies a load to the first sprag 13 through the cage 14, the load can be applied to a plurality of the first sprags 13 all at once with high efficiency.

With the first load applying device 15 structured as described above, the first sprag 13 is tilted in the anti-self lock direction by applying a load to the first sprag 13 in opposition to the urging force of the first urging member 16, so that the first sprag 13 can be forcibly disengaged from the first inner race 11 and the first outer race 12. As a result, even when the power transmitted from the generator motor 60 to the second shaft 4 is input to the first outer race 12 of the first clutch 10 so as to rotate the first outer race 12 with respect to the first sprags 13 in the lock direction (the direction of arrow Ro in FIG. 5), the first sprags 13 are forcibly disengaged from the first inner race 11 and the first outer race 12 by the first load applying device 15, so as to cause the first outer race 12 to idle. As a result, the transmission of power between the first shaft 3 and the second shaft 4 is blocked. Even when the power delivered to the first shaft 3 is input to the first inner race 11 of the first clutch 10 so as to cause the first inner race 11 to rotate with respect to the first sprags 13 in the lock direction (the direction of arrow Ri in FIG. 5), the first load applying device 15 forcibly disengages the first sprags 13 from the first inner race 11 and the first outer race 12 so as to cause the first inner race 11 to idle. As a result, the transmission of power between the first shaft 3 and the second shaft 4 is blocked.

Returning to FIG. 2, the second clutch 20 is provided for transmission and interruption of power between the second shaft 4 and the first shaft 3. Namely, the second clutch 20 transmits the power from the first shaft 3 to the second shaft 4, but blocks the transmission of power from the second shaft 4 to the first shaft 3. Because the second clutch 20 is structured similarly to the first clutch 10 except for an omission of the first load applying device 15, details are omitted.

The second clutch 20 has a second inner race 21 connected to the first shaft 3 and a second outer race 22 connected to the second shaft 4. The second inner race 21 is formed integrally with the first inner race 11 along the axis direction, while the second outer race 22 is formed integrally with the first outer race 12 along the axis direction. The outer diameter of the first inner race 11 is the same as that of the second inner race 21, while the first outer race 12 and the second outer race 22 are identical in inner diameter. A plurality of second sprags 23 are disposed between the second inner race 21 and the second outer race 22. The relative rotation of the second inner race 21 and the second outer race 22 causes engagement and disengagement of the second sprags 23 with and from the second inner race 21 and the second outer race 22 to switch between power transmission and power interruption. The generator motor 60 mainly includes a stator 61 and a rotor 62. The rotor 62 is connected to the ring gear 34 (second element) through the second shaft 4.

Figure 6:
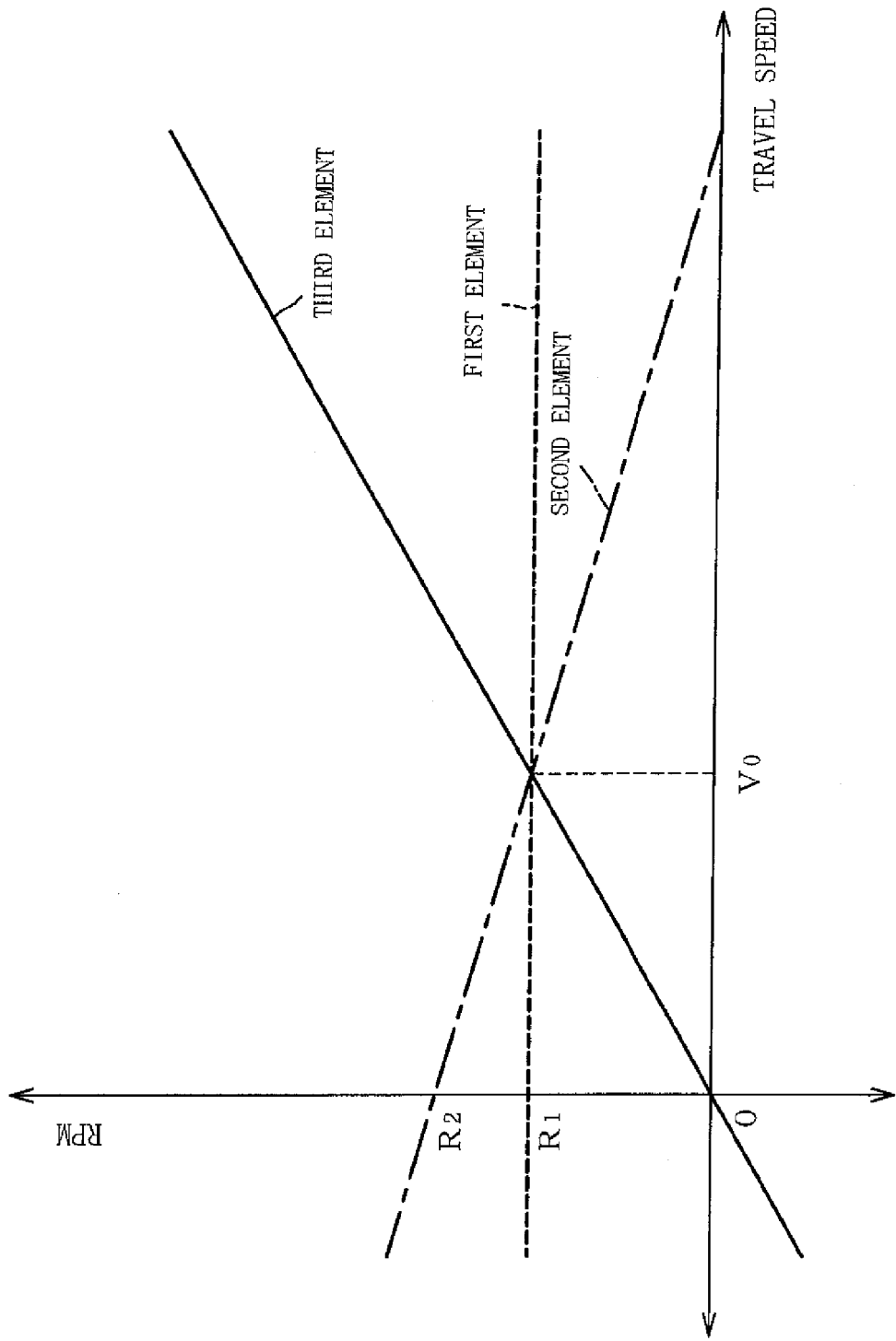
FIG. 6 is a schematic diagram showing the relationship between rpms of the first element, the second element and the third element and travel speed.

Here, the operation of the planetary gear device 30 is described with reference to FIG. 6 which shows the relationship between rpms of the first element, the second element and the third element and travel speed of the vehicle 200. The horizontal axis in FIG. 6 represents the travel speed of the vehicle 200, while the vertical axis represents the rpms of the third element, the first element and the second element. Because the rotor 62 is connected to the ring gear 34 (second element) through the second shaft 4 as illustrated in FIG. 2, the rpm of the second element becomes equal to the rpm of the rotor 62 and the rpm of the second shaft 4. Because the engine 211 is connected to the carrier 33 (first element) through the input shaft 2, the rpm of the first element becomes equal to the rpm of the input shaft 2. Further, because the first shaft 3 is connected to the sun gear 31 (third element) and the drive gear 5a, the rpm of the third element becomes equal to the rpm of the first shaft 3 and the rpm of the drive gear 5a. FIG. 6 illustrates the characteristics in which the rpm of the first element is constant relative to the travel speed of the vehicle 200, that is, the rpm of the engine 211 and input shaft 2 is constant ($R_1$).

In FIG. 6, when the rpm of the second element is 0 (the rpm of the generator motor 60 (see FIG. 2) is 0), upon reception of the power from the first element (carrier 33), the third element (sun gear 31) is made speed up (the first element<the third element) as shown in FIG. 6. If the numbers of teeth of the sun gear 31 and the ring gear 34 are represented as Za and Zc respectively, the transmission ratio becomes (Za+Zc)/Zc. On the other hand, when the second element (ring gear 34) is fixed (rpm=0) and the power from the third element (sun gear 31) is input, the first element (carrier 33) is slowed down (the first element<the third element) as shown in FIG. 6. In this manner, the drive torque of the first element (carrier 33) is increased and the transmission ratio becomes Za/(Za+Zc).

When the rpm of the second element becomes greater than 0 by the generator motor 60 (the rotor 62), the third element (sun gear 31) produces output in an arbitrary transmission gear ratio in response to the rpm of the second element (ring gear 34) as shown in FIG. 6. Further, FIG. 6 shows that, when the rpms of the second element and the first element are equally R1 (assuming that the travel speed is Vo at this time), the power of the engine 211 input to the first element is output to the third element (sun gear 31) as it is. Further, the rpm of the rotor 62 (see FIG. 2) is increased (the rpm of the second element is increased) until the rpm of the second element becomes equal to $R_2$, thereupon the rpm of the third element becomes 0. When the rpm of the second element exceeds $R_2$, the rpm of the third element becomes <0. That is, the direction of rotation of the third element (sun gear 31) is reversed.

In this connection, the rpm of the sun gear 31 (the third element) changes to the positive direction as the rpm of the carrier 33 (the first element) changes to the positive direction when the rpm of the ring gear 34 (the second element) is constant, and changes to the negative direction as the rpm of the carrier 33 (the first element) changes to the negative direction. Then, when the rpm of the carrier 33 becomes equal to or lower than a predetermined rpm, the direction of rotation of the sun gear 31 is reversed.

Returning to FIG. 2, the gearbox 212 will be described next. The gearbox 212 is a device that outputs, in an arbitrary transmission gear ratio, the power transmitted to an input shaft 5c by a drive gear 5a connected to the first shaft 3 of the power transmitting device 1 and a driven gear 5b meshing with the drive gear 5a. The gearbox 212 mainly includes the input shaft 5c to which the power is input via the driven gear 5b, an output shaft 5d arranged in parallel to the input shaft 5c, a plurality of first gear pairs 6, 7 placed on the output shaft 5d and the input shaft 5c and configured to mesh with each other for various transmission ratios, and a second gear pair 8 placed on the output shaft 5d and the input shaft 5c and meshing with each other. The power delivered to the output shaft 5d is structured to be transmitted to the rear wheels 202.

The first gear pairs 6, 7 of the gearbox 212 include drive gears 6a, 7a placed on the input shaft 5c and driven by the power transmitted to the input shaft 5c, and driven gears 6b, 7b placed on the output shaft 5d and slave-driven by the drive gears 6a, 7a. The first gear pairs 6, 7 are assigned first gear and second gear from largest transmission gear ratio (the number of driven gear teeth the number of drive gear teeth) in increasing order of distance to the driven gear. In the embodiment, the first gear pair 6 is assigned first gear and the first gear pair 7 is assigned second gear. A reverse gear pair 9 including a pinion gear is interposed between the first gear pairs 6, 7. The reverse gear pair 9 has a sliding mesh structure, in which the gear placed on the output shaft 5d is slid in the axis direction for meshing in order to allow rearward travel.

Each of the drive gears 6a, 7a forming part of the first gear pairs 6, 7 is provided integrally with the input shaft 5c. On the other hand, the driven gears 6b, 7b respectively opposing and meshing with the drive gears 6a, 7a are fixed to the output shaft 5d through fourth clutches 40 which will be described later. The fourth clutch 40 transmits power from the input shaft 5c to the output shaft 5d, but interrupts power from the output shaft 5d to the input shaft 5c. The fourth clutch 40 is structured to be able to block the transmission of power from the input shaft 5c to the output shaft 5d. Because the fourth clutch 40 is structured similarly to the first clutch 10, a detailed description thereof is omitted. The same components as those of the first clutch 10 are designated by the same reference signs and a description of such components is omitted in the following.

A fourth inner race 41 of the fourth clutch 40 is formed integrally with the output shaft 5d, while a fourth outer race 42 is formed integrally with each of the driven gears 6b, 7b. With the fourth clutch 40, the power of the engine 211 or the generator motor 60 is transmitted through the input shaft 5c and the drive gear 6a, 7a and then input from the driven gear 6b, 7b. Then, the fourth outer race 42 connected to the driven gear 6b, 7b rotates with respect to fourth sprags 43 in the lock direction (the direction of arrow Ro in FIG. 5) when viewed from the fourth inner race 41 in rotation relative to the fourth inner race 41, the fourth sprags 43 are engaged with the fourth inner race 41 and the fourth outer race 42. As a result, the output shaft 5d rotates together with the driven gear 6b, 7b to transmit the power. On the other hand, when the fourth outer race 42 rotates with respect to the fourth sprags 43 in the free direction (the opposite direction to arrow Ro in FIG. 5) when viewed from the fourth inner race 41 in rotation relative to the fourth inner race 41, the fourth sprags 43 are disengaged from the fourth inner race 41 and the fourth outer race 42, so that the driven gear 6b, 7b idles on the output shaft 5d.

After the power is transmitted to the fourth inner race 41 of the fourth clutch 40 from the output shaft 5d, when the fourth inner race 41 rotates with respect to the fourth sprags 43 in the free direction (the direction opposite to arrow Ri in FIG. 5) when viewed from the fourth outer race 42 in rotation relative to the fourth outer race 42, the fourth sprags 43 disengage from the fourth inner race 41 and the fourth outer race 42. As a result, the driven gear 6b, 7b idles on the output shaft 5d, so that the transmission of power from the output shaft 5d to the input shaft 5c is blocked. On the other hand, when the fourth inner race 41 rotates with respect to the fourth sprags 43 in the lock direction (the direction of arrow Ri in FIG. 5) when viewed from the fourth outer race 42 in rotation relative to the fourth outer race 42, the fourth sprags 43 are engaged with the fourth inner race 41 and the fourth outer race 42. As a result, the driven gear 6b, 7b rotate together with the output shaft 5d to transmit the power.

The fourth clutch 40 includes a fourth load applying device 45 structured similarly to the first load applying device 15 (see FIG. 4) of the first clutch 10, so that, even when the power is transmitted to the fourth inner race 41 or the fourth outer race 42 so as to rotate the fourth inner race 41 or the fourth outer race 42 with respect to the fourth sprags 43 in the lock direction (the direction of arrow Ri or arrow Ro in FIG. 5), the fourth sprags 43 are forcibly disengaged from the fourth inner race 41 and the fourth outer race 42 by the fourth load applying device 45. As a result, the fourth outer race 42 is able to idle so as to block the transmission of power.

The drive gear 8a forming part of the second gear pair 8 is formed integrally with the input shaft 5c through a fifth clutch 50 which will be described later. On the other hand, the driven gear 8b opposing to and meshing with the drive gear 8a is fixed to the output shaft 5d. The fifth clutch 50 transmits power from the output shaft 5d to the input shaft 5c, but blocks the transmission of power from the input shaft 5c to the output shaft 5d. The fifth clutch 50 is structured similarly to the first clutch 10 (see FIG. 5) except for an omission of the first load applying device 15, and therefore a detailed description is omitted. The same components as those of the first clutch 10 are designated by the same reference signs and a description of such components is omitted in the following.

A fifth inner race 51 of the fifth clutch 50 is formed integrally with the in shaft 5c, while a fifth outer race 52 is formed integrally with the drive gear 8a. With the fifth clutch 50, after the power of the engine 211 or the generator motor 60 is transmitted to the input shaft 5c, when the fifth inner race 51 of the fifth clutch 50 rotates with respect to fifth sprags 53 in the free direction (the direction opposite to arrow Ri in FIG. 5) when viewed from the fifth outer race 52 in rotation relative to the fifth outer race 52, the engagement of the fifth sprags 53 with the fifth inner race 51 and the fifth outer race 52 is released, so that the input shaft 5c rotates freely without engaging with the drive gear 8a, so that the transmission of power from the input shaft 5c to the output shaft 5d is blocked. On the other hand, when the fifth inner race 51 rotates with respect to the fifth sprags 53 in the lock direction (the direction of arrow Ri in FIG. 5) when viewed from the fifth outer race 52 in rotation relative to the fifth outer race 52, the fifth sprags 53 are engaged with the fifth inner race 51 and the fifth outer race 52. As a result, the input shaft 5c rotates together with the drive gear 8a so as to transmit power.

After the power is transmitted to the fifth clutch 50 from the output shaft 5d through the driven gear 8b and the drive gear 8a, the fifth outer race 52 rotates with respect to the fifth sprags 53 in the lock direction (the direction of arrow Ro in FIG. 5) when viewed from the fifth inner race 51 in rotation relative to the fifth inner race 51, and then the fifth sprags 53 are engaged with the fifth inner race 51 and the fifth outer race 52. As a result, the drive gear 8a rotates together with the input shaft 5c to transmit the power. On the other hand, when the fifth outer race 52 rotates with respect to the fifth sprags 53 in the free direction (the opposite direction to arrow Ro in FIG. 5) when viewed from the fifth inner race 51 in rotation relative to the fifth inner race 51, the fifth sprags 53 are disengaged from the fifth inner race 51 and the fifth outer race 52. As a result, the drive gear 8a idles on the input shaft 5c to block the transmission of power from the output shaft 5d to the input shaft 5c.

Figure 7A:
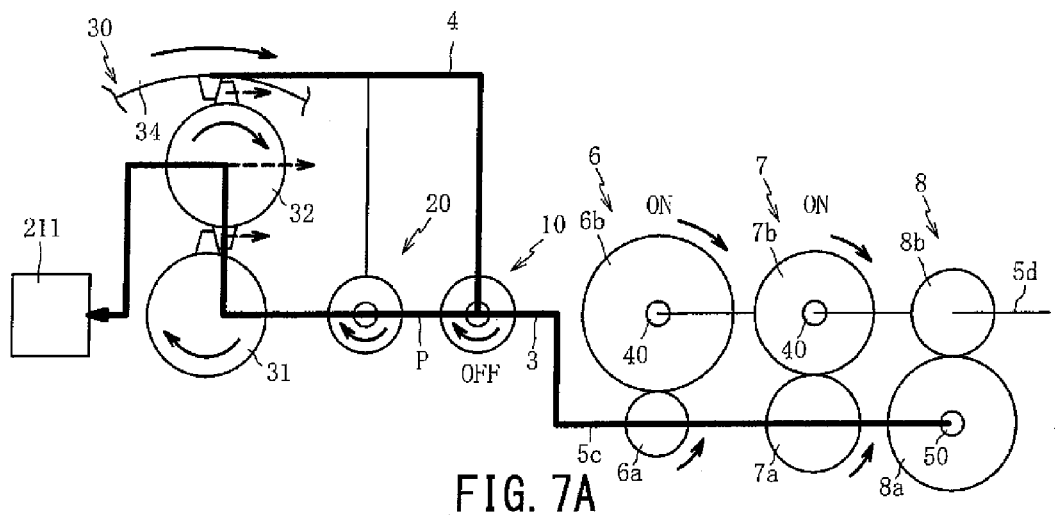
FIG. 7(a) is a schematic view schematically illustrating the internal structure of the power transmitting device and the gearbox during the start-up of the engine.
Figure 7B:
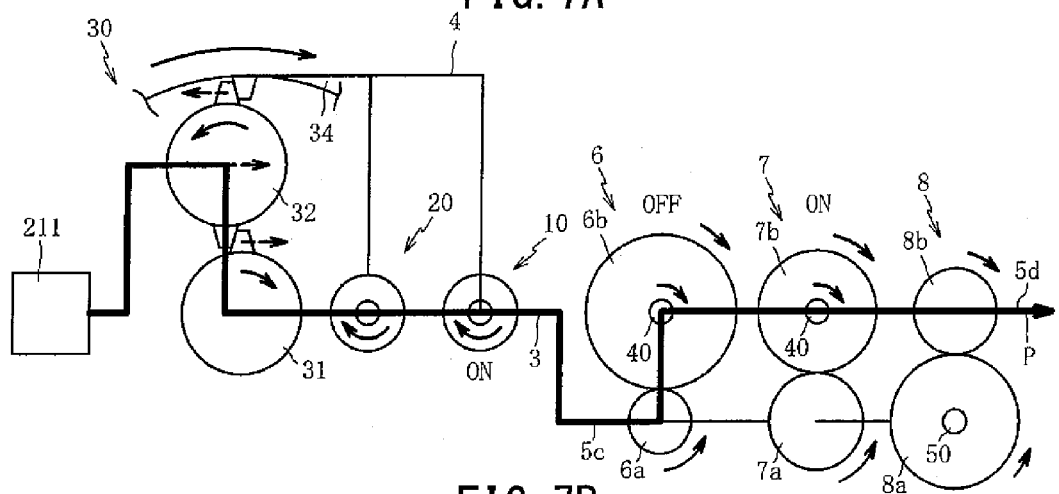
FIG. 7(b) is a schematic diagram schematically showing the internal structure of the power transmitting device and the gearbox at vehicle start (low speeds)
Figure 7C:
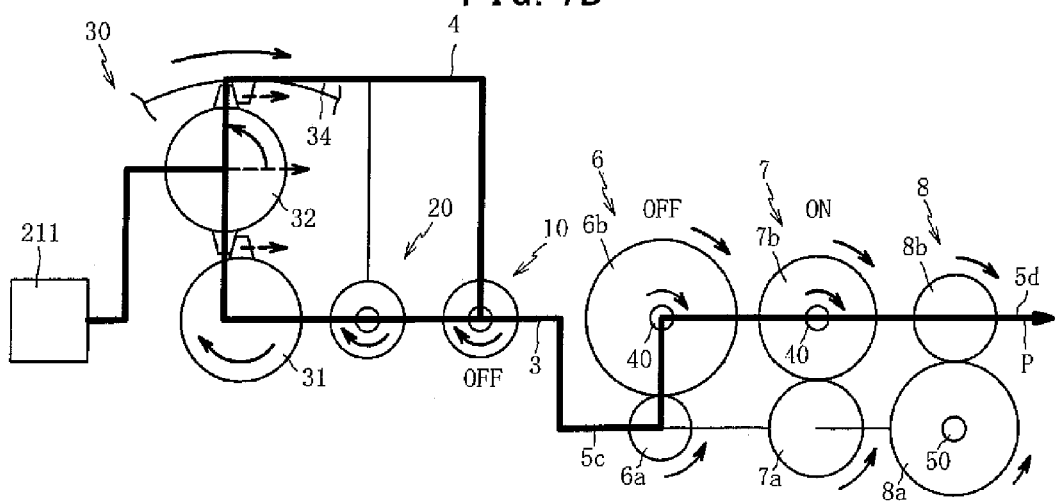
FIG. 7(c) is a schematic diagram schematically showing the internal structure of the power transmitting device and the gearbox at vehicle start (high speeds).
Figure 8A:
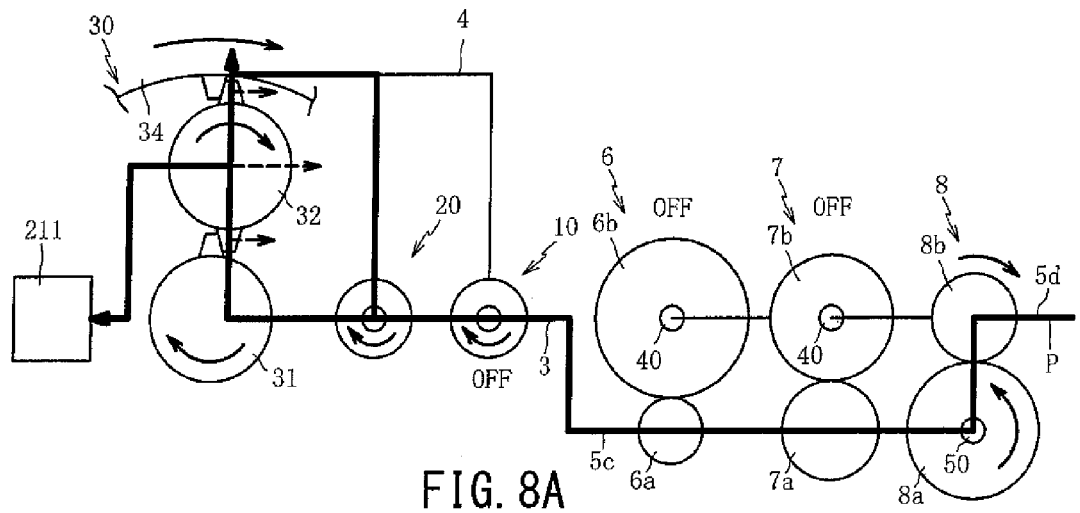
FIG. 8(a) is a schematic diagram schematically illustrating the internal structure of the power transmitting device and the gearbox during regeneration.
Figure 8B:
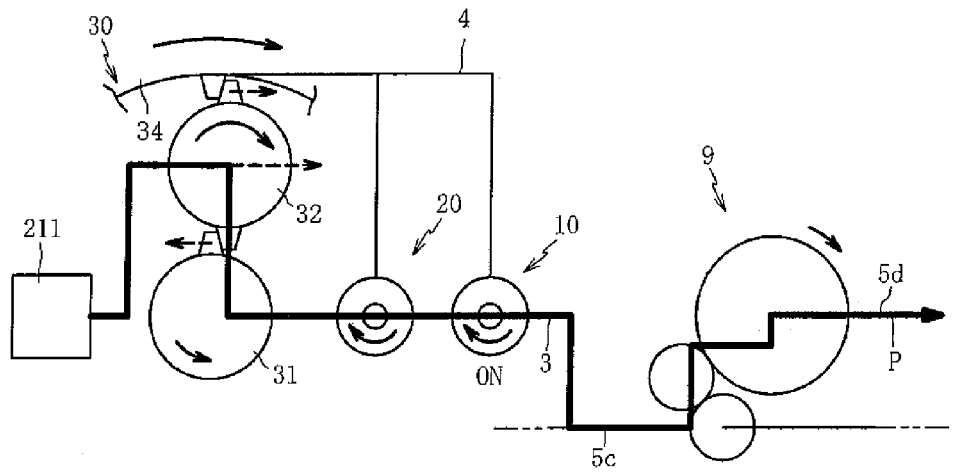
FIG. 8(b) is a schematic diagram schematically showing the internal structure of the power transmitting device and the gearbox when reverse gear is selected.
Figure 8C:
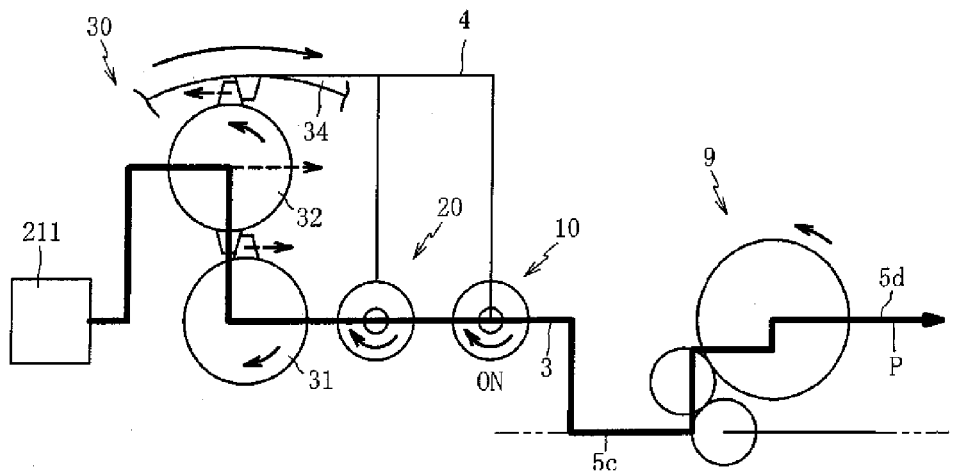
FIG. 8(c) is a schematic diagram schematically showing the internal structure of the power transmitting device and the gearbox after gear shifting into reverse.

Then, the operation of the power transmitting device 1 and the gearbox 212 in the first embodiment structured as described above will be described with reference to FIG. 7 and FIG. 8. FIG. 7 and FIG. 8 schematically show a front view of the internal structure of the power transmitting device 1 and the gearbox 212. FIG. 7 and FIG. 8 indicate power transmission line with arrows P for the sake of easy understanding, and also indicate, with an arrow (solid line), the direction of rotation of each of the ring gear 34, pinion gear 33, sun gear 31, drive gears 6a, 7a and 8a, driven gears 6b, 7b and 8b, and the first outer race 12, second outer race 22, fourth outer race 42 and the fifth outer race 52 of the first clutch 10, second clutch 20, fourth clutch 40 and the fifth clutch 50. An arrow (broken line) extending rightward from an upper portion of the opinion gear 32 (see FIG. 7(a), FIG. 7(c), FIG. 8(a), FIG. 8(b)) shows the state of the rotor 62 (see FIG. 2) driving the pinion gear 32 through the ring gear 34 in the relationship of the ring gear 34 and the pinion gear 32. An arrow (broken line) extending leftward from an upper portion of the opinion gear 32 (see FIG. 7(b), FIG. 8(c)) shows the state of the rotor 62 (see FIG. 2) applying a brake to the pinion gear 32 through the ring gear 34. An arrow (broken line) extending leftward or rightward from a lower portion of the pinion gear 32 shows the direction of rotation of the sun gear 31, while an arrow (broken line) extending rightward from the center of the pinion gear 32 shows the direction of rotation of the carrier 33 (see FIG. 2).

Sign "ON" indicates the situation where the first load applying device 15 and the fourth load applying device 45 are actuated to disengage the first sprags 13 and the fourth sprags 43 from the first inner race 11 and the first outer race 12, and the fourth inner race 41 and the fourth outer race 42. Sign "OFF" indicates the situation where the first load applying device 15 and the fourth load applying device 45 are not operated to allow engagements of the first sprags 13 and the fourth sprags 43.

As described above, in the embodiment, the first gear pairs 6, 7 are arranged from largest transmission gear ratio (the number of driven gear teeth÷the number of drive gear teeth) in increasing order of distance to the driven gear 5b (see FIG. 2). Assume that the transmission gear ratios of the first gear pairs 6, 7 and the second gear pair 8 are k1, k2 and k3 in order, the relationship of the transmission gear ratios is k1>k2>k3. The number of teeth of the driven gear 8b of the second gear pair 8 is designed to be smaller than the minimum number of gear teeth of those of the driven gears 6b, 7b of the first gear pairs 6, 7 (the number of teeth of the drive gear 7b in the embodiment). For this reason, when power is transmitted from the input shaft 5c to the output shaft 5d, assuming that the rotational speeds of the respective driven gears 6b, 7b, 8b are α1, α2, α3, each rotational speed is uniquely determined by the rotational speed of the input shaft 5c, and α1<α2<α3 is obtained from the relationship of the transmission gear ratios. The output shaft 5d rotates at rotational speed based on a shift position.

The operation of the power transmitting device 1 and the gearbox 212 during start-up of the engine 211 and starting of the vehicle 200 will be described next with reference to FIG. 7. FIG. 7(a) is a schematic view schematically illustrating the internal structure of the power transmitting device 1 and the gearbox 212 during the start-up of the engine 211.

During the start-up of the engine 211, as shown in FIG. 7(a), the first load applying device 15 (see FIG. 2) of the first clutch 10 is rendered non-operative (OFF) and the fourth load applying device 45 (see FIG. 2) of the fourth clutch 40 is rendered operative (ON). In this state, the generator motor 60 (see FIG. 2) is actuated to rotate the rotor 62, whereupon power is transmitted to the second shaft 4 and the ring gear 34. By the power transmitted to the second shaft 4, the first outer race 12 of the first clutch 10 rotates in the lock direction (the direction of arrow Ro in FIG. 5) when viewed from the first inner race 11 in rotation relative to the first inner race 11. Also, the second outer race 22 of the second clutch 20 rotates in the free direction (the direction of arrow Ro in FIG. 5) when viewed from the second inner race 21 in rotation relative to the second inner race 21. This engages the first sprags 13 with the first inner race 11 and the first outer race 12 of the first clutch 10, so as to transmit the power from the second shaft 4 to the first shaft 3. As a result, the sun gear 31 (third element) connected to the first shaft 3 rotates.

As noted above, the power of the rotor 62 (see FIG. 2) is transmitted also to the ring gear 34. Accordingly, the ring gear 34 meshes with the pinion gear 32 to rotate the sun gear 31. At this stage, because the power of the rotor 62 is transmitted through the first clutch 10 to the sun gear 31, the sun gear runs at speeds up to be equal to or greater than a transmission gear ratio of the planetary gear device 30. As a result, the carrier 33 (see FIG. 2) rotates. In this manner, the power is transmitted to the input shaft 2 connected to the carrier 33, resulting in start-up of the engine 211.

The power transmitted to the first shaft 3 is transmitted through the drive gear 5a and the driven gear 5b to the input shaft 5c of the gearbox 212. After the power is transmitted to the input shaft 5c, the driven gears 6b, 7b of the first gear pairs 6, 7 rotate so as to rotate the fourth outer races 42 (see FIG. 2) of the fourth clutches 40 and rotate the fifth inner race 51 (see FIG. 2) of the fifth clutch 50. The fourth outer race 42 of the fourth clutch 40 rotates in the lock direction (the direction of arrow Ro in FIG. 5) when viewed from the fourth inner race 41 in rotation relative to the fourth inner race 41. However, because the fourth load applying device 45 (see FIG. 2) of the fourth clutch 40 is operated (ON), the fourth outer race 42 idles on the fourth inner race 41. For this reason, the power is not transmitted to the output shaft 5d. Further, because the fifth inner race 51 (see FIG. 2) of the fifth clutch 50 rotates in the free direction (the direction opposite to arrow Ri in FIG. 5) when viewed from the fifth outer race 52 in rotation relative to the fifth outer race 52, the fifth inner race 51 rotates freely without engaging with the fifth outer race 52. Thus, the power is not transmitted to the output shaft 5d. Accordingly, it is possible to prevent the power from being transmitted to the rear wheels 202 during the start-up of the engine 211, and to use the generator motor 60 to transmit power from the input shaft 2 to the engine 211 in order to start up the engine 211 even without mounting a cell motor (starter).

Next, the operation of the power transmitting device 1 and the gearbox 212 during starting of the vehicle 200 will be described with reference to FIG. 7(b) and FIG. 7(c). FIG. 7(b) is a schematic diagram schematically showing the internal structure of the power transmitting device 1 and the gearbox 212 at vehicle start (low speeds), while FIG. 7(c) is a schematic diagram schematically showing the internal structure of the power transmitting device 1 and the gearbox 212 at vehicle start (high speeds). Assuming that low speeds refers to that the travel speed (the horizontal axis in FIG. 6) of the vehicle 200 shown in FIG. 6 is 0<travel speed<Vo and high speeds refers to travel speed≥Vo.

After the start-up of the engine 211, while the driving of the rotor 62 (see FIG. 2) is maintained, the rpm of the rotor 62 is adjusted to maintain the rpm of the ring gear 34 (second element) at a value higher (but less than $R_2$ shown in FIG. 6) than the rpm of the sun gear 31 (first element) (see FIG. 6). As a result, the rpm of the second shaft 4 (equal to the rpm of the second element) is higher than the rpm of the first shaft 3 (equal to the rpm of the third element) (see FIG. 6). As shown in FIG. 7(b), the first load applying device 15 (see FIG. 2) of the first clutch 10 is rendered operative (ON), and also the fourth load applying device 45 (see FIG. 2) of the fourth clutch 40 in the first gear pair 6 is rendered non-operative (OFF), as well as the fourth load applying device 45 (see FIG. 2) of the fourth clutch 40 in the first gear pair 7 is rendered operative (ON).

In this case, the power transmitted to the second shaft 4 causes the first outer race 12 of the first clutch 10 (see FIG. 2) to rotate in the lock direction (the direction of arrow Ro in FIG. 5) when viewed from the first inner race 11 in rotation relative to the first inner race 11. However, because the first load applying device 15 is operated, the first sprags 13 cannot engage with the first inner race 11 and the first outer race 12. Also, the second outer race 22 of the second clutch 20 rotates in the free direction (the direction opposite to arrow Ro in FIG. 5) when viewed from the second inner race 21 in rotation relative to the second inner race 21. Accordingly, the transmission of power from the second shaft 4 to the first shaft 3 is blocked.

On the other hand, the power of the engine 211 is transmitted to the carrier 33 (see FIG. 2) (the first element), and then the power is output to the sun gear 31 (the third element). The load of the generator motor 60 is increased to reduce the rpm of the rotor 62 for a reduction in rpm of the ring gear 34 (the second element) or the engine speed of the engine 211 is increased. This causes the motion state of the planetary gear device 30 (see FIG. 6) to move in the right upper direction on the line of the third element. The power transmitted to the sun gear 31 is transmitted to the first shaft 3 and then transmitted through the drive gear 5a (see FIG. 2) and the driven gear 5b to the input shaft 5c. The power from the engine 211 and the generator motor 60 is distributed as described above, thus accomplishing forward moving in variable speed conditions in hybrid mode.

After the power is transmitted to the input shaft 5c, the driven gears 6b, 7b of the first gear pairs 6, 7 rotate, so that the fourth outer races 42 (see FIG. 2) of the fourth clutches 40 and the fifth inner race 51 of the fifth clutch 50 rotate. The fourth outer races 42 of the fourth clutches 40 rotate in the lock direction (the direction of arrow Ro in FIG. 5) when viewed from the fourth inner race 41 in rotation relative to the fourth inner race 41. However, since the fourth load applying device 45 (see in FIG. 2) of the fourth clutch 40 of the first gear pair 7 is operated (ON), the fourth outer race 42 (see FIG. 2) of, the fourth clutch 40 of the first gear pair 7 idles on the fourth inner race 41 of the fourth clutch 40. On the other hand, since the fourth load applying device 45 (see in FIG. 2) of the fourth clutch 40 of the first gear pair 6 is not operated (OFF), the fourth outer race 42 (see FIG. 2) of the fourth clutch 40 of the first gear pair 6 transmits the power to the fourth inner race 41, thus rotating the output shaft 5*d*. The rotational speed of the output shaft 5*d* is α1 which is equal to the rotational speed of the driven gear 6*b* of the first gear pair 6.

On the other hand, in this event, the drive gear 8*a* is rotated through the driven gear 8*b* by the output shaft 5*d*. In the embodiment, since a transmission gear ratio (the number of driven gear teeth÷the number of drive gear teeth) k3 of the second gear pair 8 is set to be smaller than a transmission gear ratio k1 of the first gear pair 6, a rotational speed (α1·k3=k3/k1·α) of the drive gear 8*a* of the second gear pair 8 becomes smaller than the rotational speed (α) of the input shaft 5*c*. For this reason, in the fifth clutch 50, a rotational speed of the fifth outer race 52 (see FIG. 2) becomes slower than the rotational speed α of the fifth inner race 51. This is tantamount to the state in which the fifth outer race 52 relatively rotates in the free direction (the direction opposite to arrow Ro in FIG. 5). Hence, in the fifth clutch 50, the fifth sprags 53 cannot engage with the fifth inner race 51 and the fifth outer race 52, so that the fifth outer race 52 idles on the fifth inner race 51. In this manner, the rotation (rotational speed α1) of the output shaft 5*d* is transmitted to the rear wheels 202 (see FIG. 1), allowing the Vehicle 200 to move forward.

When the vehicle 200 is made move forward and then a rpm of the second shaft 4 becomes equal to the rpm ($R_1$) of the first shaft 3 (see FIG. 6), the first load applying device 15 (see FIG. 2) of the first clutch 10 is rendered non-operative (OFF) as illustrated in FIG. 7(*c*). Note that the fourth load applying device 45 of the fourth clutch 40 is maintained in the state shown in FIG. 7(*b*).

When the rpms of the first shaft 3 and the second shaft 4 are the same, the rpms of the first inner race 11 and the first outer race 12 of the first clutch 10 become equal to each other. Under this condition, if the first load applying device 15 (see FIG. 2) is rendered non-operative, the first sprags 13 are engaged with the first inner race 11 (see FIG. 5) and the first outer race 12, so that power is transmitted from the second shaft 4 to the first shaft 3. Because there is no difference in speed between the first inner race 11 and the first outer race 12 when the first sprags 13 engage with them, no inertial torque is produced, thereby avoiding shock.

After the first load applying device 15 has been rendered non-operative, when the rpm of the third element (the sun gear 31) exceeds the rpm of the second element (the ring gear 34) (when travel speed>V0 shown in FIG. 6), the rpm of the first shaft 3 connected to the sun gear 31 exceeds the rpm of the second shaft 4 connected to the ring gear 34. In the first clutch 10 at this time, the first inner race 11 rotates in the free direction when viewed from the first outer race 12 in rotation relative to the first outer race 12 (see FIG. 5). As a result, the first sprags 13 tilt in the anti-self lock direction, so that the transmission of power from the first shaft 3 to the second shaft 4 is blocked at the first clutch 10. As a result, the power of the engine 211 is transmitted from the first shaft 3 to the drive gear 5*a* (see FIG. 2), thus achieving forward travel using the power of the engine 211.

On the other hand, in the second clutch 20, the second inner race 21 rotates in the lock direction in rotation relative to the second outer race 22. As a result, the second sprags 23 are engaged with the second inner race 21 and the second outer race 22, so that power is transmitted from the second inner race 21 to the second outer race 22, that is, from the first shaft 3 to the second shaft 4. Consequently, the generator motor 60 can be functioned as a generator to regenerate the electric power as a power source.

Then, the power transmitted to the drive gear 5*a* (see FIG. 2) is transmitted through the driven gear 5*b* to the input shaft 5*c* to be input to the gearbox 212. In the gearbox 212, as illustrated in FIG. 7(*c*), since the fourth load applying device 45 (see FIG. 2) of the fourth clutch 40 in the first gear pair 6 is in the non-operative state (OFF), while the fourth load applying device 45 (see FIG. 2) of the fourth clutch 40 in the first gear pair 7 is in the operative state (ON), the power is transmitted through the first gear pair 6 to the output shaft 5*d* as described earlier.

Then, for upshifting, the operation of the fourth load applying device 45 (see FIG. 2) of the fourth clutch 40 of the first gear pair 7 higher than the first gear pair 6 is stopped (OFF). As a result, similarly to the fourth clutch 40 of the first gear pair 6, in the fourth clutch 40, the fourth sprags 43 engage with the fourth inner race 41 (see FIG. 2) and the fourth outer race 42.

In this connection, since the rotational speed α2 of the driven gear 7*b* of the first gear pair 7 is faster than the rotational speed α1 of the driven gear 6*b* of the first gear pair 6 (α1<α2), the rotational speed α2 of the driven gear 7*b* exceeds the rotational seed (α1) of the output shaft 5*d*. Thus, in the fourth clutch 40 of the first gear pair 7, the fourth outer race 42 (see FIG. 2) rotates in the lock direction (the direction of arrow Ro in FIG. 5) when viewed from the fourth inner race 41 in rotation relative to the fourth inner race 41. As a result, the power is transmitted from the fourth outer race 42 toward the fourth inner race 41, so that the driven gear 7*b* rotates together with the output shaft 5*d*, the output shaft 5*d* rotating at the rotational speed α2.

On the other hand, the rotational speed (α1) of the driven gear 6*b* of the first gear pair 6 becomes slower than the rotation speed (α2) of the output shaft 5*d* (α1<α2). Thus, in the fourth clutch 40 of the first gear pair 6, the rotational speed of the fourth outer race 42 becomes slower than the rotational speed of the fourth inner race 41. This results in the state in which the fourth inner race 41 relatively rotates in the free direction (the direction opposite to arrow Ri in FIG. 5). Hence, in the fourth clutch 40 of the first gear pair 6, the fourth sprags 43 cannot engage with the fourth inner race 41 and the fourth outer race 42. As a result, the driven gear 6*b* idles on the output shaft 5*d* so as to transmit no power. Also, through the driven gear 8*b* integrated with the output shaft 5*d*, the fifth outer race 52 (see FIG. 22) of the fifth clutch 50 rotates in the free direction (the direction opposite to arrow Ro in FIG. 5) when viewed from the fifth inner race 51 in rotation relative to the fifth inner race 51, so that the fifth outer race 52 idles on the fifth inner race 51 so as to transmit no power.

In this manner, when the gearbox 212 upshifts, the shifting gear can be accomplished only by stopping the operation of the fourth load applying device 45 of the fourth clutch 40 of the higher first gear pair 7, without any operation for lower gears (the first gear pair 6 in the embodiment). Further, in the fourth clutch 40 of the first gear pair 7, the fourth sprags 43 are tilted in the self lock direction by stopping the operation of the fourth load applying device 45, so that the relative rotation of the fourth inner race 41 and the fourth outer race 42 in a certain direction of rotation is instantaneously restricted. Accordingly, a reduction in time required for switching is achieved, thus enabling quick gear shifting. Further, because of a reduced time required for switching, idling of the fourth inner race 41 and the fourth outer race 42 do not occur from the state of transmitting no power to the state of transmitting power, leading to prevention of shock during gear shifting.

Further, because gear shifting is achieved simply by switching between the operative state and the non-operative state of the fourth load applying device 45 of the fourth clutch 40, the gearbox 212 does not require a complicated engaging mechanism, a shift fork or the like, thus achieving reductions in weight and size. This enables incorporation of a plurality of first gear pairs into limited space of the gearbox 212, and therefore, for example, a multi-speed power transmitting device 1 with six or more gear pairs can be achieved.

Incidentally, as to an idle reduction or idle-stop (the operation of the engine 211 is shut down when the vehicle comes to a stop at a traffic light or the like while moving, in order to reduce the amount of fuel consumed and the emission of exhaust gas), performing the aforementioned sequence of engine start-up and vehicle start allows the vehicle 200 to start moving in a short time after the idle reduction. Specifically, the fourth load applying devices 45 of the fourth clutches 40 in the first gear pairs 6, 7 are operated (the state of blocking the transmission of power), and then the engine 211 is started up (see FIG. 7(a)). Then, after the engine 211 has started up, the fourth load applying device 45 of the fourth clutch 40 in the first gear pair 6 is rendered non-operative (the transmission of power is allowed) (see FIG. 7(b)), thus starting the vehicle 200 moving. Because of the unnecessity of engagement/disengagement operation of a main clutch, it is possible to speedily start a vehicle moving.

Next, the power transmitting device 1 and the gearbox 212 in regeneration caused during coasting or braking will be described with reference to FIG. 8(a) which shows the internal structure of the power transmitting device 1 and the gearbox 212 during regeneration. FIG. 8(a) illustrates the state after upshifting, that is, in which both the fourth load applying devices 45 of the fourth clutches 40 in the first gear pairs 6, 7 are rendered non-operative (OFF).

In regeneration, the first load applying device 15 (see FIG. 2) of the first clutch 10 is rendered non-operative (OFF) as shown in FIG. 8(a). While the accelerator (not shown) is not operated, as shown in FIG. 8(a), power is input from the output shaft 5d (assuming that the rotational speed is α2) to the gearbox 212. As a result, the power is transmitted from the output shaft 5d through the driven gear 8b of the second gear pair 8 to the drive gear 8a, and then to the fifth outer race 52 (see FIG. 2) of the fifth clutch 50.

In this regard, a rotational speed of the fifth outer race 52 (see FIG. 2) integrated with the drive gear 8a is k3·α2 because a transmission gear ratio of the second gear pair 8 is k3 and the rotational speed of the driven gear 8b is α2. On the other hand, since the fifth inner race 51 of the fifth clutch 50 does not receive a drive force from the input shaft 5c, the rotational speed of the fifth inner race 51 is slower than the rotational speed of the drive gear 8a. As a result, the fifth outer race 52 rotates in the lock direction (the direction of arrow Ro in FIG. 5) when viewed from the fifth inner race 51 in rotation relative to the fifth inner race 51, so that the fifth sprags 53 are engaged with the fifth outer race 52 and the fifth inner race 51. As a result, the power is transmitted from the fifth outer race 52 of the fifth clutch 50 toward the fifth inner race 51, so that the drive gear 8a rotates together with the input shaft 5c (rotational speed k3·α2). With the rotation of the drive gear 8a, the input shaft 5c rotates, and also the drive gears 6a, 7a of the first gear pairs 6, 7 rotate (rotational speed k3·α2).

As a result, the power is transmitted to the driven gears 6b, 7b meshing with the drive gears 6a, 7a of the first gear pairs 6, 7, so that the driven gears 6b, 7b rotate at speeds according to their transmission gear ratios. A rotational speed β1 of the driven gear 6b is k3/k1·α2, while a rotational speed β2 of the driven gear 7b is k3/k2·α2. From k1>k2>k3, the rotational speeds β1, β2 of the driven gears 6b, 7b become both smaller than α2.

On the other hand, because the rotational speed of the output shaft 5d is α2, in the fourth clutch 40 of the first gear pair 7 the fourth inner race 41 (see FIG. 2) rotates at a speed α2. Therefore, in the fourth clutch 40 of the first gear pair 7, the rotational speed of the fourth inner race 41 is faster than the rotational speed of the fourth outer race 42, which is tantamount to the state in which the fourth inner race 41 relatively rotates in the free direction (the direction opposite to arrow Ri in FIG. 5). This is the same as the case for the first gear pair 6. Hence, in the fourth clutches 40 of the first gear pairs 6, 7, the fourth sprags 43 cannot engage with the fourth inner race 41 and the fourth outer race 42. As a result, the fourth load applying devices 45 of the fourth clutches 40 of the first gear pairs 6, 7 are not operated (OFF), so that the power cannot be transmitted from the output shaft 5d to the input shaft 5c.

The power transmitted to the input shaft 5c is transmitted through the driven gear 5d (see FIG. 2) and the drive gear 5a to the first shaft 3. After the power is transmitted to the first shaft 3, in the first clutch 10, the first inner race 11 (see FIG. 2) rotates in the free direction (the direction opposite to arrow Ri in FIG. 5) when viewed from the first outer race 12 in rotation relative to the first outer race 12, so that the transmission of power is blocked. In the second clutch 20, the second inner race 21 (see FIG. 2) rotates in the lock direction (the direction of arrow Ri in FIG. 5) when viewed from the second outer race 22 in rotation relative to the second outer race 22.

For this reason, the second inner race 21 of the second clutch 20 rotates together with the second outer race 22 so as to transmit the power as shown in FIG. 8(a). By the rotation of the second outer race 22 of the second clutch 20, the second shaft 4, the ring gear 34 and the rotor 62 (see FIG. 2) rotate. As a result, the power input from the output shaft 5d is used for the generator motor 60 to function as an electric power generator. Thus, the electric power generated by the generator motor 60 can be used as a power source. On the other hand, the power transmitted to the first shaft 3 rotates the sun gear 31 (third element) connected to the first shaft 3 as shown in FIG. 8(a), and further, rotates the carrier 33 (see FIG. 2). By the rotation of the carrier 33, the power is input to the engine 211, providing engine braking.

Next, the operation of the power transmitting device 1 and the gearbox 212 when backing up the vehicle 200 will be described in reference with FIG. 8(b) and FIG. 8(c). FIG. 8(b) is a schematic diagram schematically showing the internal structure of the power transmitting device 1 and the gearbox 212 when reverse gear is selected, while FIG. 8(c) is a schematic diagram schematically showing the internal structure of the power transmitting device 1 and the gearbox 212 after gear shifting into reverse.

Upon selection of reverse gear, the first load applying device 15 (see FIG. 2) of the first clutch 10 of the power transmitting device 1 is actuated (ON) as shown in FIG. 8(b). Then, the motor 60 is driven to rotate the third element (ring gear 34) at a higher rpm than $R_2$ (see FIG. 6). As a result, as shown in FIG. 6 and FIG. 8(b), the third element (sun gear 31) rotates in the direction opposite to the direction of rotation for moving forward the vehicle 200 (the direction of rotation of the sun gear 31 shown in FIG. 8(a)) (the third element rpm<0 in FIG. 6), and the first shaft 3 rotates also in the direction opposite to the direction of rotation for moving forward the vehicle 200.

At this time, power is transmitted to the second shaft 4 by driving the rotor 62 (see FIG. 2), so that the first outer race 12

(see FIG. 5) of the first clutch 10 rotates in the lock direction when viewed from the first inner race 11 in rotation relative to the first inner race 11. However, because the first load applying device 15 (see FIG. 2) is in operation, the transmission of power from the second shaft 4 to the first shaft 3 is blocked in the first clutch 10.

Also, the first shaft 3 rotates in the direction opposite to the rotation direction when moving forward the vehicle 200, so that in the second clutch 20 the second inner race 21 attempts to rotate slightly in the lock direction. However, since the rpm of the second outer race 22 caused by the second shaft 4 is higher than the rpm of the second inner race 21 (the absolute value of the rpm of the second element is larger than the absolute value of the rpm of the third element in a range of travel speed<Vo in FIG. 6), the second outer race 22 rotates in the free direction when viewed from the second inner race 21 in rotation relative to the second inner race 21. Accordingly, the transmission of power from the second shaft 4 from the first shaft 3 is blocked also in the second clutch 20.

Upon selection of reverse gear, in the gearbox 212, the reverse gear pair 9 makes a connection between the input shaft 5c and the output shaft 5d as shown in FIG. 8(b). At this stage, since the first shaft 3 rotates in the direction opposite to that when the vehicle 200 moves forward, in spite of reverse gear being selected, the output shaft 5d rotates in the same direction as that when the vehicle 200 moves forward (the rotation direction of the output shaft 5d shown in FIG. 8(b) is the same as the rotation direction of the output shaft 5d shown in FIG. 8(a). That is the rotation direction of the output shaft 5d is not changed between when the vehicle 200 moves forward and when reverse gear is selected.

In this manner, since the output shaft 5d can be structured to rotate in the same direction before and after the gear shifting from forward to reverse of the vehicle 200, the gearbox 212 is able to mesh the reverse gear pair 9 without gear rattle provided that at least rpms are commensurate with each other, even without mounting a synchronous mesh mechanism. Even when a synchronous mesh mechanism is mounted in the gearbox 212 in order to improve operability, a size reduction and simplification of the synchronous mesh mechanism can be achieved, leading to a size reduction and simplification of the gearbox 212. Further, with the size reduction and the simplification of the synchronous mesh mechanism, the amount of energy consumption required for operation of the synchronous mesh mechanism can be reduced.

After meshing of the reverse gear pair 9 (after gear shifting into reverse), the rpm of the generator motor 60 (see FIG. 2) is reduced in order to reduce the rpm of the second element (ring gear 34) to an arbitrary rpm ranging from $R_1$ to $R_2$ (see FIG. 6). Thus, the rotation direction of the third element (sun gear 31) rotating in the direction opposite to that when the vehicle 200 moves forward is changed to the normal direction (the rotation direction when the vehicle 200 moves forward) (the third element rpm>0 in FIG. 6). As a result, as shown in FIG. 8(c), the rotation direction of the output shaft 5d is changed from the rotation direction in FIG. 8(b) and the vehicle 200 starts moving backward.

Figure 9:
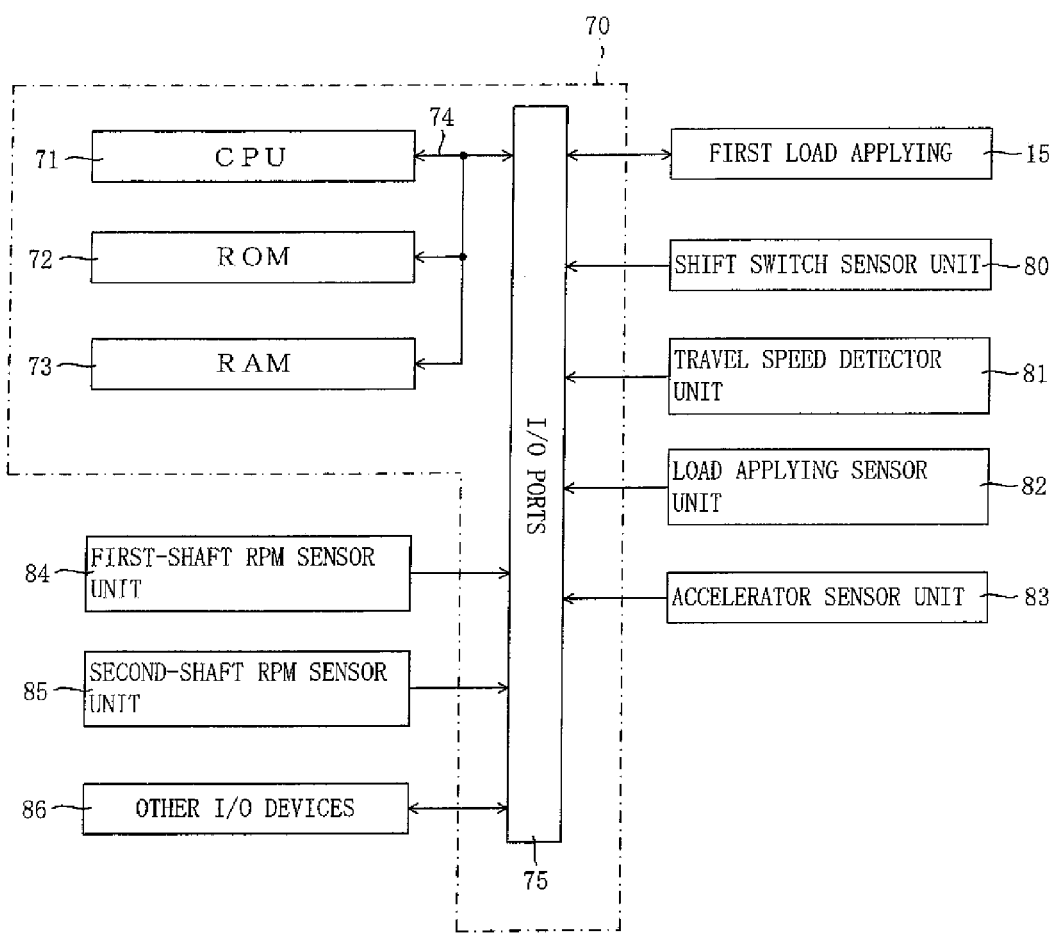
FIG. 9 is a block diagram illustrating the electrical configuration of the control unit of the power transmitting device.

Next, the electrical configuration of a control unit 70 of the power transmitting device 1 will be described with reference to the block diagram of FIG. 9. The control unit 70 includes a CPU 71, a ROM 72 and a RAM 73 which are connected to I/O ports 75 through a bus line 74. The devices, such as the first load applying device 15 and the like, are connected to the I/O ports 75.

The CPU 71 is operational equipment for controlling parts connected through the bus line 74 to it. The ROM 72 is a non-rewritable, nonvolatile memory storing fixed value data and the like of a control program (for example, a program using the flowchart shown in FIG. 10) and the like which are executed by the CPU 71. The RAM 73 is a memory for storing in a rewritable manner various data used for executing the control program.

A shift switch sensor unit 80 detects presence or absence of upshifting operation or downshifting operation of the driver, and sends the detection result to the CPU 71. In the embodiment, the shift switch sensor 80 mainly includes a sequential switch built in a shift lever (not shown), and an output circuit (not shown) processing a signal output from the sequential switch and outputting the signal to the CPU 71.

A travel speed detector unit 81 detects a pulse which is proportional to a rotational speed of an axle, and sends the detection result to the CPU 71. The CPU 71 obtains a travel speed of the vehicle 200 from the detection result received from the travel speed detector unit 81.

A load applying sensor unit 82 detects operation (ON) or non-operation (OFF) of the first load applying device 15, and sends the detection result to the CPU 71, and mainly includes load applying sensors (not shown) respectively detecting operation (ON) and non-operation (OFF) of the first load applying device 15, and an output circuit (not shown) processing the detection result of each of the load applying sensors and outputting it to the CPU 71.

An accelerator sensor unit 83 detects the amount of depression of an accelerator (not shown) and an accelerator depression speed, and sends the detection result to the CPU 71, and mainly includes an angle sensor (not shown) detecting the amount of accelerator depression, an angular speed sensor (not shown) detecting an accelerator depression speed, and an output circuit (not shown) processing the detection results from the angle sensor and/or the angular speed sensor and outputting them to the CPU 71.

A first-shaft rpm sensor unit 84 and a second-shaft rpm sensor unit 85 detect rpms of the first shaft 3 (see FIG. 2) and the second shaft 4, and send the detection results to the CPU 71, and mainly include rpm sensors (not shown), and output circuits (not shown) each of which processes the detection result from the rpm sensor and outputting it to the CPU 71.

Examples of other I/O devices 86 shown in FIG. 8, include an acceleration sensor detecting an acceleration of the vehicle 200 and the like. The CPU 71 can take account of the detection result on acceleration of the vehicle 200 to determine whether or not an acceleration request is made.

Next, power transmission control processing in the control unit 70 of the power transmitting device 1 will be described with reference to the flowchart of FIG. 10. The processing is executed repeatedly (for example, every 0.2 ms) by the CPU 71 during the turning-on of the power to the control unit 70.

For the power transmission control processing, the CPU 71 acquires rpms of the first shaft 3 and the second shaft 4 when starting moving the vehicle 200 (see FIG. 7(b))(S1). In the process, the detection results of the first-shaft rpm sensor unit 84 (see FIG. 9) and the second-shaft rpm sensor unit 85 are used as described above. The starting of the vehicle 200 moving is detected by use of each of the detection results of the shift switch sensor unit 80, the travel speed detection unit 81 and the accelerator sensor unit 83.

Then, the CPU 71 performs a comparison between the rpm of the first shaft 3 and the rpm of the second shaft 4 (S2). As a result, if determining that the rpm of the first shaft 3 and the rpm of the second shaft 4 are in disagreement with each other (S2: No), the CPU 71 actuates the first load applying device 15 (ON), and then terminates the power transmission control processing. When the rpm of the first shaft 3 is lower than the rpm of the second shaft 4, the first load applying device 15 is operated to block the transmission of power from the second shaft 4 to the first shaft 3 in order to prevent the planetary gear device 30 from being affected by the first clutch 10.

When the rpm of the first shaft 3 is higher than the rpm of the second shaft 4, in the first clutch 10 the first inner race 11 rotates in the free direction when viewed from the first outer race 12 (see FIG. 5) in rotation relative to the first outer race 12, so that the first sprags 13 are tilted in the anti-self lock direction. As a result, the transmission of power from the first shaft 3 to the second shaft 4 is blocked without operating the first load applying device 15.

On the other hand, when it is determined, as a result of the process S2, that the rpm of the first shaft 3 and the rpm of the second shaft 4 are in agreement with each other (S2: Yes), the first load applying device 15 is rendered non-operative (OFF) and the power transmission control processing is terminated. This makes it possible to prevent shock from being produced when the operation of the first load applying device 15 is switched, and prevent energy loss. In other words, when the rpm of the first shaft 3 is equal to the rpm of the second shaft 4, the first inner race 11 and the first outer race 12 of the first clutch 10 (see FIG. 5) become equal in rpm. At this stage, the first load applying device 15 (see FIG. 2) is rendered non-operative. Thereupon, the first sprags 13 engage with the first inner race 11 and the first outer race 12, but there is no speed difference between the first inner race 11 and the first outer race 12. This makes it possible to prevent inertial torque from being produced when the first sprags 13 engage, resulting in avoidance of shock. After the first load applying device 15 is rendered non-operative, the engine speed of the engine 211 is increased, so that the rpm of the first shaft 3 exceeds the rpm of the second shaft 4. Thereupon, the first sprags 13 tilt in the anti-self lock direction, so that the transmission of power from the first shaft 3 to the second shaft 4 is blocked. Accordingly, energy loss caused by the transmission of power from the first shaft 3 to the second shaft 4 can be avoided. Further, since the first load applying device 15 is rendered non-operative when the rpm of the first shaft 3 is equal to or higher than the rpm of the second shaft 4, it is possible to shorten the operating time of the first load applying device 15, leading to minimization of energy loss produced by operation of the first load applying device 15.

Figure 10:
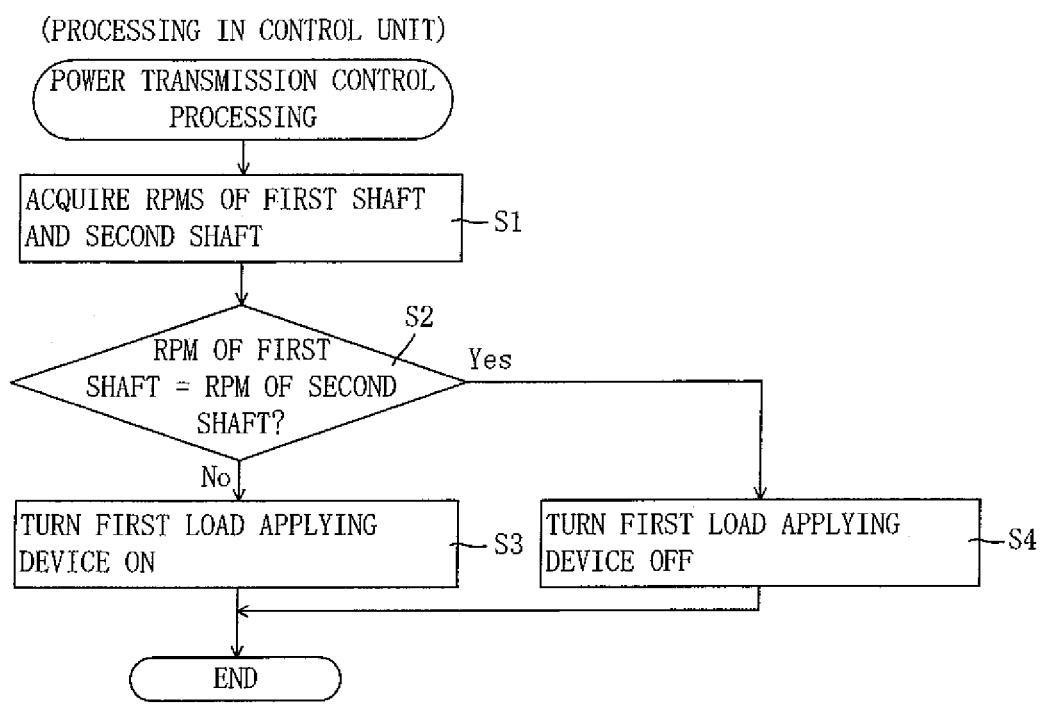
FIG. 10 is a flowchart showing the power transmission control processing.

Note that, in the flowchart (power transmission control processing) shown in FIG. 10, the process in S1 corresponds to the first shaft rpm acquiring means and second shaft rpm acquiring means described in the pending claims, the process in S2 corresponds to rpm determining means and the process in S4 corresponds to load controlling means.

Next, a power transmitting device 101 in a second embodiment according to the present invention will be described with reference to FIG. 11. The first embodiment includes the planetary gear device 30 of the power transmitting device 1 including a single sun gear 31, a single ring gear 34 and a single carrier 33. However, the second embodiment includes a planetary gear device 130 which is a complex planetary gear mechanism, having two sun gears 131, 132 which are coupled to each other by pinion gears 133. The same components as those in the first embodiment are designated by the same reference signs and the description of such components is omitted.

Figure 11:
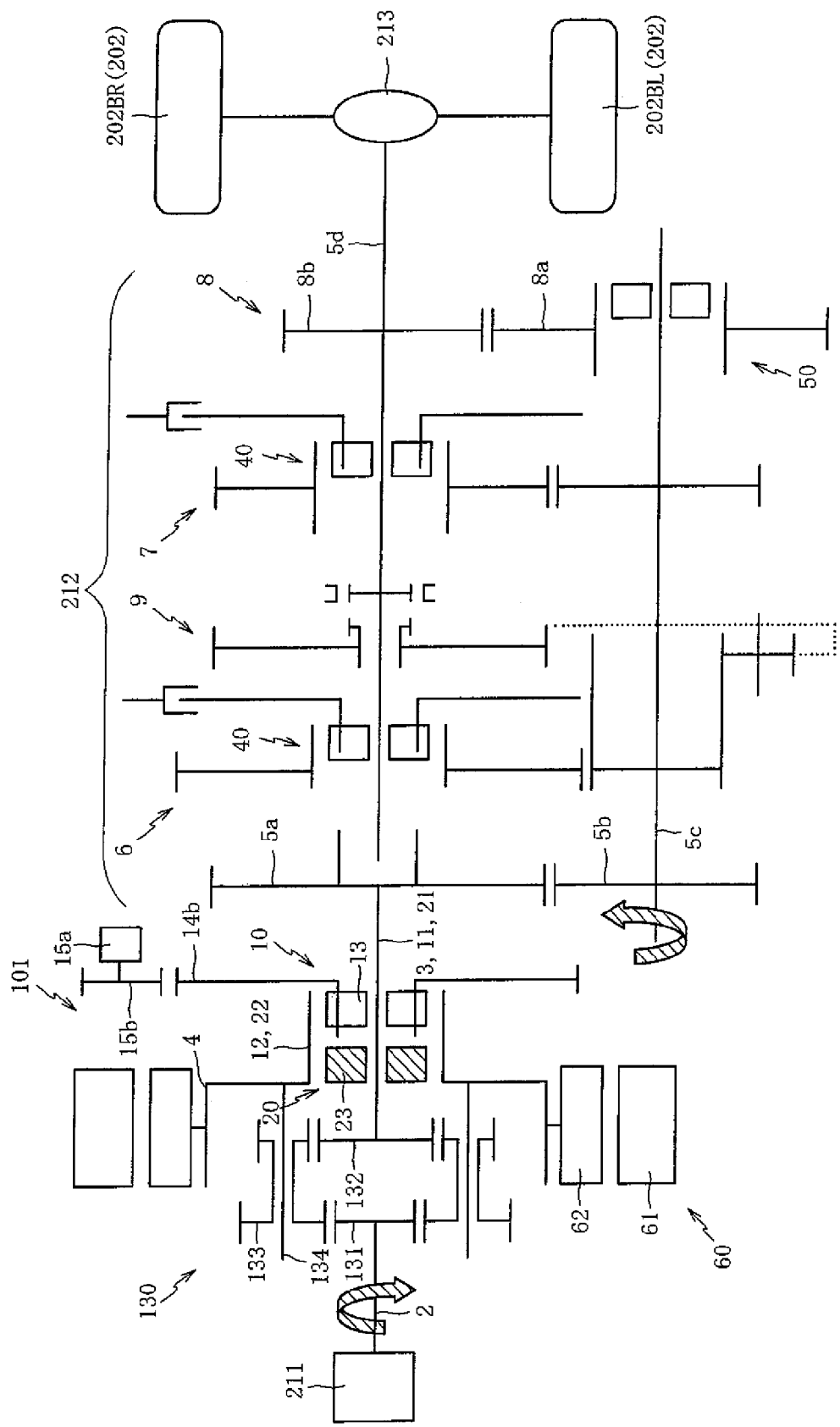
FIG. 11 is a schematic diagram schematically showing the power transmitting device and the gearbox in the second embodiment.

FIG. 11 is a schematic diagram schematically showing the power transmitting device 101 and the gearbox 212 in the second embodiment. The planetary gear device 130 includes a first sun gear 131, a second sun gear 132 placed at a predetermined distance from the first sun gear 131, and a carrier 134 rotatably supporting a plurality of pinion gears 133 which mesh with the outer periphery of the first sun gear 131 and the second sun gear 132. In the embodiment, the first sun gear 131 is connected to the input shaft 2 to which the power of the engine 211 is input, which forms a first element. Also, the carrier 134 is connected to the rotor 62 of the generator motor 60, which forms a second element. Further, the second sun gear 132 is connected to the first shaft 3 transmitting power toward the gearbox 212, which forms a third element. Note that the operation of the power transmitting device 101 in the second embodiment is similar to the operation of the power transmitting device 1 in the first embodiment, and the description thereof is omitted.

Next, a third embodiment will be described with reference to FIG. 12. The first embodiment is directed to the power transmitting device 1 structured such that the first shaft 3 is connected to the sun gear 31 of the planetary gear device 30 which includes the carrier 33 (first element), the ring gear 34 (second element) and the sun gear 31 (third element), the second shaft 4 is connected to the ring gear 34, the first outer race 12 of the first clutch 10 and the second outer race 11 of the second clutch 20 are formed integrally with the second shaft 4, and the first inner race 11 of the first clutch 10 and the second inner race 21 of the second clutch 20 are formed integrally with the first shaft 3.

In comparison with this, the power transmitting device 301 in the third embodiment is similar to the first embodiment in that a carrier 333 (first element), a ring gear 334 (second element), a sun gear 331 (third element) and pinion gears 332 meshing with the sung gear 331 and the ring gear 334 are provided, that the first shaft 3 is connected to the sun gear 331 of a planetary gear device 330, and that the first outer race 12 of the first clutch 10 and the second outer race 22 of the second clutch 20 are formed integrally with the second shaft 4, and the first inner race 11 of the first clutch 10 and the second inner race 21 of the second clutch 20 are formed integrally with the first shaft 3, but differs from the first embodiment in that the second shaft 4 is connected to the carrier 333.

Figure 12:
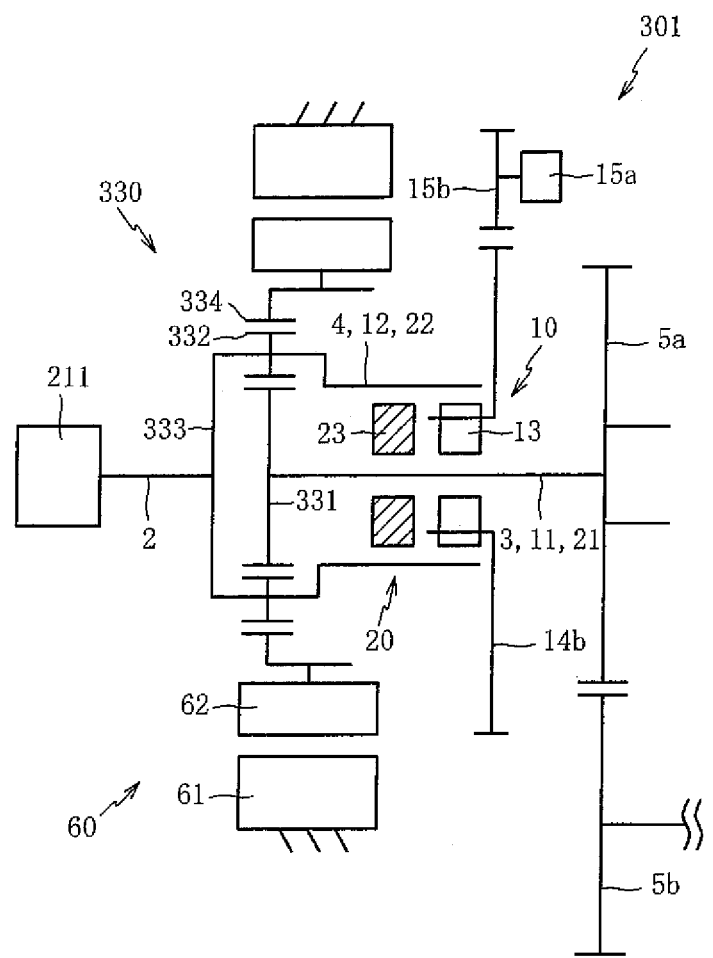
FIG. 12 is a schematic diagram schematically showing the power transmitting device in the third embodiment.

FIG. 12 is a schematic diagram schematically showing the internal structure of the power transmitting device 301 in the third embodiment. The same components as those in the first embodiment are designated by the same reference signs and the description of such components is omitted. FIG. 12 shows only the structure for performing the function of transmitting power for easier understanding. The gearbox 212 shown in FIG. 2 is omitted in FIG. 12.

The power transmitting device 301, which is mounted on the vehicle 200 (see FIG. 1), mainly includes the planetary gear device 330 connected to the input shaft 2 transmitting the power of the engine 211, and the first clutch 10 and the second clutch 20 which are placed on a power line from the planetary gear device 330 to the gear box (not shown), as shown in FIG. 12. Note that the relationship between rpms of the first element, the second element and the third element of the planetary gear device 330 and a travel speed of the vehicle 200 is similar to that shown in FIG. 6, and the description thereof is omitted.

The first clutch 10 is provided for transmitting and interrupting power between the second shaft 4 connected to the carrier 333 (first element) and the first shaft 3 connected to the sun gear 331. The first clutch 10 is structured to transmit, in an interruptible manner, power received from the second shaft 4 to the first shaft 3, but to block transmission of power from the first shaft 3 to the second shaft 4. The second clutch 20 is provided for transmitting and interrupting power between the second shaft 4 and the first shaft 3, and is structured to transmit the power received from the first shaft 3 to the second shaft 4, but block the transmission of power from the second shaft 4 to the first shaft 3.

Next, the operation of the power transmitting device 301 during start-up of the engine 211 will be described. For start-up of the engine, the first load applying device 15 of the first clutch 10 is rendered non-operative (OFF). In this condition, upon actuation of the generator motor 60 to rotate the rotor 62, the power is transmitted to the ring gear 334 (second element). As shown in FIG. 6, as the rpm of the second element (ring gear 334) of the planetary gear device 330 increases in the positive direction, the rpm of the third element (sun gear 331) increases in the negative direction. Because of this, the power transmitted to the ring gear 334 rotates the sun gear 331 to rotate the first shaft 3. The power transmitted to the first shaft 3 causes the second inner race 21 of the second clutch 20 to rotate in the lock direction (the direction of arrow Ri in FIG. 5) when viewed from the second outer race 22 in rotation relative to the second outer race 22. On the other hand, the first inner race 11 of the first clutch 10 rotates in the free direction (the direction opposite to arrow Ri in FIG. 5) when viewed from the first outer race 12 in rotation relative to the first outer race 12.

This causes the second sprags 23 to engage with the second inner race 21 and the second outer race 22 of the second clutch 20 so as to transmit the power from the first shaft 3 to the second shaft 4. As a result, the carrier 333 (first element) connected to the second shaft 4 rotates. Thus, the power is transmitted to the input shaft 2 connected to the carrier 333 to start up the engine 211. After the start-up of the engine 211, as in the case described in the first embodiment, forward movement and backward movement of the vehicle 200 (see FIG. 1), up-shifting, down-shifting, coasting and regeneration can be performed. In the power transmitting device 301 in the third embodiment, power switching between the engine 211 and the motor 60 can be provided by use of the first clutch 10 to switch between transmission and interruption of power flowing from the second shaft 4 to the first shaft 3, as in the case of the first embodiment.

Next, a fourth embodiment will be described with reference to FIG. 13. The first embodiment is directed to the power transmitting device 1 structured such that the first shaft 3 is connected to the sun gear 31 of the planetary gear device 30 which includes the carrier 33 (first element), the ring gear 34 (second element) and the sun gear (third element), the second shaft 4 is connected to the ring gear 34, the first outer race 12 of the first clutch 10 and the second outer race 22 of the second clutch 20 are formed integrally with the second shaft 4, and the first inner race 11 of the first clutch 10 and the second inner race 21 of the second clutch 20 are formed integrally with the first shaft 3.

In comparison with this, the fourth embodiment is similar to the first embodiment in that the first outer race 12 of the first clutch 10 and the second outer race 22 of the second clutch 20 are formed integrally with the second shaft 4, and the first inner race 11 of the first clutch 10 and the second inner race 21 of the second clutch 20 are formed integrally with the first shaft 3, but has a structure in which the first shaft 3 is connected to a carrier 433 of a planetary gear device 430 which includes a ring gear 434 (first element), a sun gear 431 (second element), a carrier 433 (third element) and pinion gears 432 meshing with the sun gear 431 and the ring gear 434, and the second shaft 4 is connected to the sun gear 431.

Figure 13:
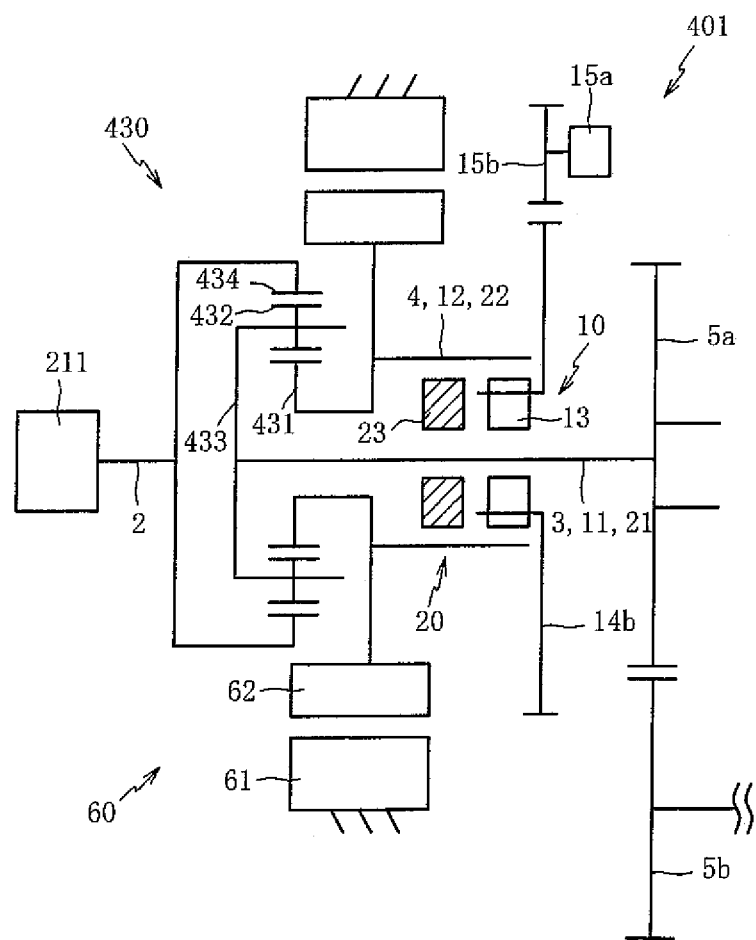
FIG. 13 is a schematic diagram schematically showing the power transmitting device in the fourth embodiment.

FIG. 13 is a schematic diagram schematically showing the internal structure of the power transmitting device 401 in the fourth embodiment. The same components as those in the first embodiment are designated by the same reference signs and the description of such components is omitted. FIG. 13 shows only the structure for performing the function of transmitting power for easier understanding. The gearbox 212 shown in FIG. 2 is omitted in FIG. 13. The power transmitting device 401, which is mounted on the vehicle 200 (see FIG. 1), mainly includes, as illustrated in FIG. 13, a planetary gear device 430 connected to the input shaft 2 transmitting the power of the engine 211, and the first clutch 10 and the second clutch 20 which are placed on a power line from the planetary gear device 430 to the gearbox (not shown).

The ring gear 434 of the planetary gear device 430 is connected to the input shaft 2 to which the power of the engine 211 is input, which forms the first element. The sun gear 431 is connected to the rotor 62 of the generator motor 60, which forms the second element. In addition, the carrier 433 is connected to the first shaft 3 transmitting the power toward the gearbox (not shown), which forms the third element.

The first clutch 10 is provided for transmitting and interrupting power between the second shaft 4 connected to the sun gear 431 (second element) and the first shaft 3 connected to the carrier 433. The first clutch 10 is structured to transmit, in an interruptible manner, power received from the second shaft 4 to the first shaft 3, but to block transmission of power from the first shaft 3 to the second shaft 4. The second clutch 20 is provided for transmitting and interrupting power between the second shaft 4 and the first shaft 3, and is structured to transmit the power received from the first shaft 3 to the second shaft 4, but block the transmission of power from the second shaft 4 to the first shaft 3.

Figure 14:
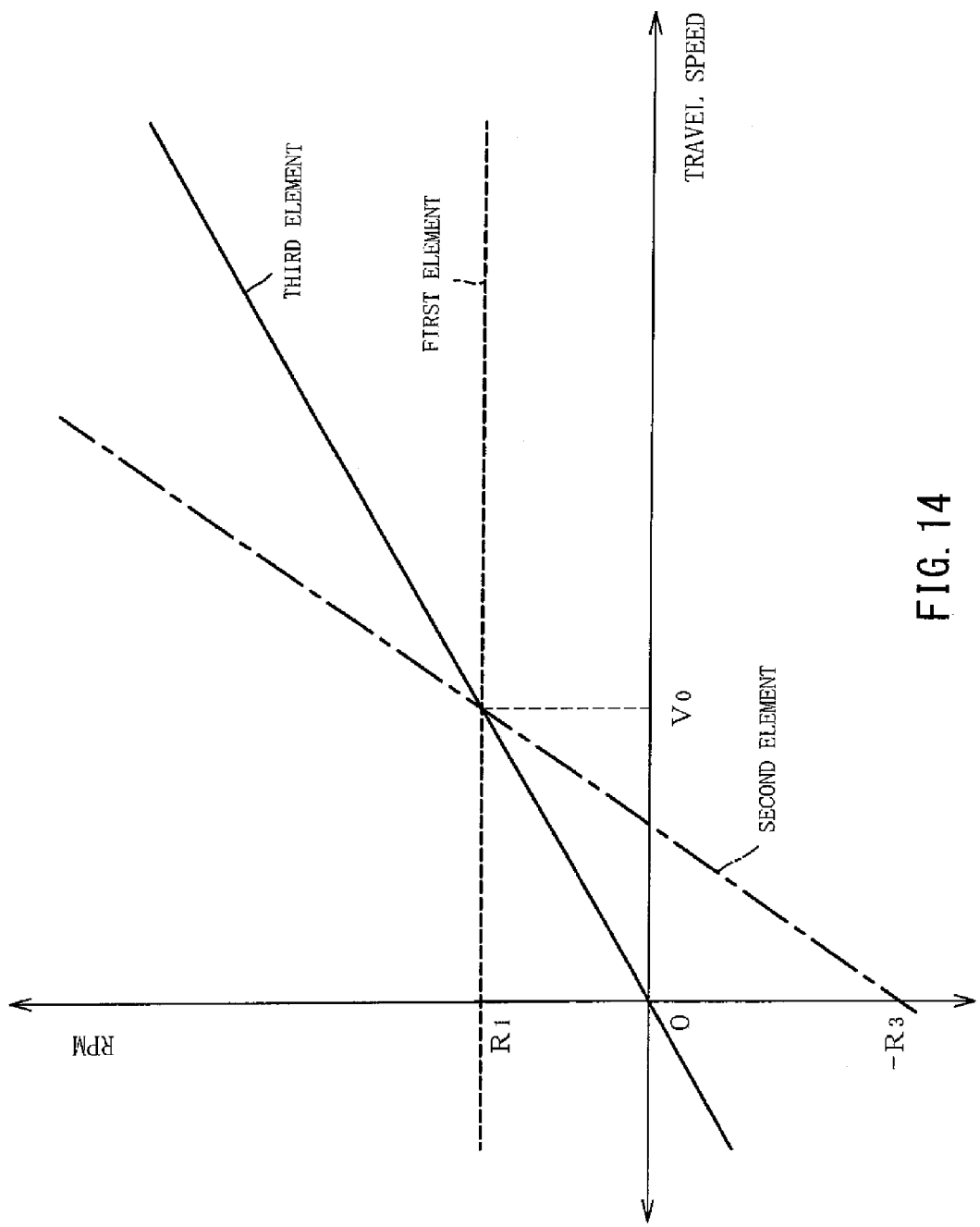
FIG. 14 is a schematic diagram showing the relationship between rpms of the first element, the second element and the third element and travel speed.

In this connection, the operation of the planetary gear device 430 is described with reference to FIG. 14. FIG. 14 is a schematic diagram showing the relationship between rpms of the first element, the second element and the third element of the planetary gear device 430 and travel speed of the vehicle 200 (see FIG. 1). The horizontal axis in FIG. 14 represents the travel speed of the vehicle 200, while the vertical axis represents the rpms of the third element, the first element and the second element. Because the rotor 62 is connected to the sun gear 431 (second element) through the second shaft 4 as illustrated in FIG. 13, the rpm of the second element becomes equal to the rpm of the rotor 62 and the second shaft 4. Because the engine 211 is connected to the ring gear 434 (first element) through the input shaft 2, the rpm of the first element becomes equal to the rpm of the input shaft 2. Further, because the first shaft 3 is connected to the carrier 433 (third element) and the drive gear 5a, the rpm of the third element becomes equal to the rpm of the first shaft 3 and the rpm of the drive gear 5a. FIG. 14 illustrates the characteristics in which the rpm of the first element is constant relative to the travel speed of the vehicle 200, that is, the rpm of the engine 211 and input shaft 2 is constant ($R_1$).

As shown in FIG. 14, in the planetary gear device 430, when the second element rpm>−$R_3$ and the second element rpm<$R_1$ if the power is input from the first element (ring gear 434), the third element (carrier 433) is decelerated (first element>third element), so that the third element produces output in an arbitrary transmission gear ratio in response to the rpm of the second element. If the rpm of the second element becomes equal to $R_1$ the power of the engine 211 input to the first element is output to the third element (carrier 433) as it is. Further, the rpm of the rotor 62 (see FIG. 13) is increased (the rpm of the second element is increased) until the rpm of the second element rpm>$R_1$, thereupon the third element (carrier 433) increases in speed (first element<third element), so that the third element produces output in an arbitrary transmission gear ratio in response to the rpm of the second element.

On the other hand, when the second element rpm=−$R_3$ the third element rpm=0 results. When the second element rpm<−$R_3$ the third element rpm<0 results. That is, the direction of rotation of the third element (carrier 433) is reversed. In this manner, as in the case of the first embodiment, in the fourth embodiment, it becomes possible that the rotation direction of the output shaft 5d (see FIG. 2) is not changed when the vehicle 200 moves forward and when reverse gear is selected.

As a result, the gearbox 212 (see FIG. 2) is capable of allowing the meshing of the reverse gear pair 9 without gear rattle provided that at least rpms are commensurate with each other, even without mounting a synchronous mesh mechanism. Even when a synchronous mesh mechanism is mounted in the gearbox 212 in order to improve operability, a size reduction and simplification of the synchronous mesh mechanism can be achieved, leading to a size reduction and simplification of the gearbox 212. Further, with the size reduction and the simplification of the synchronous mesh mechanism, the amount of energy consumption required for operation of the synchronous mesh mechanism can be reduced.

In the planetary gear device 430, the rpm of the sun gear 431 (the second element) changes to the positive direction as the rpm of the ring gear 434 (the first element) changes to the negative direction when the rpm of the carrier 433 (the third element) is constant, and changes to the negative direction as the rpm of the ring gear 434 (the first element) changes to the positive direction. Then, when the rpm of the ring gear 434 becomes equal to or lower than a predetermined rpm, the direction of rotation of the sun gear 431 is reversed.

Next, the operation of the power transmitting device 401 when the vehicle 200 (see FIG. 1) uses the driving force of the generator motor 60 to start moving will be described. Assume that the engine 211 is shutdown. In this case, the first load applying device 15 of the first clutch 10 is actuated (ON). In this state, the generator motor 60 is actuated to rotate the rotor 62, whereupon the power is transmitted to the second shaft 4 and the sun gear 431. The power transmitted to the second shaft 4 causes the first outer race 12 of the first clutch 10 to rotate in the lock direction (the direction of arrow Ro in FIG. 5) when viewed from the first inner race 11 in rotation relative to the first inner race 11. However, because the first load applying device 15 is in operation (ON), the transmission of power from the second shaft 4 through the first clutch 10 to the first shaft 3 is blocked. Further, the second outer race 22 of the second clutch 20 rotates in the free direction (the direction opposite to arrow Ro in FIG. 5) when viewed from the second inner race 21 in rotation relative to the second inner race 21. As a result, the power of the generator motor 60 is not transmitted from the second shaft 4 to the first shaft 3.

As noted above, the power of the rotor 62 is also transmitted to the sun gear 431, thus the sun gear 431 meshes with the pinion gears 432 to rotate the carrier 433. Thus, the power is transmitted to the first shaft 3 connected to the carrier 433, and then transmitted to the gearbox 212 (see FIG. 1). As a result, the vehicle 200 uses a driving force of the generator motor 60 to start moving.

Next, the operation of the power transmitting device 401 when the vehicle 200 uses the driving force of the engine 211 to start moving will be described. Assuming that the rotor 62 stops. In this case, after the engine 211 is started up by a starter which is not shown, the first load applying device 15 of the first clutch 10 is rendered non-operative (OFF). In this state, upon increase in the engine speed of the engine 211, the rpm of the ring gear 434 increases to the positive direction. Along with this, the rpm of the sun gear 431 increases to the negative direction, so that the power is transmitted to the second shaft 4. The power transmitted to the second shaft 4 causes the first outer race 12 of the first clutch 10 to rotate in the lock direction (the direction of arrow Ro in FIG. 5) when viewed from the first inner race 11 in rotation relative to the first inner race 11.

As a result, the power is transmitted from the second shaft 4 through the first clutch 10 to the first shaft 3, and then transmitted to the gearbox 212 (see FIG. 1). Thus, the vehicle 200 uses the driving force of the engine 211 to start moving. In the fourth embodiment, as in the case described in the first embodiment, forward movement and backward movement of the vehicle 200, up-shifting, down-shifting, coasting and regeneration can be performed. In this manner, in the power transmitting device 401 in the fourth embodiment, power switching between the engine 211 and the motor 60 can be provided by use of the first clutch 10 to switch between transmission and interruption of power flowing from the second shaft 4 to the first shaft 3, as in the case of the first embodiment.

Next, a fifth embodiment will be described with reference to FIG. 15. The first embodiment is directed to the power transmitting device 1 structured such that the first shaft 3 is connected to the sun gear 31 of the planetary gear device 30 which includes the carrier 33 (first element), the ring gear 34 (second element) and the sun gear 31 (third element), the second shaft 4 is connected to the ring gear 34, the first outer race 12 of the first clutch 10 and the second outer race 22 of the second clutch 20 are formed integrally with the second shaft 4, and the first inner race 11 of the first clutch 10 and the second inner race 21 of the second clutch 20 are formed integrally with the first shaft 3.

In comparison with this, the fifth embodiment has a structure in which the first outer race 12 of the first clutch 10 and the second outer race 22 of the second clutch 20 are formed integrally with the first shaft 3, the first inner race 11 of the first clutch 10 and the second inner race 21 of the second clutch 20 are formed integrally with the second shaft 4, the first shaft 3 is connected to a carrier 533 of a planetary gear device 530 which includes a ring gear 534 (first element), a sun gear 531 (second element), a carrier 533 (third element) and pinion gears 532 meshing with the sun gear 531 and the ring gear 534, and the second shaft 4 is connected to the sun gear 531.

Figure 15:
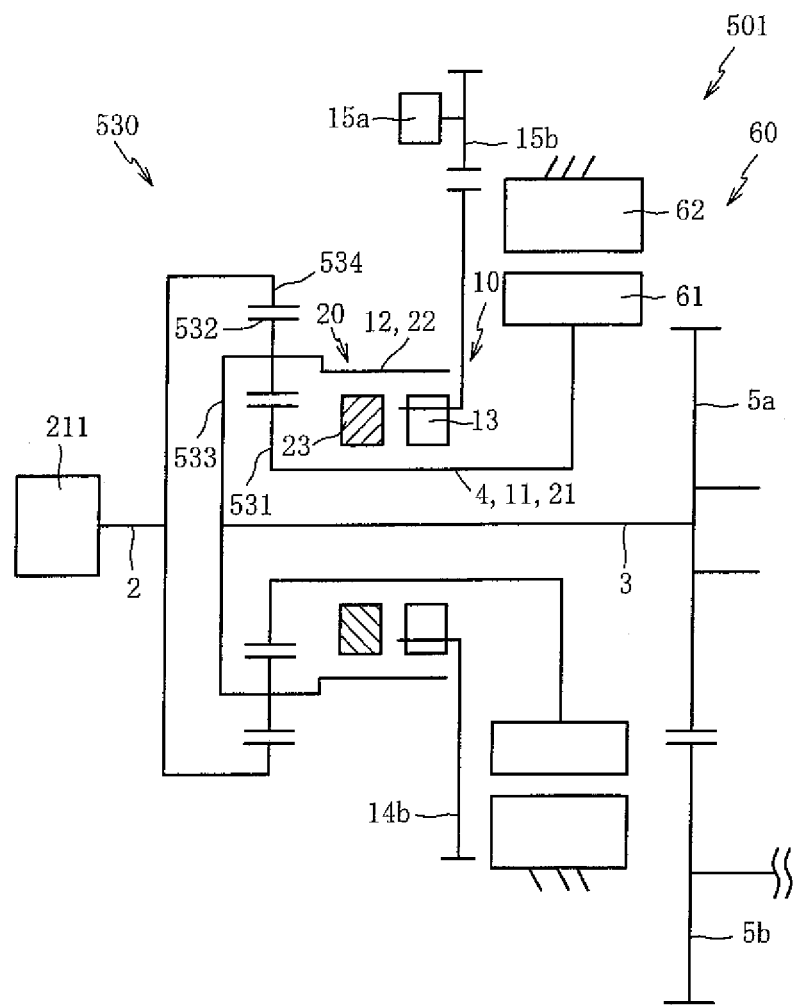
FIG. 15 is a schematic diagram schematically showing the power transmitting device in the fifth embodiment.

FIG. 15 is a schematic diagram schematically showing the internal structure of the power transmitting device 501 in the fifth embodiment. The same components as those in the first embodiment are designated by the same reference signs and the description of such components is omitted. FIG. 15 shows only the structure for performing the function of transmitting power for easier understanding. The gearbox 212 shown in FIG. 2 is omitted in FIG. 15. The power transmitting device 501, which is mounted on the vehicle 200 (see FIG. 1), mainly includes, as illustrated in FIG. 15, a planetary gear device 530 connected to the input shaft 2 transmitting the power of the engine 211, and the first clutch 10 and the second clutch 20 which are placed on a power line from the planetary gear device 530 to the gearbox 212 (see FIG. 1).

The ring gear 534 of the planetary gear device 530 is connected to the input shaft 2 to which the power of the engine 211 is input, which forms the first element. The sun gear 531 is connected to the rotor 62 of the generator motor 60, which forms the second element. In addition, the carrier 533 is connected to the first shaft 3 transmitting the power toward the gearbox 212, which forms the third element.

The first clutch 10 is provided for transmitting and interrupting power between the second shaft 4 connected to the sun gear 531 (second element) and the first shaft 3 connected to the carrier 533. The first clutch 10 is structured to transmit, in an interruptible manner, power received from the second shaft 4 to the first shaft 3, but to block the transmission of power from the first shaft 3 to the second shaft 4. The second clutch 20 is provided for transmitting and interrupting power between the second shaft 4 and the first shaft 3, and is structured to transmit the power received from the first shaft to the second shaft 4, but block the transmission of power from the second shaft 4 to the first shaft 3. Note that the relationship between the rpms of the first element, second element and the third element of the planetary gear device 530 and the travel speed is similar to that shown in FIG. 14 and the description thereof is omitted.

Next, the operation of the power transmitting device 501 when the vehicle 200 (see FIG. 1) uses the driving force of the generator motor 60 to start moving will be described. Assume that the engine 211 is shut down. In this case, the first load applying device 15 of the first clutch 10 is actuated (ON). In this state, the generator motor 60 is actuated to rotate the rotor 62, whereupon the power is transmitted to the second shaft 4 and the sun gear 531. The power transmitted to the second shaft 4 causes the first inner race 11 of the first clutch 10 to rotate in the lock direction (the direction of arrow Ri in FIG. 5) when viewed from the first outer race 12 in rotation relative to the first outer race 12. However, because the first load applying device 15 is in operation (ON), the transmission of power from the second shaft 4 through the first clutch 10 to the first shaft 3 is blocked. Further, the second inner race 21 of the second clutch 20 rotates in the free direction (the direction opposite to arrow Ri in FIG. 5) when viewed from the second outer race 22 in rotation relative to the second outer race 22. As a result, the power of the generator motor 60 is not transmitted from the second shaft 4 to the first shaft 3.

As noted above, the power of the rotor 62 is also transmitted to the sun gear 531, thus the sun gear 531 meshes with the pinion gears 532 to rotate the carrier 533. Thus, the power is transmitted to the first shaft 3 connected to the carrier 533, and then transmitted to the gearbox 212 (see FIG. 1). As a result, the vehicle 200 (see FIG. 2) uses a driving force of the generator motor 60 to start moving.

Next, the operation of the power transmitting device 501 when the vehicle 200 uses the driving force of the engine 211 to start moving will be described. Assuming that the rotor 62 stops. In this case, after the engine 211 is started up by a starter which is not shown, the first load applying device 15 of the first clutch 10 is rendered non-operative (OFF). In this state, upon increase in the engine speed of the engine 211, the rpm of the ring gear 534 increases to the positive direction. Along with this, the rpm of the sun gear 531 increases to the negative direction, so that the power is transmitted to the second shaft 4. The power transmitted to the second shaft 4 causes the first inner race 11 of the first clutch 10 to rotate in the lock direction (the direction of arrow Ri in FIG. 5) when viewed from the first outer race 12 in rotation relative to the first outer race 12.

As a result, the power is transmitted from the second shaft 4 through the first clutch 10 to the first shaft 3, and then transmitted to the gearbox 212 (see FIG. 1). Thus, the vehicle 200 uses the driving force of the engine 211 to start moving. In the fifth embodiment, as in the case described in the first embodiment, forward movement and backward movement of the vehicle 200, up-shifting, down-shifting, coasting and regeneration can be performed. In this manner, in the power transmitting device 501 in the fifth embodiment, power switching between the engine 211 and the motor 60 can be provided by use of the first clutch 10 to switch between transmission and interruption of power flowing from the second shaft 4 to the first shaft 3, as in the case of the first embodiment.

Next, a sixth embodiment will be described with reference to FIG. 16 to FIG. 21. The first embodiment is directed to the power transmitting device 1 structured such that the first shaft 3 is connected to the sun gear 31 of the planetary gear device 30 which includes the carrier 33 (first element), the ring gear 34 (second element) and the sun gear 31 (third element), and the second shaft 4 is connected to the ring gear 34. Also, the first outer race 12 of the first clutch 10 and the second outer race 22 of the second clutch 20 are formed integrally with the second shaft 4, and the first inner race 11 of the first clutch 10 and the second inner race 21 of the second clutch 20 are formed integrally with the first shaft 3. Also, the first sprags 13 of the first clutch 10 are urged in the direction of engaging with the first inner race 11 and the first outer race 12 by the first urging member 16, and the first load applying device 15 applies a load in the direction of releasing the engagement of the first sprags 13 with the first inner race 11 and the first outer race 12.

In comparison with this, the sixth embodiment has a structure in which the first outer race 12 of the first clutch 610 and the second outer race 22 of the second clutch 20 are formed integrally with the second shaft 4, the first shaft 3 is connected to a ring gear 634 of a planetary gear device 630 which includes a sun gear 631 (first element), a carrier 633 (second element), the ring gear 634 (third element) and pinion gears 632 meshing with the sun gear 631 and the ring gear 634, the second shaft 4 is connected to the carrier 633, and the input shaft 2 is connected to the sun gear 631.

Figure 16:
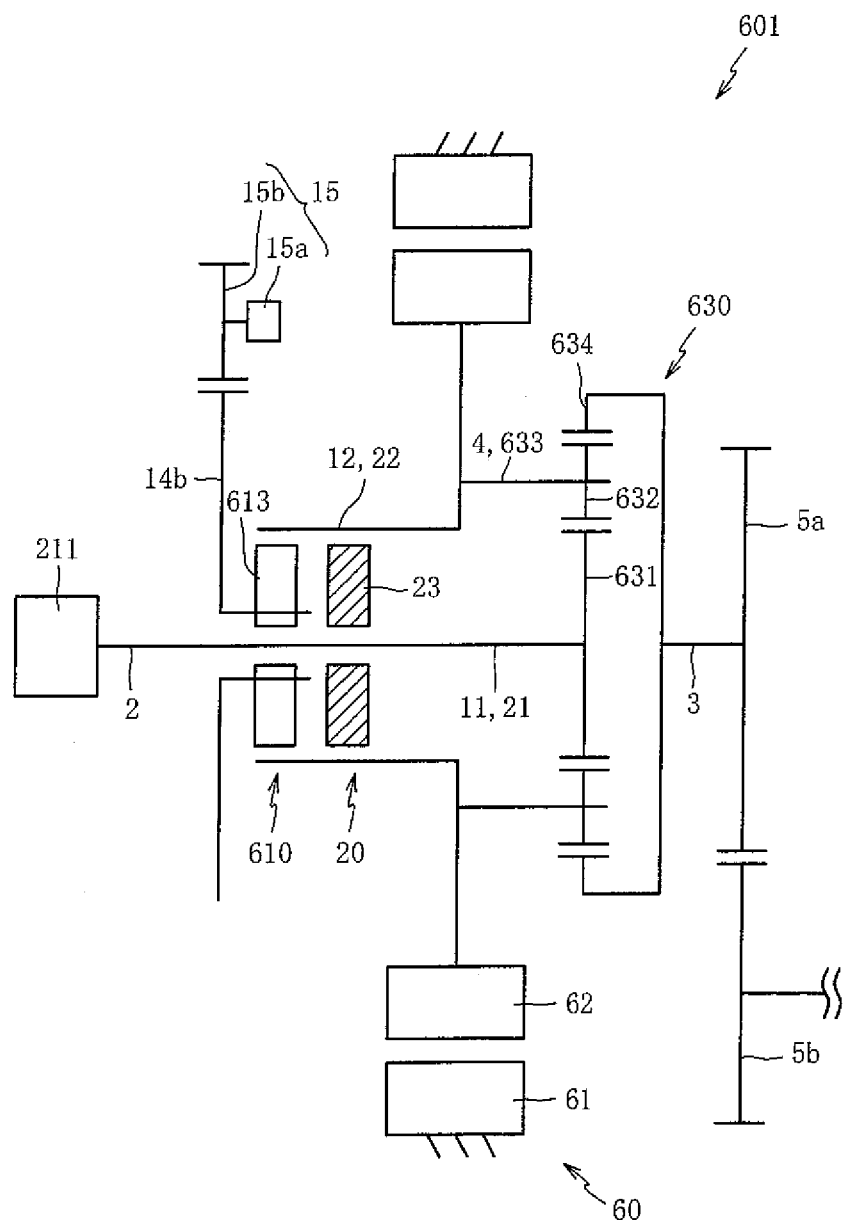
FIG. 16 is a schematic diagram schematically showing the power transmitting device in the sixth embodiment.

FIG. 16 is a schematic diagram schematically showing the internal structure of the power transmitting device 601 in the sixth embodiment. The same components as those in the first embodiment are designated by the same reference signs and the description of such components is omitted. FIG. 16 shows only the structure for performing the function of transmitting power for easier understanding, and the gearbox 212 is omitted. The power transmitting device 601, which is mounted on the vehicle 200 (see FIG. 1), mainly includes, as illustrated in FIG. 16, a planetary gear device 630 connected to the input shaft 2 transmitting the power of the engine 211, and a first clutch 610 and the second clutch 20 which are placed on a power line from the engine 211 to the planetary gear device 630.

Figure 17:
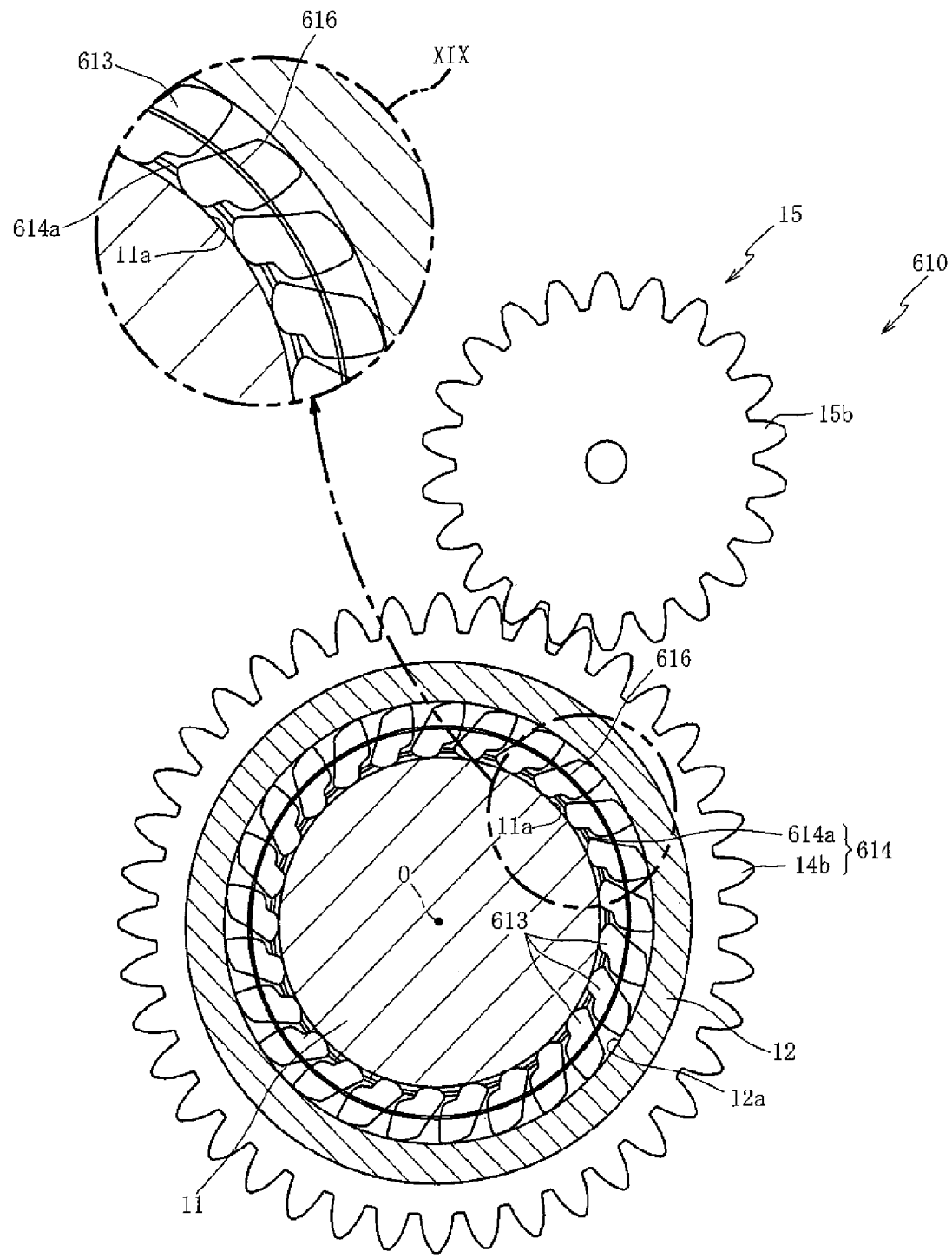
FIG. 17 is a sectional view of the first clutch.
Figure 18:
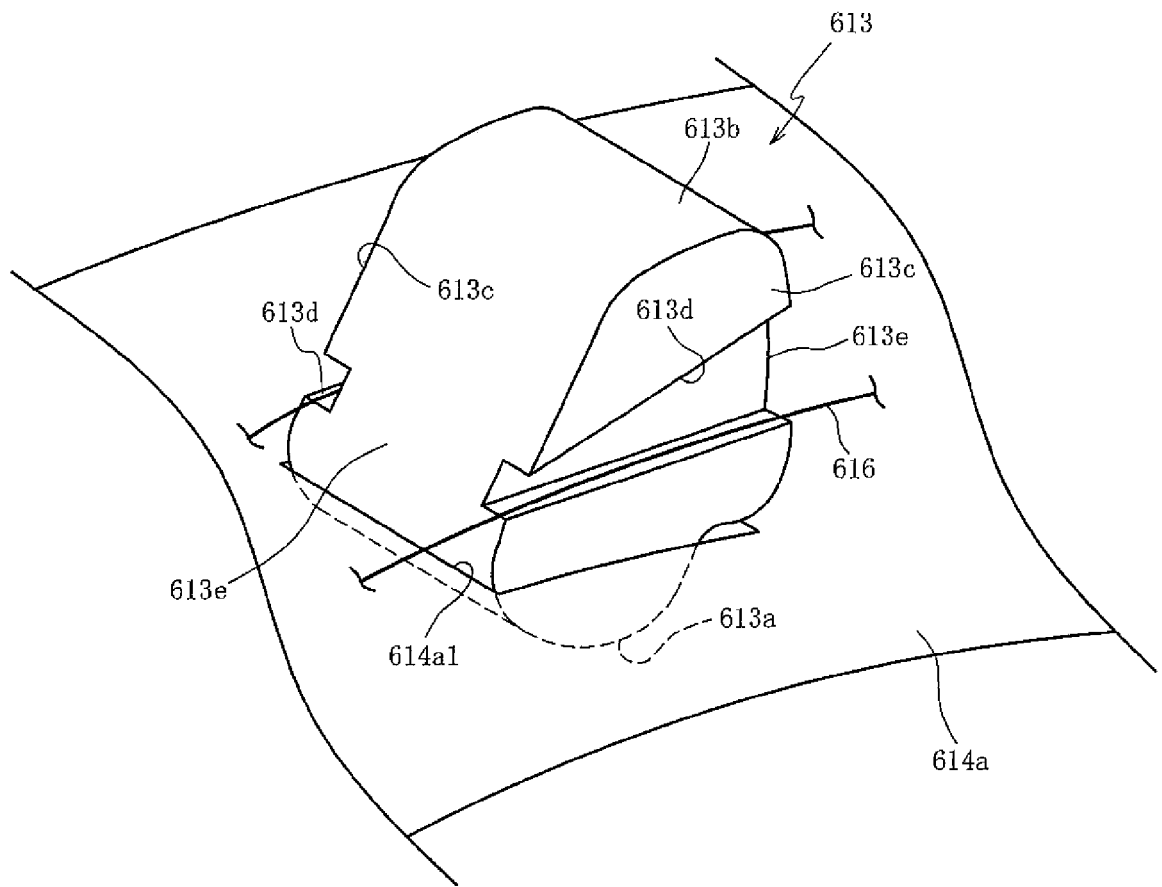
FIG. 18 is an exploded view of a part of the first clutch.

Next, the first clutch 610 will be described with reference to FIG. 17. FIG. 17 is a sectional view in the circumferential direction of the first clutch 610. FIG. 18 is an exploded view of a part of the first clutch 610.

The first clutch 610 mainly includes the inner race 11 connected to the input shaft 2, the outer race 12 surrounding the outer periphery of the inner race 11 and connected to the second shaft 4, a plurality of sprags 613 interposed between the inner race 11 and the outer race 12, and a cage 614 retaining the sprags 613, as shown in FIG. 17 and FIG. 18.

The sprag 613 has engaging faces 613a, 613b (see FIG. 18 and FIG. 19) to come respectively into contact with the outer peripheral surface 11a and the inner peripheral surface 12a. As shown in FIG. 18, grooves 613d are formed respectively in two side faces 613c each connecting the two engaging faces 613a, 613b to each other. The groove 613d is a part to which the urging member 616 described later is mounted.

The cage 614 is a member retaining the sprags 613 while allowing the sprags 613 to tilt in the circumferential direction of the outer peripheral surface 11a and the inner peripheral surface 12a. The cage 614 includes a retaining portion 614a extending in the direction of axis O and in a ring shape and the load transmitting portion 14b extending from the retaining portion 614a in a direction crossing the direction of axis O.

The retaining portion 614a is a part retaining the sprags 613, and includes a plurality of holes 614a1 bored at regular intervals in the circumferential direction as shown in FIG. 18. A portion (around the engaging face 613a) of the sprag 613 located close to the inner race 11 is inserted into the hole 614a1, and a gap of an appropriate size is created between the hole 614a1 and two front and back faces 613e each connecting the two engaging faces 613a, 613b of the sprag 613 to each other. Thus, the sprags 613 are retained between the outer peripheral surface 11a and the inner peripheral surface 12a which face each other, while allowed to tilt largely in the circumferential direction by the retaining portion 614a.

Figure 19A:
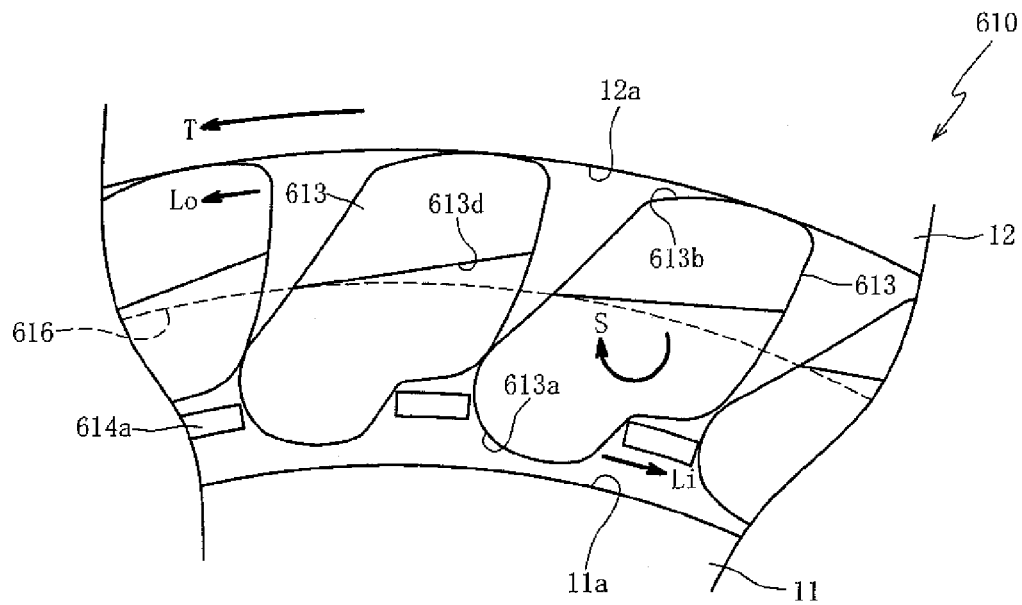
FIG. 19(a) is a partially enlarged sectional view of the first clutch blocking the transmission of power, shown by enlarging the portion indicated by "XIX" in FIG. 17

As shown in FIG. 17, the urging member 616 is formed of a ring-shaped coil spring, which is a member causing the urging force to act in a diameter expansion direction. In this regard, the sprag 613 urged by the urging member 616 is explained with reference to FIG. 19(a). FIG. 19(a) is a partially enlarged sectional view of the first clutch 610 blocking the transmission of power, shown by enlarging the portion indicated by "XIX" in FIG. 17. In FIG. 19, assuming that the outer race 12 is driven by the generator motor 60 (see FIG. 16) to rotate in the direction of arrow T (in the counterclockwise direction in FIG. 19).

The urging member 616 is attached to the grooves 613d of the sprag 613. The urging member 616 causes the urging force to act in the diameter expansion direction in order to tilt the engaging face 613a of the sprag 613 in the direction of arrow S in the FIG. 19 (hereinafter referred to as an "anti-lock direction") by use of the frictional force, produced on the engaging face 613b of the sprag 613 and the inner peripheral surface 12a of the outer race 12. This allows a relative rotation of the inner race 11 and the outer race 12, thus blocking the transmission of power from the outer race 12 to the inner race 11. As shown in FIG. 19(a), a clearance is created between the outer peripheral surface 11a and the engaging face 613a. As a result, it is possible to prevent friction from being produced between the outer peripheral surface 11a and the engaging face 613a of the sprag 613, thus suppressing energy loss produced by friction.

Since a gap of appropriate size is created between the hole 614a1 formed in the retaining portion 614a and the two front and back faces 613e (see FIG. 18) each connecting the two engaging faces 613a, 613b to the sprag 613 to each other, the sprags 613 can abut each other by tilting the sprags 613 largely in the anti-lock direction as shown in FIG. 19(a). When the sprags 613 are tilted to a position of an abutment of them, the sprags 613 restrain each other. This allows a satisfactory clearance between the outer peripheral surface 11a and the engaging face 613a. As a result, the relative rotation of the inner race 11 and the outer race 12 can be prevented from being limited by making the outer peripheral surface 11a and the engaging face 613 come into contact with each other to unintentionally cause engagement of the sprags 613 to the outer peripheral surface 11a and the inner peripheral surface 12a.

Since the grooves 613d are formed respectively in the two side faces 613c of the sprag 613 each connecting the two engaging faces 613a, 613b to each other, and the urging member 616 is attached to the grooves 613d, the urging force of the urging member 616 is capable of tilting the sprags 613 in the anti-lock direction in balanced conditions.

With the aforementioned first clutch 610, external forces must be applied to the sprags 613 in opposition to the urging force of the urging member 616 in order to engage the sprags 613 with the inner race 11 and the outer race 12. Therefore, the first clutch 610 is equipped with the load applying device 15 (see FIG. 16). The load applying device 15 is a device for applying a load to the sprags 613 in opposition to the urging force of the urging member 616 in order to tilt the sprags 613 in the direction opposite to arrow S in FIG. 19 (hereinafter referred to as the "lock direction").

Figure 19B:
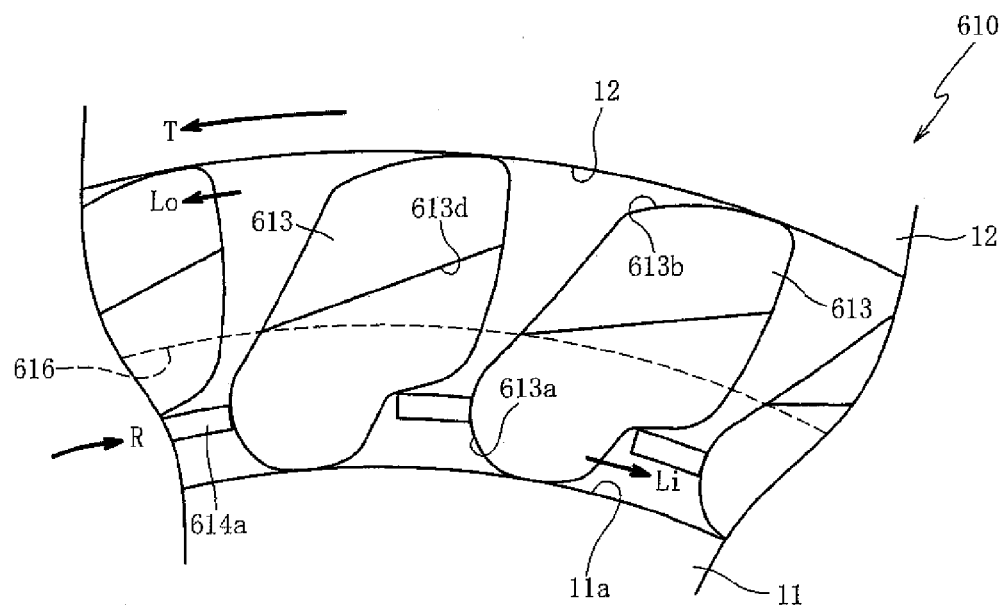
FIG. 19(b) is a partially enlarged sectional view of the first clutch transmitting the power.

As shown in FIG. 19(b), the application by the load applying device 15 of load acting in the lock direction (the direction opposite to arrow S in FIG. 19) to the sprags 613 via the cage 614 in opposition to the urging force of the urging member 616 allows each sprag 613 to tilt in the lock direction approximately around the engaging face 613b of the sprag 613. As a result, the engaging faces 613a, 613b of the sprag come into contact with the outer peripheral surface 12a and the inner peripheral surface 11a. This produces a friction force at a contact point between the inner peripheral surface 12a and the engaging face 613b and a contact point between the outer peripheral surface 11a and the engaging face 613a. And also, a positional displacement of each of the contact points in the circumferential direction of the outer peripheral surface 11a and the inner peripheral surface 12a engages the sprag 613 with the inner race 11 and the outer race 12 to restrict the relative rotation of the inner race 11 and the outer race 12. As a result, the power is transmitted from the outer race 12 to the inner race 11, so that the inner race 11 rotates with the rotation (in the direction of arrow T) of the outer race 12.

When the sprags 613 engage with the inner race 11 and the outer race 12 to restrict the relative rotation of the inner race 11 and the outer race 12, and when the outer race 12 rotates in the lock direction (the direction of arrow Lo) when viewed from the inner race 11 in rotation relative to the inner race 11, even if the load application of the load applying device 15 is halted, the outer race 12 rotates to tilt the sprags 613 in the lock direction, maintaining the engagement of the sprags 613 and the inner race 11 and the outer race 12.

On the other hand, when the sprags 613 engage with the inner race 11 and the outer race 12 to restrict the relative rotation of the inner race 11 and the outer race 12, and when the outer race 12 rotates in the anti-lock direction (the direction opposite to arrow Lo) when viewed from the inner race 11 in rotation relative to the inner race 11, by halting the load applying device 15 or by reducing the load applied by the load applying device 15, the sprags 613 tilt in the anti-lock direction (the direction of arrow S in FIG. 19) by the urging force of the urging member 616. This releases the engagement of the inner race 11 and the outer race 12 and the sprags 613 to block the transmission of power from the outer race 12 to the inner race 11.

With the first clutch 610 structured as described above, a load is applied to the sprags 613 by the load applying device 15. This causes the sprags 613 to engage with the inner race 11 and the outer race 12, so that the relative rotation of the inner race 11 and the outer race 12 in a fixed rotational direction is restricted. On the other hand, upon stopping the load application by the load applying device 15, the urging member 616 applies a urging force to the sprags 613, so that an engagement of the sprags 613 with the inner race 11 and the outer race 12 is released to allow the inner race 11 and the outer race 12 to relatively rotate in both rotational directions. Thus, switching between the transmission and the interruption of rotation in a fixed direction is made possible.

Figure 20:
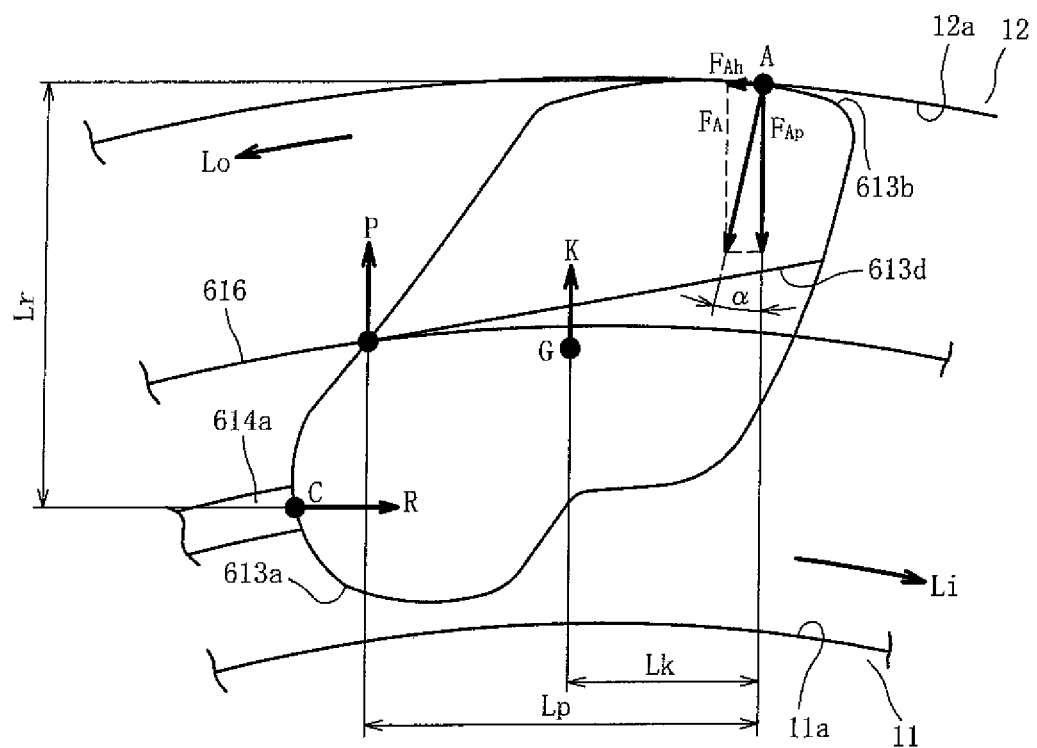
FIG. 20 is a schematic diagram of the first sprag tilted in the anti-lock direction.

Next, the relationship between an urging force and a load acting on the sprag 613 will be described with reference to FIG. 20 in which the sprag 613 is tilted in the anti-lock direction. As shown in FIG. 20, in the sprag 613 released from the engagement with the inner race 11 and the outer race 12, turning moment to move the sprag 613 to tilt it in the anti-lock direction (a clockwise direction in FIG. 20) is produced around the contact point between the abutting face 613b and the inner peripheral surface 12a by the urging force (load P) applied by the urging member 616. When the sprag 613 engages with the inner race 11 and the outer race 12 and revolves around the axis O according to the rotation of the inner race 11 and the outer race 12, a centrifugal force K acts on the sprag 613. With those forces, a pressing load acts on the contact point A. As reaction to this, a reactive force $F_A$ acts on the sprag 613 in the direction of the normal to the inner peripheral surface 12a at the contact point A. To oppose this, in order to tilt the sprag 613 in the lock direction, the retaining portion 614a applies a load R of the lock direction to the contact point C with the sprag 613.

Considering here turning moment $M_A$ around the contact point A acting on the sprag 613. Since the load P, the load R and the centrifugal force K act on the sprag 613, the turning moment $M_A$ can be expressed by the following equation (1).

$$M_A = Lp \cdot P + Lk \cdot K - Lr \cdot R \quad \text{Equation (1)}$$

In equation (1), Lp represents a horizontal distance from the contact point A to the point of application of the load P (the groove 613d), Lk represents a horizontal distance from the contact point A to the point of application of the centrifugal force K (the center of gravity of the sprag 613), and Lr represents a vertical distance from the contact point A to the point of application of the load R (contact point C). Given that the turning moment $M_A$ is a clockwise positive moment about the contact point A. In a strict sense, the loads P, K and R are required to allow for errors caused by the horizontal component and the vertical component of a load, but the error is negligible as compared with the magnitudes of the loads P, K and R. Because of this, given that the loads P and K act in the vertical direction and the load R acts in the horizontal direction.

In this connection, it is necessary for achieving engagement of the engaging face 613a of the sprag 613 with the outer peripheral surface 11a that the sprag 613 is tilted in a counterclockwise direction in FIG. 20 without sliding of the engaging face 613a of the sprag 613 on the inner peripheral surface 12a. That is, $M_A < 0$ is required. In the state shown in FIG. 20, since the engagement between the sprag 613 and the inner race 11 and the outer race 12 is released, the outer race 12 or the inner race 11 can be rotate around the axis O, but the driving force of the outer race 12 or the inner race 11 alone cannot allow the sprag 613 to revolve about the axis O. Therefore, the centrifugal force K does not act on the sprag 613 (K=0). Given the above facts, a necessary condition for engaging the engaging face 613a of the sprag 613 with the outer peripheral surface 11a is expressed by the following equation (2) resulting from the substitution of $M_A < 0$, K=0 into equation (1).

$$R > Lp/Lr \cdot P \quad \text{Equation (2)}$$

Where if Lp<Lr, Lp/Lr<1. Accordingly, a load R>Lp/Lr·P<P results from equation (2). Therefore, even when a load larger than the urging force (load P) of the urging member 616 is not applied to the sprag 613, the load applying device 15 can allow the sprag 613 to engage with the outer race 12 and the inner race 11. In consequence, a reduction in size of the load applying device 15 is possible and since a required load is small, minimization of energy loss is possible. In turn, a reduction in size of the first clutch 610 is possible.

In FIG. 20, given that the normal line and the vertical direction in the contact point A form an angle α, the magnitude of a horizontal force component $F_{Ah}$ of the reactive force $F_A$ acting on the sprag 613 from the inner peripheral surface 12a is $F_A \cdot \sin α$, and the orientation is the same as that of the lock direction (counterclockwise direction in FIG. 20). Given that a coefficient of friction at the contact point A is μ, and a vertical force component of the reactive force $F_A$ is $F_{Ap}$, the magnitude of the friction is $\mu \cdot F_{Ap} = \mu \cdot F_A \cdot \cos α$, and the orientation is the same as that of the lock direction.

As described above, of the reactive force $F_A$ acting on the sprag 613 from the inner peripheral surface 12a at the contact point A where the inner peripheral surface 12a makes contact with the engaging face 613b, a force component in the loading direction (horizontal direction and the right-and-left direction in FIG. 20) of the load R acting on the sprag 613 through the retaining portion 614a by the load applying device 15 is identical in orientation with the lock direction (counterclockwise direction in FIG. 20). Because of this, when the load applying device 15 applies the load R to the sprag 613, the engaging face 613b is prevented from sliding on the inner peripheral surface 12a, and tilting the sprag 613 approximately around the contact point A with reliability is made possible. In this manner, the application of a load from the load applying device 15 makes it possible to engage the two engaging faces 613a, 613b of the sprag 613 with the outer peripheral surface 11a and the inner peripheral surface 12a with reliability.

Figure 21:
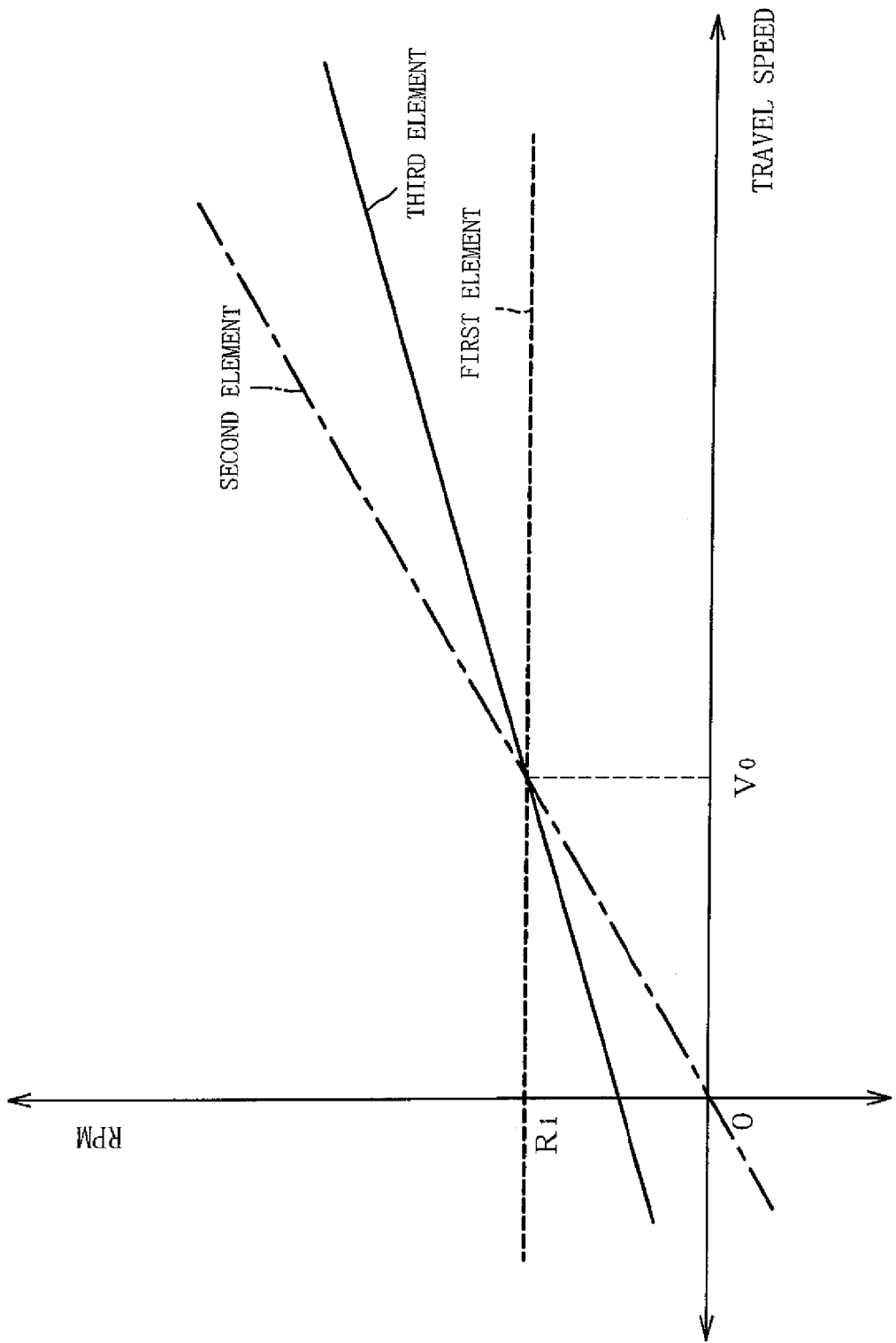
FIG. 21 is a schematic diagram showing the relationship between rpms of the first element, the second element and the third element and travel speed.

Next, the operation of the planetary gear device 630 will be described with reference to FIG. 21. FIG. 21 is a schematic diagram showing the relationship between rpms of the first element, the second element and the third element and travel speed of the vehicle 200. The horizontal axis in FIG. 21 represents the travel speed of the vehicle 200, while the vertical axis represents the rpms of the third element, the first element and the second element. Because the rotor 62 is connected to the carrier 633 (second element) through the second shaft 4 as illustrated in FIG. 16, the rpm of the second element becomes equal to the rpm of the rotor 62 and the second shaft 4. Because the engine 211 is connected to the sun gear 631 (first element) through the input shaft 2, the rpm of the first element becomes equal to the rpm of the input shaft 2. Further, because the first shaft 3 is connected to the ring gear 634 (third element) and the drive gear 5a, the rpm of the third element becomes equal to the rpm of the first shaft 3 and the rpm of the drive gear 5a. FIG. 21 illustrates the characteristics in which the rpm of the first element is constant relative to the travel speed of the vehicle 200, that is, the rpm of the engine 211 and input shaft 2 is constant ($R_1$).

During the start-up of the engine 211, the first load applying device 15 of the first clutch 610 (see FIG. 16) is rendered operative to engage the first sprags 613 with the first inner race 11 and the first outer race 12. In this state, the generator motor 60 is actuated to rotate the rotor 62, whereupon power is transmitted to the second shaft 4 and the carrier 633. By the power transmitted to the second shaft 4, the first outer race 12 of the first clutch 610 rotates in the lock direction (the direction of arrow Lo) when viewed from the first inner race 11 in rotation relative to the first inner race 11. In this manner, the power is transmitted from the first outer race 12 to the first inner race 11 and the input shaft 2, resulting in start-up of the engine 211.

Also, the rotation of the rotor 62 is transmitted from the carrier 633 to the ring gear 634 to rotate the first shaft 3. Since the gearbox 212 (see FIG. 1) is placed into a state for transmitting power, the rotation of the first shaft 3 is transmitted to the rear wheels 202. As a result, concurrently with start-up of the engine 211, the vehicle 200 can be moved forward (started moving) by the power of the generator motor 60. The engine 211 is started at the same time when the vehicle 200 is started moving, leading to reduction of vibration and shock produced during the start-up of the engine 211.

After the vehicle 200 has been started moving, the load of the generator motor 60 is increased to reduce the rpm of the rotor 62 for a reduction in rpm of the carrier 633 (first outer race 12), or the engine speed of the engine 211 is increased to increase the rotation of the input shaft 2 (first inner race 11), thereby disengaging the first sprag 613 from the first inner race 11 and the first outer race 12. In this state, the forward movement of the vehicle in hybrid mode in which the engine 211 and the generator motor 60 are operated is realized.

When the rpm of the second shaft 4 becomes equal to the rpm ($R_1$) of the first shaft 3 after the vehicle 200 has been moved forward and accelerated (see FIG. 21), the first load applying device 15 of the first clutch 610 (FIG. 16) is actuated to engage the first sprags 613 with the first inner race 11 and the first outer race 12. The three elements of the planetary gear device 630 are rotated simultaneously to achieve the forward movement of the vehicle caused by the power of the engine 211. Regeneration operation and reverse operation when coasting and braking of the vehicle 200 are similar to those in the first embodiment and the description thereof is omitted.

Next, a seventh embodiment will be described with reference to FIG. 22 to FIG. 28. In the seventh embodiment, the first outer race of the first clutch 10 and the second outer race 22 of the second clutch 720 are formed integrally with the second shaft 4. A planetary gear device 730 includes a carrier 733 (first element), a sun gear 731 (second element), a ring gear 734 (third element) and pinion gears 732 meshing with the sun gear 731 and the ring gear 734, in which the first shaft 3 is connected to the ring gear 734, the second shaft 4 is connected to the sun gear 731 and the input shaft 2 is connected to the carrier 733.

Figure 22:
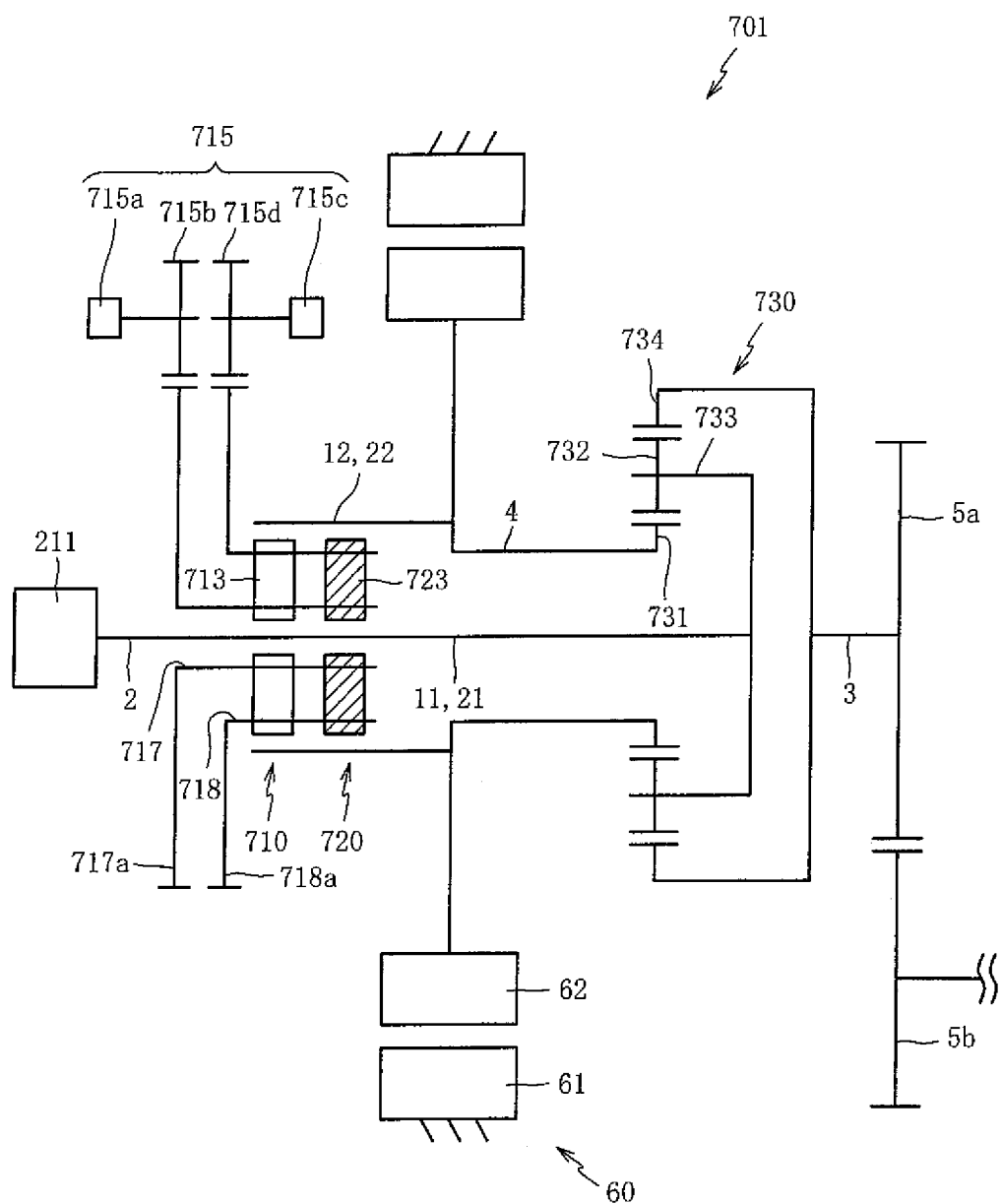
FIG. 22 is a schematic diagram schematically showing the power transmitting device in the seventh embodiment.

FIG. 22 is a schematic diagram schematically showing the internal structure of the power transmitting device 701 in the seventh embodiment. The same components as those in the first embodiment are designated by the same reference signs and the description of such components is omitted. FIG. 17 shows only the structure for performing the function of transmitting power for easier understanding, and the gearbox 212 is omitted in FIG. 22. The power transmitting device 701, which is mounted on the vehicle 200 (see FIG. 1), mainly includes, as illustrated in FIG. 22, the planetary gear device 730 to which the input shaft 2 transmitting the power of the engine 211 is connected, and the first clutch 710 and the second clutch 720 which are placed on a power line from the engine 211 to the planetary gear device 730.

Figure 23:
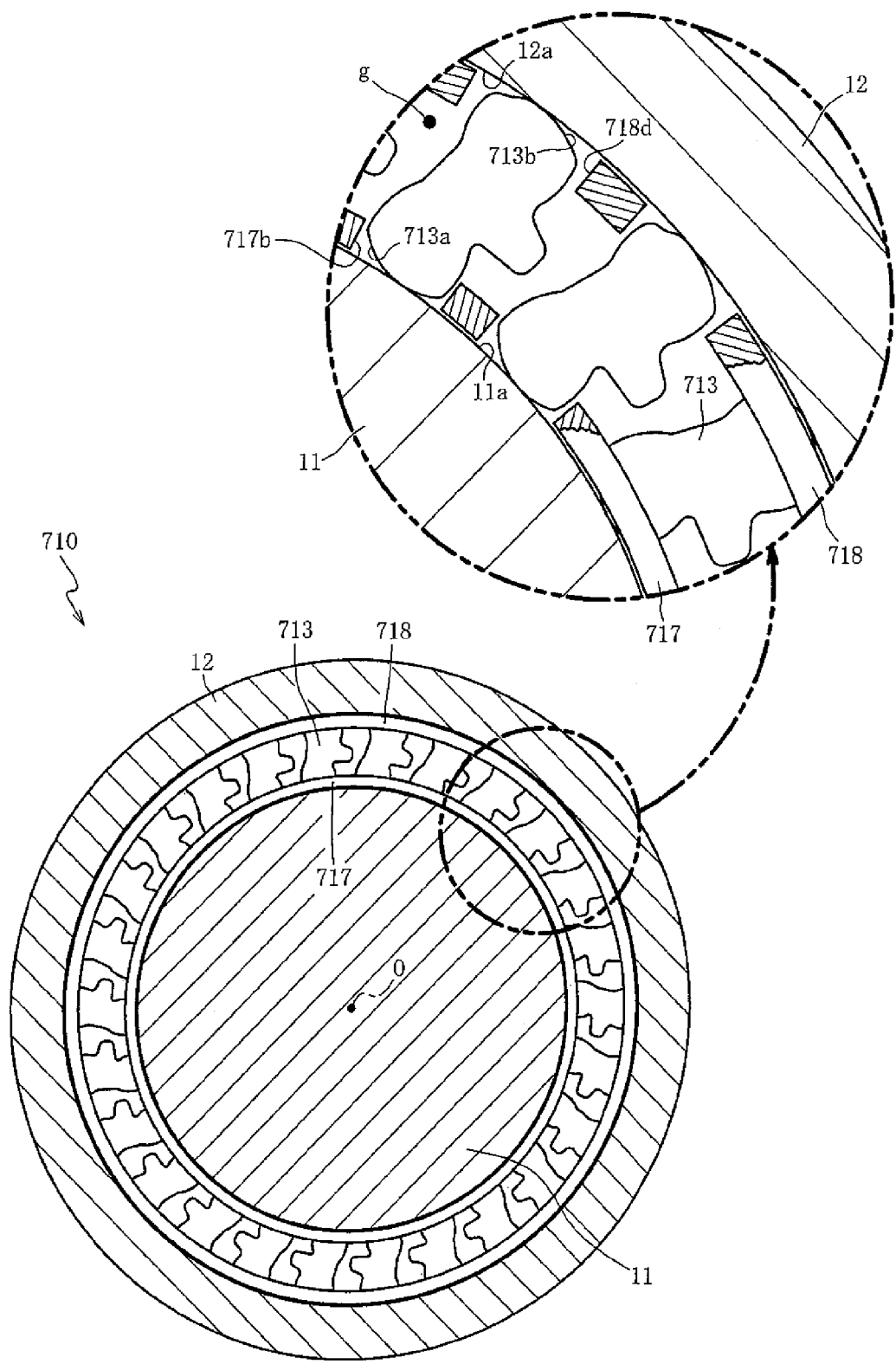
FIG. 23 is a sectional view of the first clutch.

Next, the first clutch 710 and the second clutch 720 will be described with reference to FIG. 23 which is a sectional view in the circumferential direction of the first clutch 710. In FIG. 23, second sprags 723 (on the reverse side of the sheet of FIG. 23) arranged alongside of first sprags 713 are omitted for the sake of simplifying the drawing. In the embodiment, the first inner race 11 and the second inner race 21 are connected to the input shaft 2 and the first outer race 12 and the second outer race 22 are connected to the second shaft 4.

The first sprag 713 of the first clutch 710 restricts relative rotation of the inner race 11 and the outer race 12, and a plurality of the first sprags 713 are arranged at a regular interval in the circumferential direction in an accommodating space g between the outer peripheral surface 11a and the inner peripheral surface 12a. The first sprag 713 is structured to have engaging faces 713a, 713b to engage with the outer peripheral surface 11a of the inner race 11 and the inner peripheral surface 12a of the outer race 12 by the relative rotation of the inner race 11 and the outer race 12 in one direction.

A plurality of the second sprags 723 of the second clutch 720, together with the first sprags 713, are arranged, alongside the first sprags 713, at a regular interval in the circumferential direction in the accommodating space g between the outer peripheral surface 11a and the inner peripheral surface 12a. The second sprag 723 is structured to have engaging faces 723a, 723b to engage with the outer peripheral surface 11a of the inner race 11 and the inner peripheral surface 12a of the outer race 12 by the relative rotation of the inner race 11 and the outer race 12 in the other direction.

An inner cage 717 is a cylindrical member having a plurality of pockets 717b perforated in the circumferential direction and arranged alongside in the axis direction, and retains parts, closer to the inner race 11, of the first sprags 713 and the second sprags 723 (see FIG. 24) inserted into the pockets 717b.

An outer cage 718 is a cylindrical member having a plurality of pockets 718d perforated in the circumferential direction and arranged alongside in the axis direction, and retains parts, closer to the outer race 12, of the first sprags 713 and the second sprags 723 (see FIG. 24) inserted into the pockets 718b. The outer cage 718 includes a first retaining portion 718b (see FIG. 24) retaining the first sprags 713 and a second retaining portion 718c separated from the first retaining portion 718b in the axis direction and retaining the second sprags 723. The first retaining portion 718b and the second retaining portion 718c have pockets 718d arranged at regular interval in the circumferential direction so that the first sprags 713 and the second sprags 723 are inserted into the pockets 718d.

Returning to FIG. 22, the inner cage 717 and the outer cage 718 have cog-shaped load transmission portions 717a, 718a each extending in a direction crossing the axis direction. The load transmission portions 717a, 718a are parts to which a load is transmitted from a first load applying device 715.

The first load applying device 715 is a device for applying a load to the load transmission portions 717a, 718a to cause the inner cage 717 and the outer cage 718 to relatively rotate or to restrict the relative rotation. The relative rotation of the inner cage 717 and the outer cage 718 caused by the first load applying device 715 allows switching between engagement and disengagement between the first sprags 713 and the first inner race 11 and the first outer race 12 (engagement and disengagement between the second sprags 723 and the second inner race 21 and the second outer race 22). The first load applying device 715 includes electric motors 715a, 715c and pinions 715b, 715d meshing the load transmission portions 717a, 718a connected to the electric motors 715a, 715c.

Figure 24A:
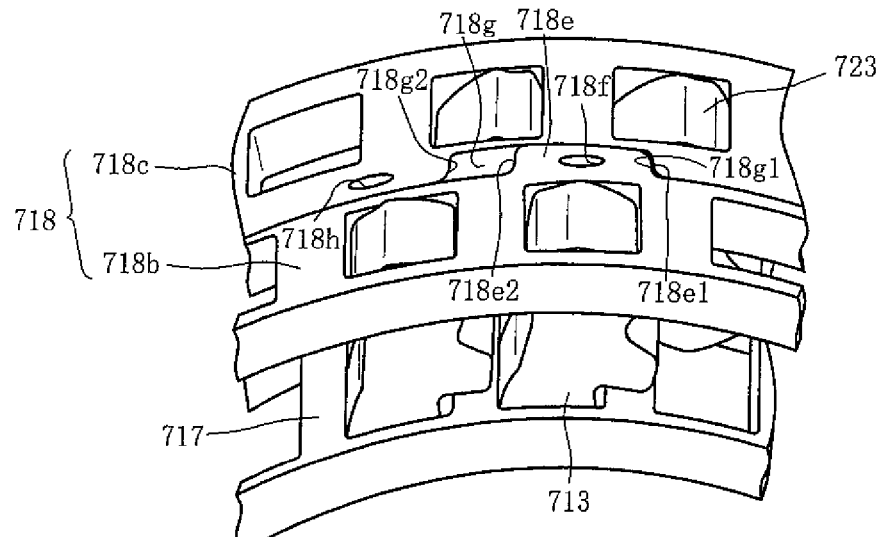
FIG. 24(a) is a perspective view of important parts of the first retaining portion and the second retaining portion, relative movement of which is restricted.

Next, the structure and the operation of the first retaining portion 718b and the second retaining portion 718c will be described with reference to FIGS. 24 to 27. First, the structure of the first retaining portion 718b and the second retaining portion 718c is described with reference to FIG. 24(a). FIG. 24(a) is a perspective view of essential parts of the first retaining portion 718b and the second retaining portion 718c, relative movement of which is restricted. In FIGS. 24 to 27, parts of the first sprags 713 and the second sprags 723 retained by the first retaining portion 718b and the second retaining portion 718c are omitted for simplifying the drawing.

As shown in FIG. 24(a), the first retaining portion 718b has a protrusion 718e protruding from the face facing the second retaining portion 718c toward the second retaining portion 718c. The protrusion 718e has a first face 718e1 formed on one side in the circumferential direction and a third face 718e2 formed on the other side. The second retaining portion 718c has a recess 718g formed in the face facing the first retaining portion 718b to receive the protrusion 718e. The length in the circumferential direction of the recess 718g is set longer than that in the circumferential direction of the protrusion 718e. The recess 718g has a second face 718g1 formed on one side in the circumferential direction to be allowed to abut on the first face 718e1, and a fourth face 718g2 formed on the other side to be allowed to abut on the third face 718e2. A relative movement of the first retaining portion 718b and the second retaining portion 718c is allowed within a range where the protrusion 718e can move within the recess 718g. However, the second face 718g1 of the recess 718g abuts on the first face 718e1 of the protrusion 717e, so that a relative movement of the first retaining portion 718b and the second retaining portion 718c in one of the circumferential directions is restricted. On the other hand, the fourth face 718g2 of the recess 718g abuts on the third face 718e2 of the protrusion 718e, so that a relative movement of the first retaining portion 718b and the second retaining portion 718c in the other circumferential direction is restricted.

Lock portions 718f, 718h are parts that are formed respectively in the first retaining portion 718b and the second retaining portion 718c and to which both ends of a second urging member (not shown) are locked. In the embodiment, the lock portions 718f, 718h formed through from the inner peripheral surface of the first retaining portion 718b and the second retaining portion 718c to the outer peripheral surface, while the second urging member is formed of a torsion coil spring. The second urging member is locked at its both ends to the lock portions 718f, 718h, and also a ring-shaped part is located along the inner peripheral surface of the outer cage 718 between the first sprag 713 and the second sprag 723. As a result, the second urging member urges the first retaining portion 718b and the second retaining portion 718c toward one of the circumferential directions to cause the first face 718e1 of the first retaining portion 718b to abut on the second face 718g1 of the second retaining portion 718c. When the load applying device 715 (see FIG. 22) applies a load to the second retaining portion 718c, the first retaining portion 718b is moved in attendance upon the second retaining portion 718c by the urging force of the second urging portion (not shown), so that the first retaining portion 718b and the second retaining portion 718c can be moved integrally as the outer cage 718.

Figure 24B:
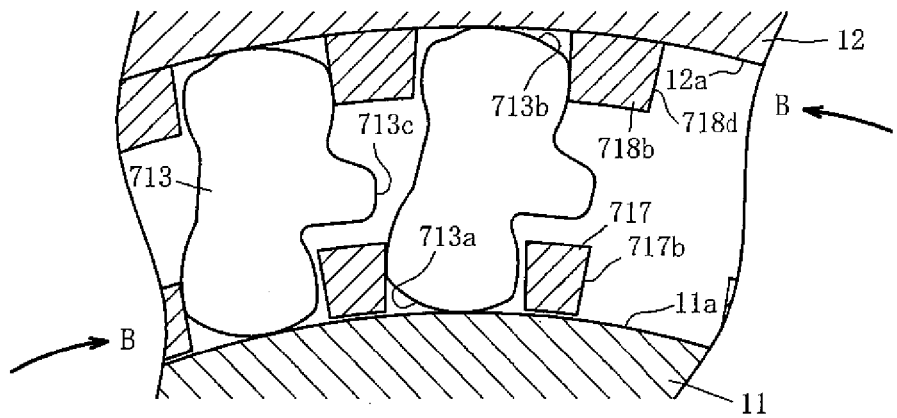
FIG. 24(b) is a sectional view of the first retaining portion.
Figure 24C:
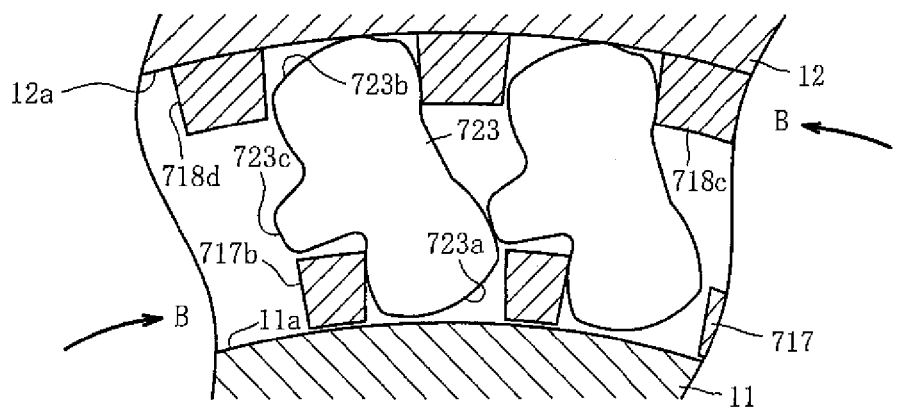
FIG. 24(c) is a sectional view of the second retaining portion.

Next, the operation of the first sprag 713 and the second sprag 723 when the inner cage 717 and the outer cage 718 relatively move in one of the circumferential directions will be described with reference to FIG. 24(b) and FIG. 24(c). FIG. 24(b) is a sectional view in the circumferential direction of the first retaining portion 718b, while FIG. 24(c) is a sectional view in the circumferential direction of the second retaining portion 718c.

As shown in FIG. 24(b), the first load applying device 715 applies a load in the direction of arrow 13 to each of the inner cage 717 and the outer cage 718 (the first retaining portion 718b) to move relatively the inner cage 717 and the outer cage 718 (the first retaining portion 718b), so that the first sprags 713 inserted into the pockets 717b, 718d of the inner cage 717 and the first retaining portion 718b are tilted. Thereby, the engaging faces 713a, 713b of the first sprag 713 can come into contact with the outer peripheral surface 11a of the inner race 11 and the inner peripheral surface 12a of the outer race 12, resulting in the state of allowing the first sprag 731 to engage with the inner race 11 and the outer race 12. At this stage, the first sprags 713 are located at a predetermined distance from each other in the circumferential direction between the outer peripheral surface 11a and the inner peripheral surface 12a which face each other, while preventing an abutting portion 713c of one first sprag 713 protruding toward another first sprag 713 located adjacent to it from abutting on the another first sprag 713.

Since the second retaining portion 718c moves integrally with the first retaining portion 718b as described above, a load in the direction of arrow B is applied to each of the inner cage 717 and the outer cage 718 (the second retaining portion 718c), whereupon the inner cage 717 and the outer cage 718 (the second retaining portion 718c) are relatively moved, so that the second sprags 723 inserted in the pockets 717b, 718d of the inner cage 717 and the second retaining portions 718c are tilted. Hence, at least one of the outer peripheral surface 11e of the inner race 11 and the inner peripheral surface 12a of the outer race 12 and the engaging face 723a, 723b of the second sprag 723 go out of contact with each other. As a result, the sprags 723 and the inner race 11 and the outer race 12 become unable to engage with each other.

In the state shown in FIG. 24(b), when the power is transmitted to the inner race 11 or the outer race 12 to rotate the inner race 11 in the clockwise direction in FIG. 24 or to rotate the outer race 12 in the counterclockwise direction in FIG. 24, the engaging faces 713a, 713b of the first sprags 713 engage with the outer peripheral surface 11a of the inner race 11 and the inner peripheral surface 12a of the outer race 12 so as to transmit the power via the first sprags 713.

On the other hand, in the second sprags 723, at least one of the outer peripheral surface 11a of the inner race 11 and the inner peripheral surface 12a of the outer race 12 and the engaging faces 723a, 723b of the second sprags 723 goes out of contact with each other, thereby preventing the engaging faces 723a, 723b of the second sprags 723 from sliding on the outer peripheral surface 11a of the inner race 11 and the inner peripheral surface 12a of the outer race 12. This makes it possible to reduce the drag torque on the engaging faces 723a, 723b of the second sprags 723. Since the slides of the engaging faces 723a, 723b of the second sprags 723 are prevented as noted above, it is possible to reduce the wearing, heating and the like.

A relative position of the inner cage 717 and the outer cage 718 is determined while the first sprags 713 engage with the outer peripheral surface 11a of the inner race 11 and the inner peripheral surface 12a of the outer race 12 (see FIG. 24(b)). At this time, the engaging faces 723a of the second sprags 723 go out of contact with the outer peripheral surface 11a of the inner race 11 as shown in FIG. 24(c). As a result, it is possible to prevent the second sprags 723 from unintentionally engaging with the inner race 11 and the outer race 12 when the first sprags 713 are engaged with the inner race 11 and the outer race 12. This makes it possible to reliably prevent double-locking in which both the first sprags 713 and the second sprags 723 are engaged with the inner race 11 and the outer race 12.

When the torque transmitted through the first sprags 713 increases so as to cause relative movement of the inner cage 717 and the outer cage 718 in the direction of the arrow B, as shown in FIG. 24(c), an abutting portion 723c of each second sprag 723 abuts on another second sprag 723 located adjacent to it to restrict a tilting motion beyond the abutting point. As a result, this brings about the state in which the second sprags 723 are held between the inner cage 717 and the outer cage 718 (the second retaining portions 718c), so that further relative movement of the inner cage 717 and the outer cage 718 (the second retaining portion 718c) is restricted. Accordingly, simplification of device structure can be achieved without a positioning member or the like for controlling the amount of relative movement of the inner cage 717 and the outer cage 718.

Figure 25A:
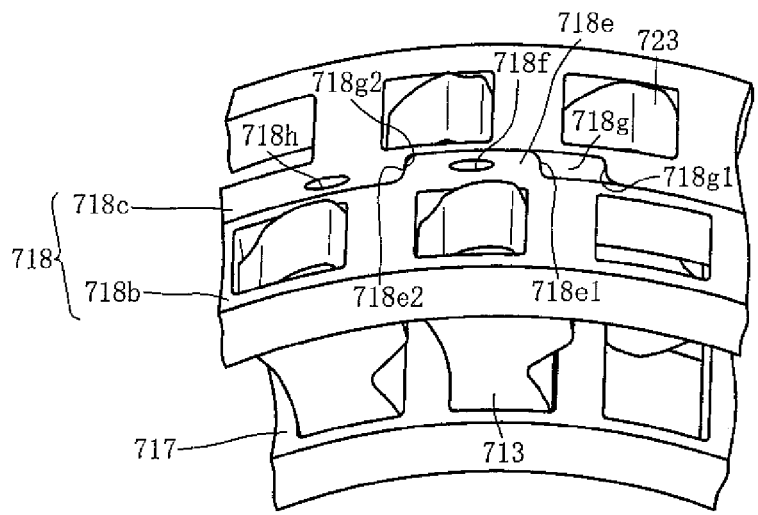
FIG. 25(a) is a perspective view of important portions of the first retaining portion and the second retaining portion which are moved relatively.
Figure 25B:
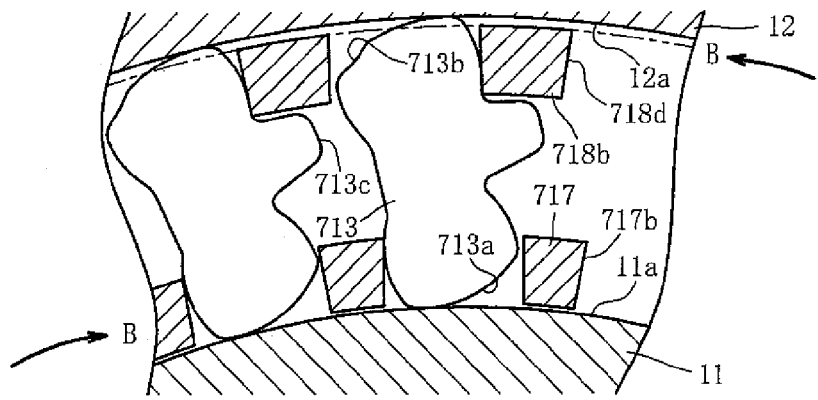
FIG. 25(b) is a sectional view of the first retaining portion.
Figure 25C:
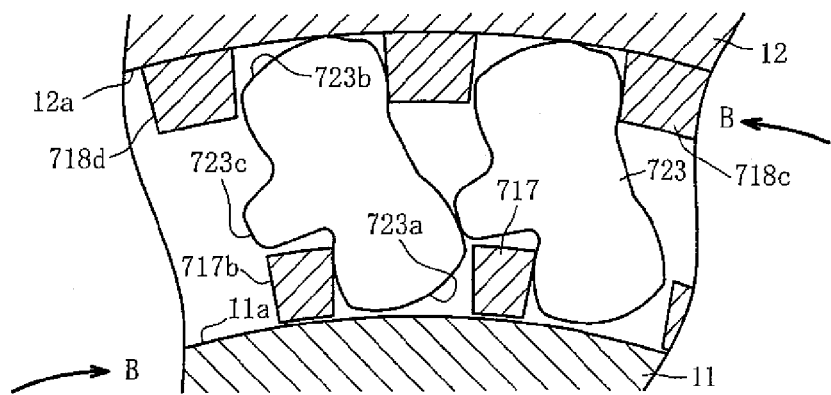
FIG. 25(c) is a sectional view of the second retaining portion.

Next, the operation of the first retaining portion 718b and the second retaining portion 718c when the first sprags 713 strongly engage with the inner race 11 and the outer race 12 will be described with reference to FIG. 25. FIG. 25(a) is a perspective view of important portions of the first retaining portion 718b and the second retaining portion 718c which are moved relatively. FIG. 25(b) is a sectional view in the circumferential direction of the first retaining portion 718b. FIG. 25(c) is a sectional view in the circumferential direction of the second retaining portion 718c.

In the state shown in FIG. 24, when, by high torque, the inner race 11 is rotated clockwise in FIG. 24 or the outer race 12 is rotated counterclockwise in FIG. 24, as shown in FIG. 25(b), the engaging faces 713a, 713b of the first sprag 713 are strongly engaged with the outer peripheral surface 11a of the inner race 11 and the inner peripheral surface 12a of the outer race 12, so that the first sprag 713 is largely tilted. Thereupon, the tilting motion pushes the first retaining portion 718b to displace it in the circumferential direction (the counterclockwise direction in FIG. 25). On the other hand, the rotation of the inner race 11 in the clockwise direction in FIG. 24 or the rotation of the outer race 12 in the counterclockwise direction in FIG. 24 does not allow the second sprags 723 to engage with the inner race 11 and the outer race 12. For this reason, the second retaining portion 718c does not displace in the circumferential direction since it is not affected by the second sprags 723. Therefore, the displacement of the first retaining portion 718b in the circumferential direction with respect to the inner cage 717 is larger than that of the second retaining portion 718c.

In this connection, if the first retaining portion 718b and the second retaining portion 718c (the outer cage 718) are formed integrally as a rigid body, the second retaining portion 718c displaces in the circumferential direction with the displacement of the first retaining portion 718b. In this event, the second sprag 723 may possibly fall out of the outer cage 718 or the inner age 717 or the outer cage 718 may possibly be damaged.

As opposed to this, the first retaining portion 718b and the second retaining portion 718c are separated from each other in the axis direction and are structured to be capable of moving relatively in the circumferential direction. Because of this, when the first sprags 713 are tilted to push the first retaining portion 718b, until the third face 718e2 (see FIG. 25(a)) abuts on the fourth face 718g2, the first retaining portion 718b alone moves relative to the second retaining portion 718c. As a result, the second retaining portion 718c (see FIG. 25(c)) can be prevented from being affected by the displacement of the first retaining portion 718b, leading to prevention of the possibility that the second sprag 723 falls out of the pocket 718d of the second retaining portion 718c or the inner cage 717 or the second retaining portion 718c is damaged.

Figure 26A:
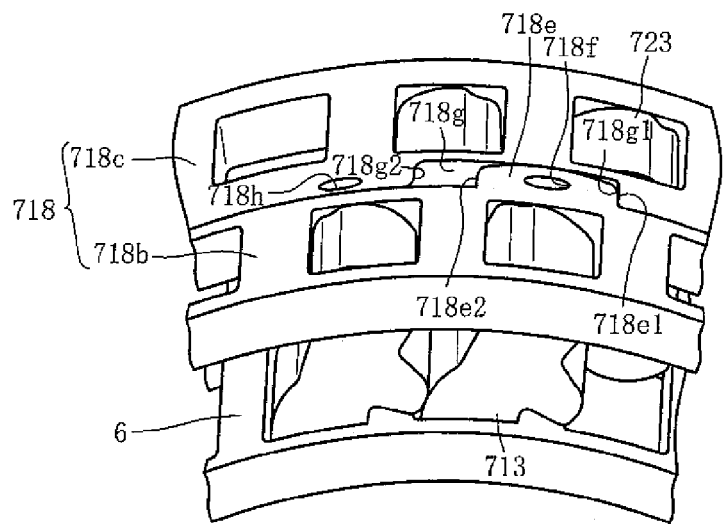
FIG. 26(a) is a perspective view of important portions of the first retaining portion and the second retaining portion of which the relative movement is restricted.
Figure 26B:
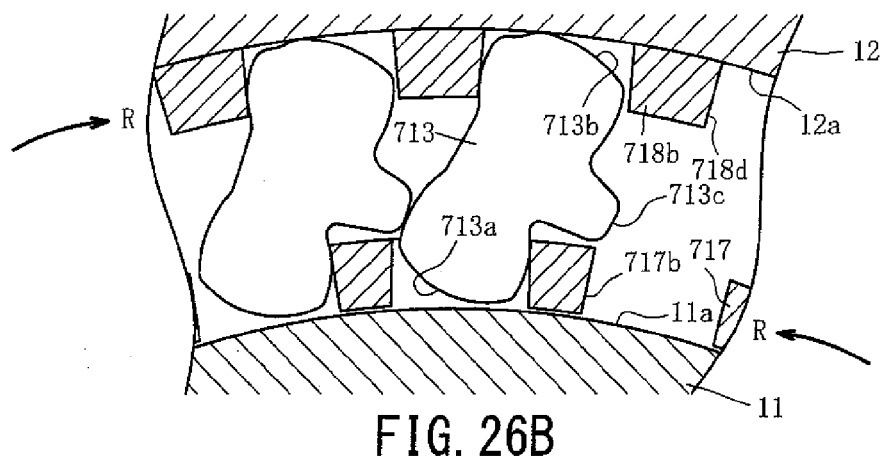
FIG. 26(b) is a sectional view of the first retaining portion.
Figure 26C:
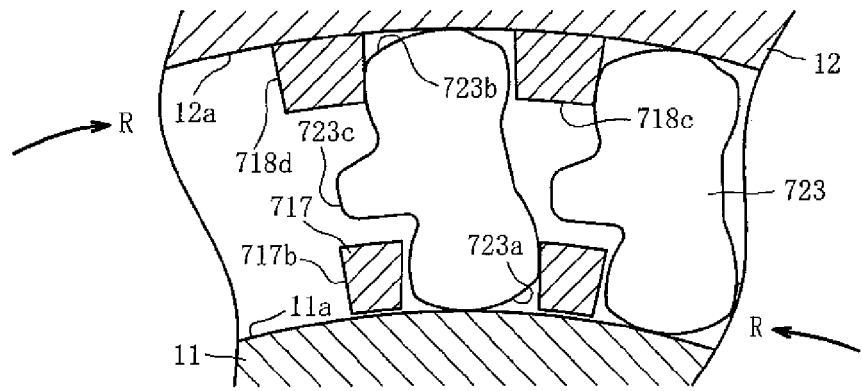
FIG. 26(c) is a sectional view of the second retaining portion.

Next, the operation of the first sprag 713 and the second sprag 723 when the inner cage 717 and the outer cage 718 relatively move in the other circumferential direction (the direction opposite to that in FIG. 24) will be described with reference to FIG. 26. FIG. 26(a) is a perspective view of important portions of the first retaining portion 718b and the second retaining portion 718c of which the relative movement is restricted. FIG. 26(b) is a sectional view in the circumferential direction of the first retaining portion 718b. FIG. 26(c) is a sectional view in the circumferential direction of the second retaining portion 718c.

The load applying device 715 (see FIG. 22) is actuated to apply a load in the direction of arrow R to each of the inner cage 717 and the outer cage 718 (the first retaining portion 718b) to move relatively the inner cage 717 and the outer cage 718 (the first retaining portion 718b), so that the first sprags 713 inserted into the pockets 717b, 718d of the inner cage 717 and the first retaining portion 718b are tilted. Thereby, the engaging faces 713a, 713b of the first sprags 713 go out of contact with at least one of the outer peripheral surface 11a of the inner race 11 and the inner peripheral surface 12a of the outer race 12. As a result, the first sprags 713 and the inner race 11 and the outer race 12 become unable to engage with each other.

Since the second retaining portion 718c moves integrally with the first retaining portion 718b as described above, the load applying device 715 applies a load in the direction of arrow R to each of the inner cage 717 and the outer cage 718 (the second retaining portion 718c) (see FIG. 26(c)), whereupon the inner cage 717 and the outer cage 718 (the second retaining portion 718c) are relatively moved, so that the second sprags 723 inserted in the pockets 717b, 718d of the inner cage 717 and the second retaining portions 718c are tilted. Hence, the engaging faces 723a, 723b of the second sprags 723 are made contact with the outer peripheral surface 11a of the inner race 11 and the inner peripheral surface 12a of the outer race 12, resulting in the state of allowing the second sprags 723 to engage with the inner race 11 and the outer race 12. At this stage, the second sprags 723 are located at a predetermined distance from each other in the circumferential direction between the outer peripheral surface 11a and the inner peripheral surface 12a which face each other, while preventing an abutting portion 723c of one second sprag 723 protruding toward another second sprag 723 located adjacent to it from abutting on the another second sprag 723.

In the state shown in FIG. 26(c), when the power is transmitted to the inner race 11 or the outer race 12 to rotate the outer race 12 in the clockwise direction in FIG. 26 or to rotate the inner race 11 in the counterclockwise direction, in FIG. 26, the engaging faces 723a, 723b of the second sprags 723 engage with the outer peripheral surface 11a of the inner race 11 and the inner peripheral surface 12a of the outer race 12 so as to transmit the power via the second sprags 723.

On the other hand, in the first sprags 713 as shown in FIG. 26(b), at least one of the outer peripheral surface 11a of the inner race 11 and the inner peripheral surface 12a of the outer race 12 and the engaging faces 713a, 713b of the first sprags 713 goes out of contact with each other, thereby preventing the engaging faces 713a, 713b of the first sprags 713 from sliding on the outer peripheral surface 11a of the inner race 11 and the inner peripheral surface 12a of the outer race 12. This makes it possible to reduce the drag torque on the engaging faces 713a, 713b of the first sprags 713. Since the slides of the engaging faces 713a, 713b of the first sprags 713 are prevented as noted above, it is possible to reduce the wearing, heating and the like.

A relative position of the inner cage 717 and the outer cage 718 is determined while the second sprags 723 engage with the outer peripheral surface 11a of the inner race 11 and the inner peripheral surface 12a of the outer race 12 (see FIG. 26(c)). At this time, the engaging faces 713a of the first sprags 713 go out of contact with the outer peripheral surface 11a of the inner race 11 as shown in FIG. 26(b)). As a result, it is possible to prevent the first sprags 713 from unintentionally engaging with the inner race 11 and the outer race 12 when the second sprags 723 are engaged with the inner race 11 and the outer race 12. This makes it possible to reliably prevent double-locking in which both the first sprags 713 and the second sprags 723 are engaged with the inner race 11 and the outer race 12.

When the torque transmitted through the second sprags 723 increases so as to cause relative movement of the inner cage 717 and the outer cage 718 in the direction of the arrow R, as shown in FIG. 26(b), an abutting portion 713c of each first sprag 713 abuts on another first sprag 713 located adjacent to it to restrict tilting motion beyond the abutting point. As a result, this brings about the state in which the first sprags 713 are held between the inner cage 717 and the outer cage 718 (the first retaining portions 718b), so that further, relative movement of the inner cage 717 and the outer cage 718 (the first retaining portion 718b) is restricted. Accordingly, simplification of device structure can be achieved without a positioning member or the like for controlling the amount of relative movement of the inner cage 717 and the outer cage 718.

Figure 27A:
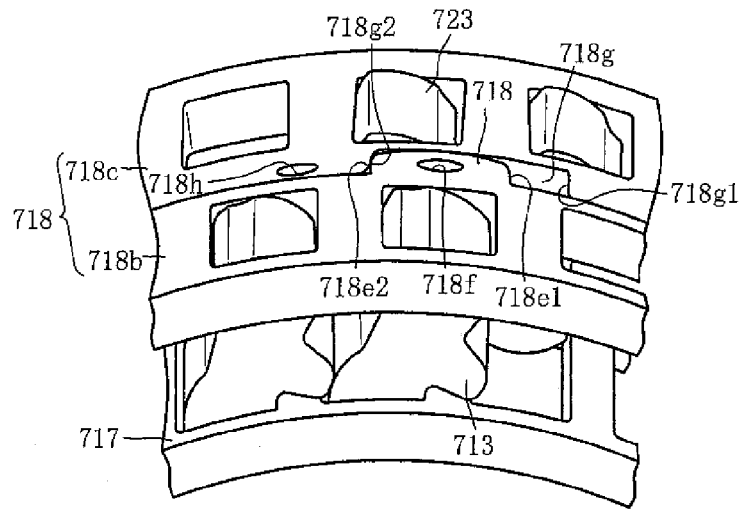
FIG. 27(a) is a sectional view of important portions of the first retaining portion and the second retaining portion which are moved relatively.
Figure 27B:
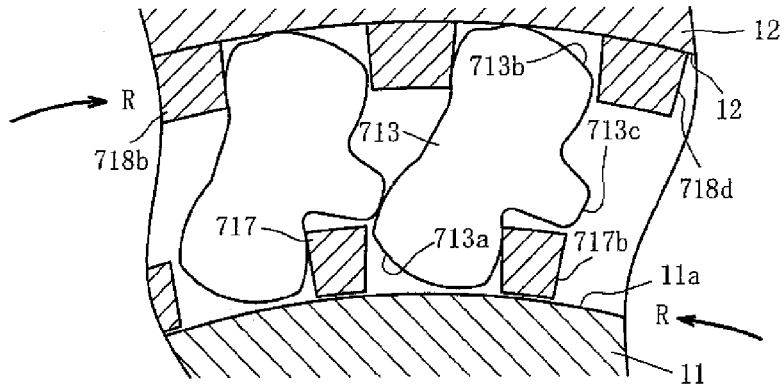
FIG. 27(b) is a sectional view of the first retaining portion.
Figure 27C:
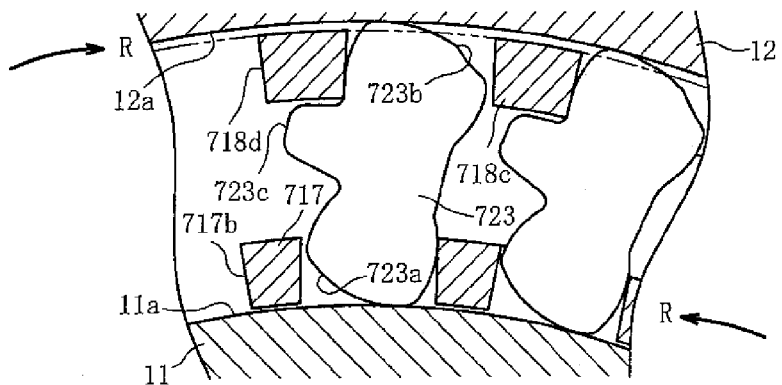
FIG. 27(c) is a sectional view of the second retaining portion.

Next, the operation of the first retaining portion 718b and the second retaining portion 718c when the second sprags 723 strongly engage with the inner race 11 and the outer race 12 will be described with reference to FIG. 27. FIG. 27(a) is a sectional view of important portions of the first retaining portion 718b and the second retaining portion 718c which are moved relatively. FIG. 27(b) is a sectional view in the circumferential direction of the first retaining portion 718b. FIG. 27(c) is a sectional view in the circumferential direction of the second retaining portion 718c.

In the state shown in FIG. 26, when, by high torque, the inner race 11 is rotated counterclockwise in FIG. 26 or the outer race 12 is rotated clockwise in FIG. 26, as shown in FIG. 27(c), the engaging faces 723a, 723b of the second sprag 723 are strongly engaged with the outer peripheral surface 11a of the inner race 11 and the inner peripheral surface 12a of the outer race 12, so that the second sprag 723 is largely tilted. Thereupon, the tilting motion pushes the second retaining portion 718c to displace it in the circumferential direction (the clockwise direction in FIG. 27). On the other hand, the rotation of the inner race 11 in the counterclockwise direction in FIG. 26 or the rotation of the outer race 12 in the clockwise direction in FIG. 26 does not allow the first sprags 713 to engage with the inner race 11 and the outer race 12. For this reason, the first retaining portion 718b does not displace in the circumferential direction since it is not affected by the first sprags 713. Therefore, the displacement of the second retaining portion 718c in the circumferential direction with respect to the inner cage 717 is larger than that of the first retaining portion 718b.

However, since the first retaining portion 718b and the second retaining portion 718c are separated from each other in the axis direction and are structured to be capable of moving relatively in the circumferential direction, when the second sprags 723 are tilted to push the second retaining portion 718c, until the fourth face 718g2 (see FIG. 27(a)) abuts on the third face 718e2, the second retaining portion 718c alone moves relative to the first retaining portion 718b. As a result, the first retaining portion 718b (see FIG. 27(b)) can be prevented from being affected by the displacement of the second retaining portion 718c, leading to prevention of the possibilities that the first sprag 713 falls out of the pocket 718d of the first retaining portion 718b and that the inner cage 717 or the outer cage 718 is damaged.

Figure 28:
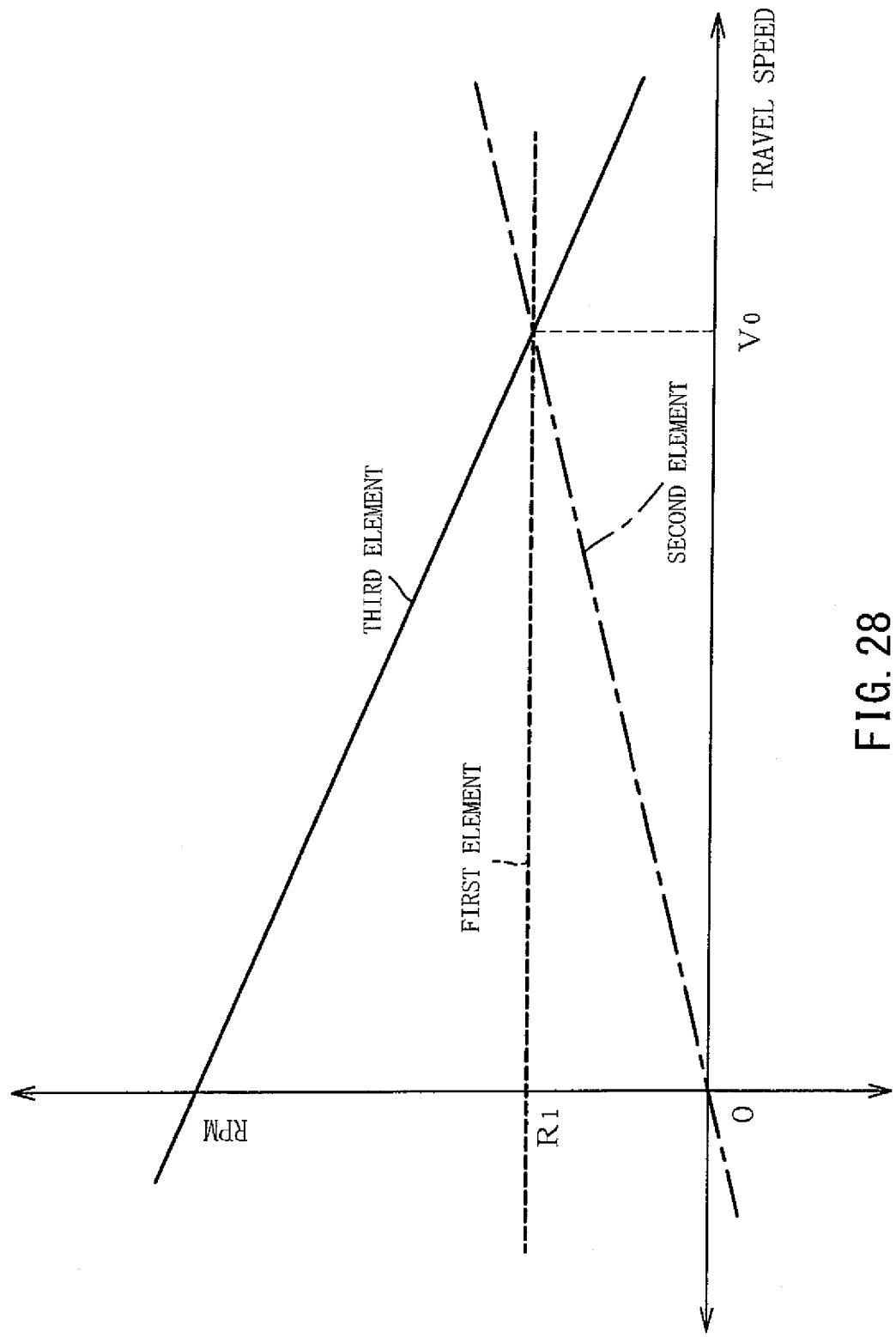
FIG. 28 is a schematic diagram showing the relationship between rpms of the first element, the second element and the third element and travel speed.

Next, the operation of the planetary gear device 730 will be described with reference to FIG. 28. FIG. 28 is a schematic diagram showing the relationship between rpms of the first element, the second element and the third element and travel speed of the vehicle 200. The horizontal axis in FIG. 28 represents the travel speed of the vehicle 200, while the vertical axis represents the rpms of the third element, the first element and the second element. Because the rotor 62 is connected to the sun gear 731 (second element) through the second shaft 4 as illustrated in FIG. 22, the rpm of the second element becomes equal to the rpm of the rotor 62 and the second shaft 4. Because the engine 211 is connected to the carrier 733 (first element) through the input shaft 2, the rpm of the first element becomes equal to the rpm of the input shaft 2. Further, because the first shaft 3 is connected to the ring gear 734 (third element) and the drive gear 5a, the rpm of the third element becomes equal to the rpm of the first shaft 3 and the rpm of the drive gear 5a. FIG. 28 illustrates the characteristics in which the rpm of the first element is constant relative to the travel speed of the vehicle 200, that is, the rpm of the engine 211 and input shaft 2 is constant ($R_1$).

During the start-up of the engine 211, the first load applying device 715 (see FIG. 22) is rendered operative to engage the first sprags 713 and the second sprags 723 with the first inner race 11 and the first outer race 12 (the second inner race 21 and the second outer race 22). In this state, the generator motor 60 is actuated to rotate the rotor 62, whereupon power is transmitted to the first outer race 12 and the second outer race 22. The relative rotation of the first outer race 12 and the first inner race 11 transmits power to the first inner race 11 and the input shaft 2, resulting in start-up of the engine 211.

After the start-up of the engine 211, the first load applying device 715 is operated to release the engagement of the first sprags 713 and the second sprags 723 with the first inner race 11 and the first outer race 12 (the second inner race 21 and the second outer race 22). In this state, the load of the generator motor 60 is increased to reduce the rpm of the rotor 62 and the rpm of the sun gear 731 (the first outer race 12) or the engine speed of the engine 211 is increased to increase the rotation of the input shaft 2 (the first inner race 11). In response, the motion state of the planetary gear device 730 moves in the right lower direction on the line of the third element shown in FIG. 28. Thus, the forward moving of the vehicle in variable speed conditions in hybrid mode using the engine 211 and the generator motor 60 is achieved. In this manner, since the generator motor 60 at high rpm and in low torque is able to be used to rotate the sun gear 731, a required load of the generator motor 60 (brake-element capacity) becomes small.

When the rpm of the second shaft 4 becomes equal to the rpm ($R_1$) of the first shaft 3 after the vehicle 200 has been moved forward and accelerated (see FIG. 28), the first load applying device 715 (FIG. 22) is actuated to engage the first sprags 713 and the second sprags 723 with the first inner race 11 and the first outer race 12 (the second inner race 21 and the second outer race 22). The three elements of the planetary gear device 730 are rotated simultaneously to achieve the forward movement of the vehicle caused by the power of the engine 211.

Regeneration operation and reverse operation when coasting and braking of the vehicle 200 are similar to those in the first embodiment and the description is omitted. However, in the energy regeneration on coasting, the generator motor 60 can be operated at high rpm because of the sun gear 731, resulting in a larger electric-generating capacity.

Up to this point the present invention has been described based on the embodiments. However, the present invention is not limited to the above embodiments, and it can be easily understood that various improved modifications can be made without departing from the scope of the present invention.

Each of the aforementioned embodiments is directed to the structure in that each of the first load applying device 15, 715 and the fourth load applying device 45 is formed of an electric motor (AC electric motor or DC electric motor), but the first load applying device is not necessarily limited to this. It should be understood that another power source can be employed. Other examples of power sources include, a DC electric motor, a hydraulic motor, a pneumatic cylinder, a hydraulic cylinder, an AC solenoid, a DC solenoid and the like.

If the actuator 15a, 715a, 715c (the first load applying device 15, 715) includes a solenoid, not only the use of a gear mechanism or the like to apply a load to the first sprags 13, 613, 713, but also, for example, it may be structured to use an electromagnetic force to apply a load to the first sprags 13, 613, 713.

In each embodiment described above, the first clutch 10, 610, 710 includes a sprag one-way clutch equipped with a function of disengaging the first sprags 13, 613, 713, but the first clutch is not necessarily limited to this. Another clutch can be employed as long as it has functions of transmitting power in a certain direction and blocking the transmission of power. Examples of another clutch include a clutch using roller or the like to transmit power.

In each embodiment described above, the second clutch 20, 720 is structured to include a sprag one-way clutch, but the second clutch is not necessarily limited to this. Another clutch can be employed as long as it has a function of transmitting power in a certain direction. Examples of another clutch include a clutch using roller or the like to transmit power.

It should be understood that in each embodiment the first clutch 10, 610, 710 and the second clutch 20, 720 can be replaced with each other. Adoption of the structure of the first clutch 610 into the second clutch 20 makes it possible to prevent disadvantages of simultaneous engagement of the first sprags 613 and the second sprags with the inner race 2 and the outer race 3.

The first clutch 710 and the second clutch 720 can prevent the cages (the inner cage 717, the outer cage 718) from being damaged. If this structure can be employed for the first clutch 610, the same advantageous effects can be realized. This is because, when a load is transmitted by the first clutch 610, since the first load applying device 15 is operated to engage the first sprags 613, simultaneously engagement of the first sprags 613 and the second sprags 23 with the first inner race 11 and the first outer race 12 can be inhibited.

Each embodiment described above utilizes the generator motor 60, but the present invention is not necessary limited to this. Instead of the generator motor 60, a motor having a function of generating electric power can be employed as a matter of course.

In each embodiment described above, the engine 211 and the generator motor 60 drive the rear wheels of the vehicle 200, but the driving is not limited to this. It is should be understood that the front wheels 201 may be driven or the front wheels 201 and the rear wheels 202 may be driven.

In each embodiment, a clutch for engaging/disengaging the input shaft 2 to which the power from the engine 211 is input is not provided, but it is should be understood that a clutch is arranged for the input shaft 2. Arranging a clutch for the input shaft 2 makes it possible to disconnect the engine 211 from the planetary gear device 30, 130, 330, 430, 530, 630, 730 in regeneration. As a result, the engine 211 can be prevented from acting as resistance to driving of the generator motor 60, resulting in an increase in the amount of regeneration without energy loss.

Each embodiment described above includes a parallel-axis gearbox 212, but a gearbox is not limited to this, and another type of gearbox can be employed as a matter of course. Examples of another gearbox include a torque converter automatic transmission, a semiautomatic transmission such as a multiplate wet clutch planetary gear type, a dual-clutch transmission (DCT) or the like, and a continuously variable transmission (CVT). Also, a clutch for blocking the transmission of power between the first shaft 3 and the gearbox 212 may be provided as necessary.

The seventh embodiment described above utilizes the second urging member engaged with the lock portions 718f, 718h and is formed of a torsion coil spring, but the second urging member is not necessarily limited to this. An elastic member such as rubber and the like may be employed as a matter of course.

REFERENCE SIGNS LIST 1, 101, 301, 401, 501, 601, 701 power transmitting device
2 input shaft
3 first shaft
4 second shaft
10, 610, 710 first clutch
11 first inner race
21 second inner race
11a outer peripheral surface
12 first outer race
22 second outer race
12a inner peripheral surface
13, 613, 713 first sprag
13a, 13b, 613a, 613b, 713a, 713b engaging face
23, 723 second sprag
23a, 23b, 713a, 713b engaging face
14, 614 cage
15, 715 first load applying device
16, 616 first urging member (urging member)
20, 720 second clutch
30, 130, 330, 430, 530, 630, 730 planetary gear device
31, 331 sun gear (third element)
33, 333, 733 carrier (first element)
34, 334 ring gear (second element)
60 generator motor (motor)
131 first sun gear (first element)
132 second sun gear (third element)
134 carrier (second element)
202 rear wheel (drive wheels)
211 engine
212 gearbox
431, 531, 731 sun gear (second element)
433, 533 carrier (third element)
434, 534 ring gear (first element)
631 sun gear (first element)
633 carrier (second element)
634, 734 ring gear (third element)
717 inner cage (cage)
718 outer cage (cage)
718b first retaining portion
718c second retaining portion
718e1 first face
718g1 second face
718f, 718h lock portions (second urging member is locked)
A, B contact point
O axis

The invention claimed is:
1. A power transmitting device, comprising:
a planetary gear device having a first element to which power is input from an input shaft connected to an engine, a second element to which power of a motor is input, and a third element meshing with the first element and the second element and transmitting power to a gearbox,
a first shaft connected to any of the three elements and to the gearbox,
a second shaft connected to the motor and one of the other elements excluding any of the three elements to which the first shaft is connected, and a first clutch transmitting power from the second shaft to the first shaft or the input shaft in an interruptible manner, while blocking transmission of power from the first shaft or the input shaft to the second shaft.

2. The power transmitting device according to claim 1, wherein the first clutch includes:
  a first inner race that is structured to have an outer peripheral surface of circular cross section and to be capable of rotating about an axis, and is connected to the first shaft, the second shaft or the input shaft;
  a first outer race that is structured to have an inner peripheral surface of circular cross section facing the outer peripheral surface of the first inner race and to be capable of rotating about the axis, and is connected to the first shaft, the second shaft or the input shaft;
  a plurality of first sprags each having two engaging faces making contact with the inner peripheral surface of the first outer race and the outer peripheral surface of the first inner race, and arranged in a circumferential direction between the outer peripheral surface of the first inner race and the inner peripheral surface of the first outer race which face each other;
  a cage retaining the first sprags and allowing the first sprags to tilt in the circumferential direction of the outer peripheral surface of the first inner race and the inner peripheral surface of the first outer race; and
  a first load applying device applying a load to the first sprags through the cage to tilt the first sprags in order to achieve engagement or disengagement of the outer peripheral surface of the first inner race and the inner peripheral surface of the first outer race with or from the engaging faces of the first sprags.

3. The power transmitting device according to claim 2, wherein the first clutch includes a first urging member applying a urging force to the first sprags to place one of the outer peripheral surface of the first inner race and the inner peripheral surface of the first outer race and one of the engaging faces of each of the first sprags into contact with each other in order to tilt the first sprags in an anti-lock direction of the circumferential directions, and
  wherein the first load applying device applies a load to the first sprags through the cage in opposition to the urging force of the first urging member to tilt the first sprags in a lock direction of the circumferential directions opposite to the anti-lock direction so as to place the two engaging faces of each of the first sprags into contact with the outer peripheral surface of the first inner race and the inner peripheral surface of the first outer race, in order to engage the two engaging faces of each of the first sprags with the outer peripheral surface of the first inner race and the inner peripheral surface of the first outer race for restriction on relative rotation of the first inner race and the first outer race.

4. The power transmitting device according to claim 3, further comprising a second clutch,
  wherein the second clutch includes:
  a second inner race that is structured to have an outer peripheral surface of circular cross section and to be capable of rotating about the axis, is connected to the first shaft, the second shaft or the input shaft, and is formed integrally with the first inner race along the axis direction;
  a second outer race that is structured to have an inner peripheral surface of circular cross section facing the outer peripheral surface of the second inner race and to be capable of rotating about the axis, is connected to any of the first shaft, the second shaft and the input shaft, and is formed integrally with the first outer race along the axis direction; and
  a plurality of second sprags each having engaging faces making respective contact with the inner peripheral surface of the second outer race and the outer peripheral surface of the second inner race, and arranged in a circumferential direction between the outer peripheral surface of the second inner race and the inner peripheral surface of the second outer race which face each other,
  the cage including:
  an outer cage retaining portions of the first sprags and the second sprags on the outer-race side to allow the first sprags and the second sprags to tilt in the circumferential direction of the inner peripheral surface of the first outer race and the second outer race; and
  an inner cage retaining portions of the first sprags and the second sprags on the inner-race side to allow the first sprags and the second sprags to tilt in the circumferential direction of the outer peripheral surface of the first inner race and the second inner race,
  the inner cage or the outer cage includes:
  a first retaining potion retaining the first sprags;
  a second retaining portion separated from the first retaining portion in the axis direction and retaining the second sprags while being allowed to move relative to the first retaining portion in the circumferential direction;
  a first face and a second face formed on the first retaining portion and the second retaining portion and abutting on each other to restrict relative movement of the first retaining portion and the second retaining portion in one of the circumferential directions; and
  a second urging member urging the first retaining portion and the second retaining portion toward one of the circumferential directions so that the first face and the second face abut on each other, and
  the first load applying device applies a load to at least one of the inner cage and the outer cage to allow the inner cage and the outer cage to move relatively around the axis.

5. The power transmitting device according to claim 3, including:
  first shaft rpm acquiring means and second shaft rpm acquiring means for acquiring rpms of the first shaft and the second shaft;
  rpm determining means for determining whether or not the rpm of the first shaft acquired by the first shaft rpm acquiring means and the rpm of the second shaft acquired by the second shaft rpm acquiring means are in agreement with each other; and
  load controlling means for controlling presence or absence of actuation of the first load applying device to apply a load to the first sprags through the cage when the rpm determining means determines that the rpm of the first shaft and the rpm of the second shaft are in agreement with each other.

6. The power transmitting device according to claim 2, including:
  first shaft rpm acquiring means and second shaft rpm acquiring means for acquiring rpms of the first shaft and the second shaft;
  rpm determining means for determining whether or not the rpm of the first shaft acquired by the first shaft rpm acquiring means and the rpm of the second shaft acquired by the second shaft rpm acquiring means are in agreement with each other; and load controlling means for controlling presence or absence of actuation of the first load applying device to apply a load to the first sprags through the cage when the rpm determining means determines that the rpm of the first shaft and the rpm of the second shaft are in agreement with each other.

7. The power transmitting device according to claim 2, further comprising:
a second clutch transmitting power from the first shaft or the input shaft to the second shaft, while blocking transmission of power from the second shaft to the first shaft or the input shaft,
wherein the motor is a generator motor.

8. The power transmitting device according to claim 7,
wherein the first clutch includes a first urging member applying a urging force to the first sprags to place one of the outer peripheral surface of the first inner race and the inner peripheral surface of the first outer race and one of the engaging faces of each of the first sprags into contact with each other in order to tilt the first sprags in an anti-lock direction of the circumferential directions,
wherein the first load applying device applies a load to the first sprags through the cage in opposition to the urging force of the first urging member to tilt the first sprags in a lock direction of the circumferential directions opposite to the anti-lock direction so as to place the two engaging faces of each of the first sprags into contact with the outer peripheral surface of the first inner race and the inner peripheral surface of the first outer race, in order to engage the two engaging faces of each of the first sprags with the outer peripheral surface of the first inner race and the inner peripheral surface of the first outer race for restriction on relative rotation of the first inner race and the first outer race.

9. The power transmitting device according to claim 1, further comprising:
a second clutch transmitting power from the first shaft or the input shaft to the second shaft, while blocking transmission of power from the second shaft to the first shaft or the input shaft,
wherein the motor is a generator motor.

10. The power transmitting device according to claim 9,
wherein the second clutch includes:
a second inner race that is structured to have an outer peripheral surface of circular cross section and to be capable of rotating about the axis, is connected to the first shaft, the second shaft or the input shaft, and is formed integrally with a first inner race along the axis direction;
a second outer race that is structured to have an inner peripheral surface of circular cross section facing the outer peripheral surface of the second inner race and to be capable of rotating about the axis, is connected to any of the first shaft, the second shaft and the input shaft, and is formed integrally with a first outer race along the axis direction; and
a plurality of second sprags each having engaging faces making respective contact with the inner peripheral surface of the second outer race and the outer peripheral surface of the second inner race, and arranged in a circumferential direction between the outer peripheral surface of the second inner race and the inner peripheral surface of the second outer race which face each other,
a cage including:
an outer cage retaining portions of first sprags and the second sprags on the outer-race side to allow the first sprags and the second sprags to tilt in the circumferential direction of the inner peripheral surface of the first outer race and the second outer race; and
an inner cage retaining portions of the first sprags and the second sprags on the inner-race side to allow the first sprags and the second sprags to tilt in the circumferential direction of the outer peripheral surface of the first inner race and the second inner race,
the inner cage or the outer cage includes:
a first retaining potion retaining the first sprags;
a second retaining portion separated from the first retaining portion in the axis direction and retaining the second sprags while being allowed to move relative to the first retaining portion in the circumferential direction;
a first face and a second face formed on the first retaining portion and the second retaining portion and abutting on each other to restrict relative movement of the first retaining portion and the second retaining portion in one of the circumferential directions; and
a second urging member urging the first retaining portion and the second retaining portion toward one of the circumferential directions so that the first face and the second face abut on each other, and
a first load applying device applies a load to at least one of the inner cage and the outer cage to allow the inner cage and the outer cage to move relatively around the axis.

11. The power transmitting device according to claim 10, including:
first shaft rpm acquiring means and second shaft rpm acquiring means for acquiring rpms of the first shaft and the second shaft;
rpm determining means for determining whether or not the rpm of the first shaft acquired by the first shaft rpm acquiring means and the rpm of the second shaft acquired by the second shaft rpm acquiring means are in agreement with each other; and
load controlling means for controlling presence or absence of actuation of the first load applying device to apply a load to the first sprags through the cage when the rpm determining means determines that the rpm of the first shaft and the rpm of the second shaft are in agreement with each other.

12. The power transmitting device according to claim 9,
wherein the first clutch includes a first urging member applying a urging force to first sprags to place one of an outer peripheral surface of a first inner race and an inner peripheral surface of a first outer race and one of the engaging faces of each of the first sprags into contact with each other in order to tilt the first sprags in an anti-lock direction of the circumferential directions,
wherein a first load applying device applies a load to the first sprags through a cage in opposition to urging force of a first urging member to tilt the first sprags in a lock direction of the circumferential directions opposite to the anti-lock direction so as to place two engaging faces of each of the first sprags into contact with the outer peripheral surface of the first inner race and the inner peripheral surface of the first outer race, in order to engage the two engaging faces of each of the first sprags with the outer peripheral surface of the first inner race and the inner peripheral surface of the first outer race for restriction on relative rotation of the first inner race and the first outer race.

13. The power transmitting device according to claim 12,
wherein the second clutch includes:
a second inner race that is structured to have an outer peripheral surface of circular cross section and to be capable of rotating about the axis, is connected to the first shaft, the second shaft or the input shaft, and is formed integrally with the first inner race along the axis direction;

a second outer race that is structured to have an inner peripheral surface of circular cross section facing the outer peripheral surface of the second inner race and to be capable of rotating about the axis, is connected to any of the first shaft, the second shaft and the input shaft, and is formed integrally with the first outer race along the axis direction; and a plurality of second sprags each having engaging faces making respective contact with the inner peripheral surface of the second outer race and the outer peripheral surface of the second inner race, and arranged in a circumferential direction between the outer peripheral surface of the second inner race and the inner peripheral surface of the second outer race which face each other, the cage including:

an outer cage retaining portions of the first sprags and the second sprags on an outer race side to allow the first sprags and the second sprags to tilt in the circumferential direction of the inner peripheral surface of the first outer race and the second outer race; and an inner cage retaining portions of the first sprags and the second sprags on the inner-race side to allow the first sprags and the second sprags to tilt in the circumferential direction of the outer peripheral surface of the first inner race and the second inner race, the inner cage or the outer cage includes:

a first retaining potion retaining the first sprags;

a second retaining portion separated from the first retaining portion in the axis direction and retaining the second sprags while being allowed to move relative to the first retaining portion in the circumferential direction;

a first face and a second face formed on the first retaining portion and the second retaining portion and abutting on each other to restrict relative movement of the first retaining portion and the second retaining portion in one of the circumferential directions; and a second urging member urging the first retaining portion and the second retaining portion toward one of the circumferential directions so that the first face and the second face abut on each other, and the first load applying device applies a load to at least one of the inner cage and the outer cage to allow the inner cage and the outer cage to move relatively around the axis.

14. The power transmitting device according to claim 9, including:

first shaft rpm acquiring means and second shaft rpm acquiring means for acquiring rpms of the first shaft and the second shaft;

rpm determining means for determining whether or not the rpm of the first shaft acquired by the first shaft rpm acquiring means and the rpm of the second shaft acquired by the second shaft rpm acquiring means are in agreement with each other; and load controlling means for controlling presence or absence of actuation of a first load applying device to apply a load to first sprags through a cage when the rpm determining means determines that the rpm of the first shaft and the rpm of the second shaft are in agreement with each other.

* * * * *